United States Patent [19]
Johnson, Jr. et al.

[11] Patent Number: 5,435,503
[45] Date of Patent: Jul. 25, 1995

[54] REAL TIME MISSILE GUIDANCE SYSTEM

[75] Inventors: Malvin G. Johnson, Jr., Grand Prairie; Glenn T. Haskins, Arlington, both of Tex.; Dewey H. Hodges, Dunwoody, Ga.

[73] Assignee: Loral Vought Systems Corp., Grand Prairie, Tex.

[21] Appl. No.: 113,636

[22] Filed: Aug. 27, 1993

[51] Int. Cl.[6] ............................ F41G 7/00; F42B 15/01
[52] U.S. Cl. ............................... 244/3.15; 364/424.01
[58] Field of Search ............................ 244/3.11, 3.15; 364/423, 424.01

[56] References Cited

U.S. PATENT DOCUMENTS 5,253,823 10/1993 Lawrence .......................... 244/3.15
5,259,569 11/1993 Waymeyer et al. ................. 244/3.22

OTHER PUBLICATIONS

Hodges et al., "Weak Hamiltonian Finite Element Method for Optimal Control Problems," *Journal of Guidance Control, and Dynamics,* vol. 14, No. 1, Jan.-Feb. 1991, American Institute Aeronautics and Astronautics, pp. 148–156.

Bless et al., "Finite Element Solution of Optimal Control Problems with Inequality Constraints," Proceedings of the 1990 American Control Conference, San Diego, California, May 23–25, 1990, vol. 1, American Automatic Control Conference, pp. 242–247.

*CRC Handbook of Mathematical Tables,* 1980, Chemical Rubber Company Press Inc., Boca Raton, Florida, pp. 43–44.

*McGraw–Hill Encyclopedia of Science & Technology,* vol. 8, 1992, McGraw–Hill, Inc., New York, N.Y., pp. 307–310.

Korn et al., *Mathematical Handbook for Scientists and Engineers,* 1961, McGraw–Hill, Inc., New York, N.Y., pp. 344–372, 471–480, 784–793.

Robert R. Bless, "Time–Domain Finite Elements in Optimal Control With Application to Launch–Vehicle Guidance," NASA Contract Report 4376, National Aeronautics and Space Administration, 1991.

*Primary Examiner*—Ian J. Lobo
*Attorney, Agent, or Firm*—Arnold, White & Durkee

[57] ABSTRACT

A weak Hamiltonian finite element method is used for iterative computation of missile guidance acceleration commands for maximizing a missile's terminal velocity while satisfying control authority limits and terminal attitude constraints. The guidance acceleration commands include commands for controlling the angle of attack ($\alpha$) and the bank angle ($\phi$) of the missile. The angle of attack ($\alpha$) and bank angle ($\phi$) are related to a set of virtual control variables selected to avoid convergence problems when the angle of attack is approximately zero. The preferred control variables are $\beta_2$ and $\beta_3$ such that $\beta_2 = \cos\phi\tan\alpha$ and $\beta_3 = \sin\phi\tan\alpha$. Iterative convergence is facilitated when control inequality constraint parameters are reached by adjusting iterative solutions between iterations toward satisfaction of the constraints. An approximation to an optimal trajectory is calculated at each guidance cycle during missile flight using data which are revised during each guidance cycle. The revised data include current position data for the target and the current position for the missile. The revised data are taken from the most reliable source currently available, such as on-board target-seeking radar when the target-seeking radar is locked onto the target, uplink data from ground or airborne tracking radar when an uplink is operational, or inertial guidance data. Extracted from the optimal trajectory is an optimal acceleration command for optimally controlling the angle of attack and bank angle of the missile.

33 Claims, 7 Drawing Sheets

REAL TIME MISSILE GUIDANCE SYSTEM

BACKGROUND OF THE INVENTION

A. Field of the Invention

This invention relates to missile guidance, and more particularly to real-time computation of missile guidance commands for optimal guidance of the missile.

B. Description of the Related Art

1. General Theoretical Art a. Calculus of Variations

The basic objective of the calculus of variations is to find the unknown function which will locate an extremum for a definite integral. Ordinary calculus locates the extremum for a function of one or more variables. For example:

$$I = V[thr,z,x,y,u] \quad \text{(Equation 1)}$$

is a velocity function. This function varies with the positions x,y,z, the thrust (thr) and the control variable u. To find the extremum of the velocity, the first variation of the velocity equation is used:

$$\delta V = \frac{\partial V}{\partial x}\delta x + \frac{\partial V}{\partial y}\delta y + \frac{\partial V}{\partial z}\delta z + \frac{\partial V}{\partial thr}\delta thr + \frac{\partial V}{\partial u}\delta u. \quad \text{(Equation 2)}$$

Following it has been shown that the aforementioned variational relation simplifies to the following set of equations:

$$\frac{\partial V}{\partial x} = 0, \quad \text{(Equation 3)}$$

$$\frac{\partial V}{\partial y} = 0,$$

$$\frac{\partial V}{\partial z} = 0,$$

$$\frac{\partial V}{\partial thr} = 0,$$

$$\frac{\partial V}{\partial u} = 0.$$

The variables which solve these equations define an extremum for velocity.

As noted earlier, it is the extremum of a definite integral which is formally in the domain of the calculus of variations. Using another function for velocity provides the example:

$$I = \int_{t_o}^{tf} V[h_1(t), h_2(t), \ldots h_1'(t), h_2'(t), \ldots ,t]dt. \quad \text{(Equation 4)}$$

In lieu of an extremum for a function, an extremum for a definite integral is found. And in lieu of finding the appropriate variables, the appropriate functions (h) are found. It has been shown that the necessary and sufficient condition for the solution to this type of extremum problem can be the solution of the Euler-Lagrange equations:

$$\frac{d}{dt}\left(\frac{\partial V}{\partial h_i'}\right) - \frac{\partial V}{\partial h_i} = 0 \quad \text{(Equation 5)}$$

The Euler-Lagrange equations are obtained by setting the "first variation" of the integral in Equation 4 to zero. The first variation is found by varying each of the functions $h_i(x)$ by an amount $\epsilon_i u_i(x)$ where $\epsilon_i$ is an arbitrary constant independent of x and $h_i(x)$, and $u_i(x)$ denotes any arbitrary function of x which is independent of $\epsilon_i$. Then the integral $I + \delta I$ is defined by:

$$I + \delta I = \int_{t_o}^{tf} V[h_i(t) + \epsilon_i u_i(t), \ldots, h_i'(t) + \epsilon_i u_i'(t), \ldots ,t]dt. \quad \text{(Equation 6)}$$

Upon solving for $\delta I$ to obtain a power series expansion of $\delta I$ in terms of powers of $\epsilon_i$, the "first variation" is the coefficient of the term for $\epsilon_i$ to the first power.

It is still necessary, for the problems of the type in optimal control, to solve a variational problem with auxiliary conditions. Now consider that the functions $h_i$ are not independent but restricted by some auxiliary conditions. Initially we considered velocity as a function of several variables x, y, z, thr and u. In solving the definite integral we allowed the integral of velocity to be several functions of one variable t. Now we will consider a system composed of several functions of several variables. The auxiliary system functions will be portrayed as $f_i$, with the variables as $x_j$ and t, creating the set of equations:

$$f_i(x_j,t) = 0, (i = 1,m; j = 1,n), \quad \text{(Equation 7)}$$

with $V[h_i(x_j,t)]$ as before. The auxiliary condition on the integrand creates a problem when the system functions are not known to be independent. As an expletive, if the system functions were independent, the independent equations could be expressed under separate integrals as follows:

$$I_i = \int_{t_o}^{tf} f_i(x_j,t)dt, (i = 1,m) \text{ and} \quad \text{(Equation 8)}$$

$$I_p = \int_{t_o}^{tf} V(x_j,t)dt, (j = 1,n).$$

From this set of equations would follow m+1 independent Euler-Lagrange equations. However, since it is not known that the functions are independent, knowledge of the other relationships is required. Using a Lagrange multiplier, the previously assumed independent equations may be expressed as dependent equations under the same integral as:

$$\delta I = \int_{t_o}^{tf} (\delta V + \lambda_1 \delta f_1 + \ldots \lambda_m \delta f_m)dt = 0. \quad \text{(Equation 9)}$$

A solution set utilizing the Euler-Lagrange equations can be shown to be:

$$\frac{\partial V}{\partial x_j} - \frac{d}{dt}\frac{\partial V}{\partial \dot{x}_j} + \lambda_1 \frac{\partial f_1}{\partial x_j} + \ldots + \lambda_m \frac{\partial f_m}{\partial x_j} = 0. \quad \text{(Equation 10)}$$

An alternative methodology to the Euler-Lagrange technique for solution to the variational problem with auxiliary conditions is the Finite Element Method. This alternative methodology is a key element in making optimal missile guidance "viably eligible" for real-time processing.

b. Finite Element Method (FEM)

Given the integral:

$$\int_{t_o}^{t_f} f(x,t)dt \qquad \text{(Equation 11)}$$

The time intervals can be broken up into N elements with a normalized elemental time definition of:

$$\tau_i = \frac{t - t_i}{t_{i+1} - t_i}, (i = 1, N - 1). \qquad \text{(Equation 12)}$$

As an example, the aforementioned equation using a trapezoidal integration scheme becomes:

$$\sum_{i=1}^{N-1} \frac{\Delta t}{2} [f(x_{i+1}, \tau_{i+1}) - f(x_i, \tau_i)], \qquad \text{(Equation 13)}$$

and are of a similar nature to the forthcoming equations used in the weak Hamitonian method of optimal missile guidance. The finite discretization appears similar to trapezoidal integration because of the selection of the shape functions.

2. Application Specific Art a. Missile Guidance

Missiles are rocket-motor-boosted vehicles that are designed to fly pilotless from a launch position to a desired target position. Various techniques have been used to guide a missile depending upon the launch and target positions and the operational characteristics of the missile.

A first class of techniques uses an external processor for performing computations to derive guidance commands for a missile. The external processor is located on the ground or in an airborne launch vehicle. The guidance commands are transmitted from the external processor to the missile via a radio frequency or laser uplink communication path. In response to the transmitted guidance commands, onboard instruments guide the missile.

A second class of techniques uses computations that are performed onboard the missile. Inputs for such onboard computations may come from instruments carried onboard the missile itself or from signals transmitted to the missile from external sources.

Generally, instruments carried in a missile for performing onboard guidance include inertial devices that sense body accelerations and rotational rates with respect to three orthogonal axes. These inertial measurements provide position, velocity, and attitude information to a programmed digital processor unit that computes the guidance commands for the missile.

Optimal guidance of a missile involves guiding the missile to optimize a preselected performance function (J) subject to certain constraints.

The real-time control of the missile involves the additional problem of determining control values as a function of time in order to guide the missile along a trajectory that will optimize the performance function J subject to certain inequality constraints on the control variables. An inequality constraint is a constraint that is an inequality. In other words, an inequality constraint is a prescribed condition that one quantity is less than, less than or equal to, greater than, or greater than or equal to another quantity. An inequality constraint function is a function that defines an inequality constraint. For a missile, the control variables include the angular acceleration of the missile, up to certain maximum values. For a solid-fueled rocket, the thrust generally is not controlled, although the thrust may be controlled for a liquid fueled missile, up to a certain maximum value.

b. Weak Hamiltonian Optimization Method (WHOA)

For solving the missile control problem, the dynamic state of the missile is represented by E state variables $x_j(t)$ satisfying E "state equations" that are the first-order differential equations:

$$\frac{dx_j}{dt} = f_j(x_1, x_2, \ldots, x_n; u_1, u_2, \ldots, u_r) \qquad \text{(Equation 14)}$$

The n state equations are specific formulations of the accessory conditions in equation (3) above, in which the time t has been selected as the independent variable. The state variables $x_j(t)$ typically include the missile's coordinates (x, y, z), angular orientation, linear velocity, angular velocity, and mass. The functions $u_1(t)$, $u_2(t)$, . . . , $u_r(t)$ are the control variables. The control problem can be expressed as the problem of finding the control variables that maximize or minimize the definite integral $$J = \int_{t_o}^{t_f} f[x_1, x_2, \ldots, x_n, u_1, u_2, \ldots, u_r]dt. \qquad \text{(Equation 15)}$$

In general, the final time $t_f$ will be an unknown.

Real-time control of the missile requires a numerical method of solving the equations subject to suitable boundary conditions. Due to limited data processing capability when a numerical solution is computed in the missile, a finite-element procedure is used in which the control variables are iteratively computed for a time $t+\Delta t$ based on conditions existing at a time t. The computation should give a finite approximation of an optimal solution. Additionally, the computation should be "unconditionally stable."

A computational technique having these desirable properties is proposed in Hodges et al., "Weak Hamiltonian Finite Element Method for Optimal Control Problems," *Journal of Guidance Control, and Dynamics*, Vol. 14, No. 1, January–February 1991, American Institute of Aeronautics and Astronautics, pp. 148–156,incorporated herein by reference; and Bless et al., "Finite Element Solution of Optimal Control Problems with Inequality Constraints," Proceedings of the 1990 American Control Conference, San Diego, Calif., May 23–25, 1990, Volume 1, American Automatic Control Conference, pp. 242–247, incorporated herein by reference.

The weak Hamiltonian method is a combination of optimal control theory and finite element discretization with weakly coupled boundary conditions. Permitting a finite element solution to the first variation, the performance function (J) is formulated as:

$$J = \qquad \text{(Equation 16)}$$

$$\int_{t_o}^{t_f} [L + \lambda^T(f - \dot{x}) + \mu^T(G + K^2)]dt + \Phi\Big|_{t_o}^{t_f} + \alpha^T(x - \hat{x})\Big|_{t_o}^{t_f}$$

where:

L is an integrand component of the performance function;

λ is a matrix of unknown Lagrangian multiplier functions for adjoining the system state equations;

T denotes the matrix transpose operation;

f is a matrix of system state equations;

ẋ is a matrix of the state rates with respect to time;

μ is a matrix of unknown Lagrangian multiplier functions for adjoining the control constraints;

G is a matrix of control inequality constraint functions G(x,u,t) for control functions u(t) such that $G \leq 0$;

K is a matrix of slack variables such that $G+k^2=0$; $\Phi \equiv \phi + v^T \Psi$ where φ is a performance function of the states and time, defined only at the initial and final times $t_o$ and $t_f$;

υ is a matrix of unknown discrete Lagrangian multipliers defined only at the initial and final times $t_o$ and $t_f$ for adjoining boundary condition constraints;

Ψ is a matrix of boundary condition constraints imposed at the initial and final times $t_o$ and $t_f$;

∝ is a matrix of unknown discrete Lagrangian boundary condition multipliers for natural coupling of finite element values to finite element nodes of the states at the initial and final times $t_o$ and $t_f$; and x̂ is a matrix of finite element nodes of the states at the initial and final times $t_o$ and $t_f$, such that x|$t_o$ is the limit of x(t) as $t \rightarrow t_o$;

x|$t_f$ is the limit of x(t) as $t \rightarrow t_f$;

x̂|$t_o$ is x($t_o$); and x̂|$t_f$ is x($t_f$).

As described in Hodges et al. and Bless et al. cited above, the first variation is taken of the performance function (J) of Equation 16. The first variation has an ẋ term, which is then integrated by parts. The boundary conditions are placed in weak form, and the first variation is set to zero, giving the following solution for a minimum or maximum to the performance index J of Equation 16:

$$\int_{t_o}^{t_f} \Bigg\{ \delta \dot{x}^T \lambda - \qquad\qquad\qquad\qquad\qquad \text{(Equation 17)}$$

$$\delta x^T \left[ \left( \frac{\partial L}{\partial x} \right)^T + \left( \frac{\partial f}{\partial x} \right)^T \lambda + \left( \frac{\partial G}{\partial x} \right)^T \mu \right] -$$

$$\delta u^T \left[ \left( \frac{\partial L}{\partial u} \right)^T + \left( \frac{\partial f}{\partial u} \right)^T \lambda + \left( \frac{\partial G}{\partial u} \right)^T \mu \right] - \delta \lambda^T x -$$

$$\delta \lambda^T f - \delta \mu^T (K^2 + G) - (\delta K)^T (2K\mu) \Bigg\} dt -$$

$$\delta t_f \left[ L + \lambda^T f + \frac{\partial \phi}{\partial t} + v^T \frac{\partial \psi}{\partial t} + \mu^T (K^2 + G) \right]_{t_f} -$$

$$\delta v^T \psi \bigg|_{t_f} - \delta x_f^T \hat{\lambda}_f + \delta x_o^T \hat{\lambda}_o + \delta \hat{\lambda}_f^T \hat{x}_f - \delta \hat{\lambda}_o^T \hat{x}_o = 0$$

Equation 17 is the governing equation for the weak Hamiltonian method with control constraints. An important advantage of the weak Hamiltonian method is that time derivatives of the states and co-states do not appear in Equation 17. This facilitates the simplistic choice for the shape functions which leads to the simplified integration which looks like a trapezoidal integration scheme.

Equation 17 is solved by performing finite element discretization. The integral in Equation 17 is broken into N integrals, with each of the N integrals being an integral over one of the N finite elements, respectively from $t = t_o$ to $t = t_f$. Constant shape functions are used for u, δu, x, λ, μ, and K, and linear shape functions are used for δx, δλ, δμ, and δK. The integral over each element can therefore be evaluated by inspection, and the resulting integral in Equation 17 becomes a summation over N elements. Solutions are found for only discrete midpoint values for the controls u(t). The boundaries between the finite elements are referred to as nodes, which occur at $t = \hat{t}_i$. When there are no state discontinuities, the nodal values of the shape functions in the neighboring elements cancel each other in the summation. When there are state discontinuities, the nodal values of the shape functions in the neighboring elements do not necessarily cancel each other in the summation. This problem is conveniently solved by treating the state discontinuity as a pair of boundary conditions at the node, one boundary condition for the integral or summation for a time less than but approaching $\hat{t}_i$ in the limit, and the other boundary condition for the integral or summation greater than but approaching $\hat{t}_i$ in the limit. In other words, the time line and the performance integral in Equation 9 is broken into two different "phases" by the state discontinuity, and a respective discrete Lagrangian multiplier is introduced for adjoining each of the two boundary conditions into the performance function (J).

The summation over N elements becomes a system of simultaneous algebraic equations. In general, 2n of the 4n endpoint values for the states and corresponding Lagrangian multipliers ($\hat{x}_o$, $\hat{x}_f$, $\hat{\lambda}_o$, $\hat{\lambda}_f$) must be specified. The initial conditions ($\hat{x}_o$) are known in accordance with physical constraints. Also, $\hat{\lambda}_f$ can be specified in terms of other unknowns, because the admissible variations of the states must be continuous at the initial and final times:

$$(\Delta x - \Delta \hat{x})\Big|_{t_o}^{t_f} = 0 \qquad \text{(Equation 18)}$$

$$\hat{\lambda}_o = \frac{\partial \Phi}{\partial t}\bigg|_{t_o} \qquad \text{(Equation 19)}$$

$$\hat{\lambda}_f = \frac{\partial \Phi}{\partial t}\bigg|_{t_f} \qquad \text{(Equation 20)}$$

Therefore, the system of algebraic equations includes as many equations as unknowns, and it can be solved for the control variables.

Normally, the system of equations can be solved by expressing the Jacobian explicitly and using a Newton-Raphson solution procedure. The Newton-Raphson solution procedure is described, for example, on pages 43–44 of the *CRC Handbook of Mathematical Tables*, 1980, Chemical Rubber Company Press Inc., Boca Raton, Fla. Let the system of algebraic equations be designated as $E_i(X) = 0$, where X is a vector of unknowns. The Newton-Raphson solution procedure is an iterative method that starts with a trial solution $X^{[0]}$, and obtains successive approximations $X^{[j+1]}$ by solving the simultaneous linear equations $$E_i(X^{[j]}) + \sum_{k=1}^{n} \left[\frac{\partial E_i}{\partial X_k}\right]_{X^{[j]}} (X_k^{[j+1]} - X_k^{[j]}) = 0 \text{ for } i = 1 \text{ to } n \quad \text{(Equation 21)}$$

Equation 21 can be written as a matrix equation $$E(X^{[j]}) + [J] (X_k^{[j+1]} - X_k^{[j]}) = 0 \quad \text{(Equation 22)}$$

where [J] is the so-called Jacobian matrix having the elements that are the partial derivatives $$\frac{\partial E_i}{\partial X_k}$$

evaluated at $X_k = X_k^{[j]}$. Equation 22 can be solved by inverting the Jacobian matrix, to obtain the iterative equation:

$$X_k^{[j+1]} = X_k^{[j]} - [J]^{-1} E(X^{[j]}) \quad \text{(Equation 23)}$$

A sparse matrix solver can be used as coded in Duff, I.S., Harwell Subroutine Library, Computer Sciences and Systems Division, Harwell Laboratory, Oxfordshire, England, February 1988, Chapter M. To solve for the solution at the first element, an initial guess can be made based on the initial conditions. An initial guess for successive elements can be based upon the solutions for a number of previous elements. In general, the iterations of the Newton-Raphson procedure converge rapidly, so that a large number of elements can be solved with a very efficient run-time on a computer.

Successful flight of a missile to its target and the missile's arrival at the target with a desired attitude and velocity depends upon the nature of the guidance procedure and its mechanization. Current guidance procedures and their mechanizations have failed to achieve the potential success suggested by optimal guidance and control theory. This results primarily from approximations and mathematical truncations imposed in order to enable completion of the guidance computational task in an acceptable time frame.

The weak Hamiltonian finite element method used for the basis of this invention failed to robustly converge upon an optimal solution when put into practice, as have all of the published schemes for real time optimal guidance. In particular the method as published has been subject to convergence problems when the control variables enter certain ranges. When the control values either enter around zero or close to a control boundary, the published method fails to converge upon a solution.

SUMMARY OF THE INVENTION

This invention is a real-time missile guidance system and method that periodically computes guidance control commands. The guidance control commands generate a field of extrema for maximizing the missile's terminal velocity while satisfying control authority limits and terminal attitude constraints. The guidance control commands include commands for controlling the angle of attack ($\alpha$) and the bank angle ($\phi$) of the missile.

In accordance with a first aspect of the invention, at least two control variables, $\beta_2$ and $\beta_3$, are selected which specify the angle of attack ($\alpha$) and the bank angle ($\phi$), but which have definite and limited values when specifying an angle-of-attack ($\alpha$) of approximately zero. The selection of $\beta_2$ and $\beta_3$ as virtual control variables is made in lieu of selecting the angle of attack ($\alpha$) and bank angle ($\phi$) as virtual control variables. The transformation between the control variables $\beta_2$ and $\beta_3$, and the angle of attack ($\alpha$) and the bank angle ($\phi$), avoids convergence difficulties when specifying an angle of attack ($\alpha$) in the vicinity of zero.

In a preferred embodiment, the control variables are computed in accordance with a weak Hamiltonian method of optimizing the missile trajectory, and the control variables are selected to obtain a formulation that avoids negative eigenvalues, when the angle of attack is near zero in a partial derivative of the "Hamiltonian" matrix, corresponding to the performance function (J), with respect to the control variables. The preferred set of control variables includes $\beta_2$ and $\beta_3$ such that $\beta_2 = \cos\phi \tan\alpha$ and $\beta_3 = \sin\phi \tan\alpha$. Because both $\beta_2$ and $\beta_3$ are proportional to $\tan\alpha$, it is also desirable to define an intermediate variable $\beta = \tan\alpha$, and to express the aerodynamic tables, which are conventionally a function of alpha and Mach number, as a function of $\beta$ and Mach number.

In accordance with another aspect of the invention, the guidance commands are computed by an iterative Newton-Raphson procedure, and convergence is facilitated when control inequality constraint parameters are reached by modifying iterative solutions between iterations so that the iterative solutions satisfy the inequality constraints while facilitating the movement of the controls on to and off of the control boundaries. Moreover, when it is known that the solution must fall within certain limits, and when it is known that certain parameters have either positive or negative values, corresponding solution constraints can be defined for the purpose of accelerating convergence with this technique. A solution constraint, for example, can be imposed on the time of flight in order to accelerate convergence by guaranteeing positive time steps of at least a certain magnitude.

In accordance with a further aspect of the invention, an optimal trajectory is calculated at each computational cycle during missile flight using data that are revised during each computational cycle. The revised data include current position data for the target and the current position for the missile. Airborne initialization of each computational cycle is permitted to accommodate externally derived and uplinked data. The revised data are taken from the most reliable source currently available, such as on-board target-seeking radar when the target-seeking radar is locked onto the target, uplink data from ground or airborne tracking radar when an uplink is operational, or inertial guidance data.

BRIEF DESCRIPTION OF THE DRAWINGS

Other objects and advantages of the invention will become apparent upon reading the following detailed description and upon reference to the drawings, in which.

While the invention will be described in connection with a certain preferred embodiment, it is not intended to limit the invention to this particular embodiment. On the contrary, it is intended for the invention to include all modifications, alternatives, and equivalent arrangements as may be included within the scope of the appended claims.

DETAILED DESCRIPTION OF THE PREFERRED EMBODIMENT

Figure 1:
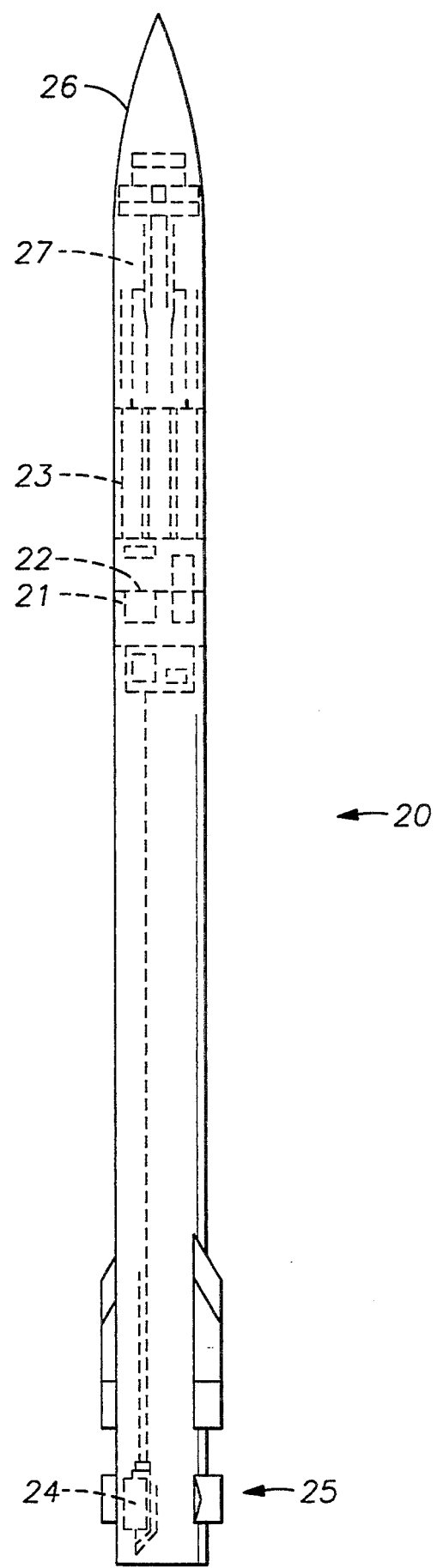
FIG. 1 is a plan view of a tactical missile incorporating the present invention.
Figure 7:
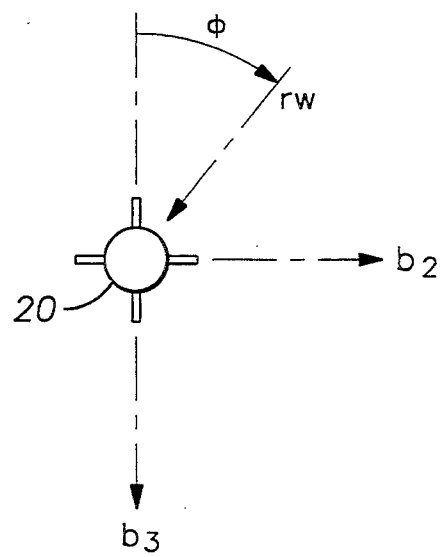
FIG. 7 is a schematic diagram illustrating the bank angle of the missile.

Turning now to the drawings, there is shown in FIG. 1 a plan view of a tactical missile generally designated 20. Various internal components of the missile 20 are shown in phantom lines. For controlling the missile, the missile has a guidance processing unit 21 (GPU), which is a digital computer 21 that will be further described below with reference to FIG. 2. For determining the position and angular orientation of the missile, the missile has an inertial measurement unit 22 (IMU) including a respective gyro or angular rate sensor for sensing angular rotation of the missile about each of the three orthogonal (x,y,z) axes of the missile as shown in FIG. 7, and a respective accelerometer for sensing linear acceleration of the missile along each of the (x,y,z) axes of the missile. For adjusting the attitude or angular orientation of the missile, the missile has an attitude control system 23 (ACS) and an aerodynamic maneuvering system 24 (AMS). The aerodynamic maneuvering system 24 adjusts the angular orientation of fins 25 at the tail end of the missile, which will adjust the attitude of the missile when the missile is at low altitude. The attitude control system 23 includes lateral-thrusting rocket motors near the nose 26 of the missile, which can adjust the attitude of the missile even at high altitude. For seeking the target, the missile has a seeker 27 built into the nose of the missile. Depending on the desired target and the size of the missile 20, the seeker 27 may use radar, laser, infra-red, or optical imaging techniques for seeking a target.

Figure 2:
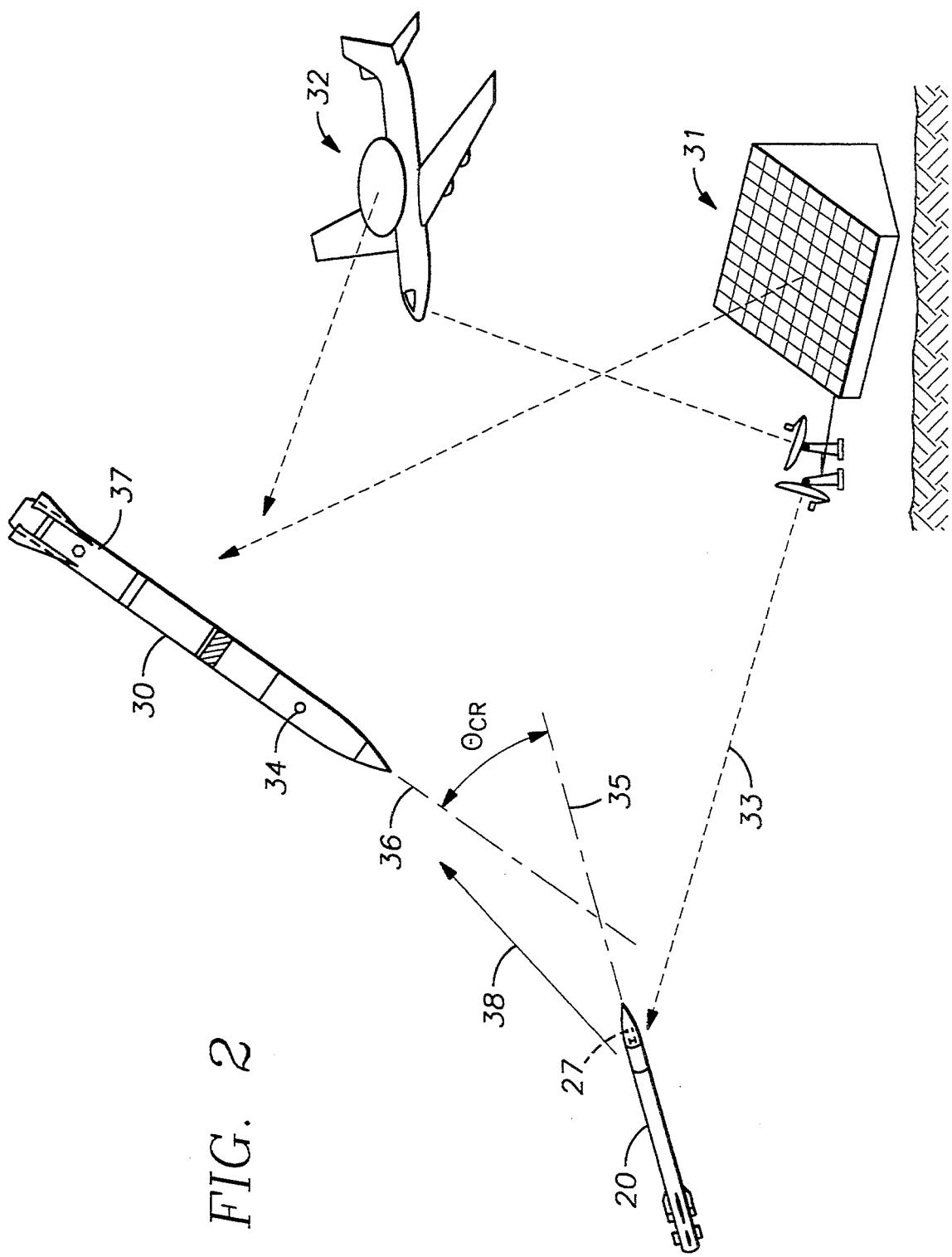
FIG. 2 is a schematic diagram illustrating the use of the tactical missile of FIG. 1 for air defense.

FIG. 2 illustrates the use of the tactical missile 20 for seeking and intercepting a target 30, such as a ballistic missile. The ballistic missile 30 is initially detected and tracked by ground radar 31 or airborne radar 32. When the tactical missile 20 is launched, it is programmed with the coordinates of a predicted point of interception. To intercept the ballistic missile 30, however, it is necessary for the tactical missile 20 to be guided in real time so that the trajectory of the tactical missile intersects the trajectory of the ballistic missile. The seeker 27 of the tactical missile 20 must eventually acquire or lock onto the ballistic missile to ensure intersection. Because the seeker 27 has a limited range and limited field-of-view, successful acquisition by the seeker can be facilitated by initially guiding the missile in response to tracking data transmitted from the ground radar 21 or the airborne radar 32 before acquisition by the seeker. The tracking data are transmitted via laser or radio along an uplink path 33.

The tactical missile 20 should have a maximum velocity at the time of interception, and should have a predetermined attitude at interception in order to maximize damage to the ballistic missile 30. The predetermined attitude at interception is specified by a desired crossing angle $\theta_{CR}$ between the longitudinal axis 35 of the tactical missile 20 and the longitudinal axis 36 of the ballistic missile. The tactical missile 20 should impact the ballistic missile 30, for example, at a desired aim point 34 near the warhead of the ballistic missile. This desired aim point 34 is generally different from the radar centroid 35 as viewed by the seeker 27. In general, the field-of-view of the seeker 27 is directed along a line-of-sight that is the same as the velocity 38 of the tactical missile 20 relative to the tactical missile 30.

The present invention enables guidance of the missile to a terminal geometry condition where the crossing angle $\theta_{CR}$ can be specified with respect to two axes, while maximizing the missile's terminal velocity. For targets, such as airplanes, that are not approximately symmetrical about their longitudinal axis, the crossing angle $\theta_{CR}$ could be specified by two values, such as a total angle component $\theta_{CR\alpha}$ giving the magnitude of the total angle between the longitudinal axis 35 of the tactical missile 20 and the longitudinal axis of the target, and an orientation component $\theta CR_\phi$ specifying the crossing angle in a plane perpendicular to the longitudinal axis of the target and with respect to a lateral axis of the target. For a target such as an airplane, for example, the lateral axis of the target could be assumed to be a vertical axis with respect to the Earth.

Figure 3:
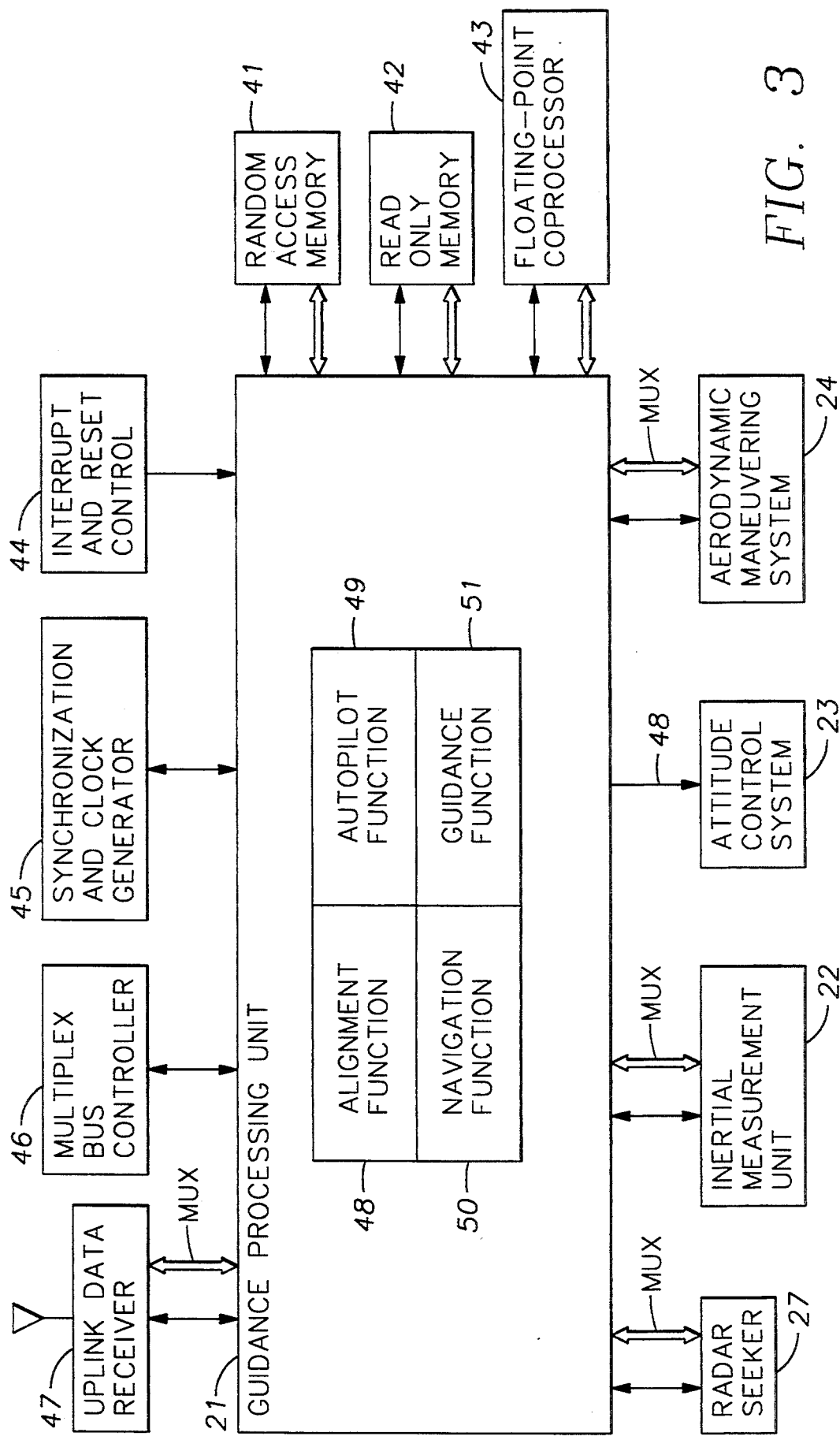
FIG. 3 is a block diagram of a guidance processor and its interconnection to various systems in the tactical missile of FIG. 1.

Turning now to FIG. 3, there is shown a block diagram of the guidance processing unit 21 and its interconnection to other components and systems of the tactical missile (20 in FIG. 1). The guidance processing unit 21 is a high-speed digital processor having an internal floating-point math unit. It operates with external random access memory 41, external read-only memory 42, an external floating-point coprocessor 43, interrupt and reset control circuitry 44, synchronization and clock generator circuitry 45, and a multiplex bus controller 46. The multiplex bus controller controls a multiplex bus (MUX) for parallel input/output of the guidance processing unit. External interfaces to other missile subsystems are accomplished through both discrete signal interconnects and via the multiplex data bus. The multiplex bus interfaces the guidance processing unit to the radar seeker 27, the inertial measurement unit 22, the aerodynamic maneuvering system 24, and an uplink data receiver 47. The guidance processing unit 21 is interfaced to the attitude control system 23 via a serial link 48.

The guidance processing unit 21 is programmed to perform a number of time-shared functions. These functions include an alignment function 48, an autopilot function 49, a navigation function 50, and a guidance function 51. The alignment function 48 involves sensing and controlling the attitude and roll of the missile 20, as will be further described below with reference to FIG. 4. The autopilot function 49 maintains the velocity vector of the missile 20 along a specified direction by issuing angular acceleration commands to the alignment function. The navigation function 50 keeps track of the current position of the missile 20 and changes the specified heading of the missile along a specified trajectory. The guidance function 50 calculates in real time an optimal trajectory to a target based on data available during flight of the missile.

Figure 4:
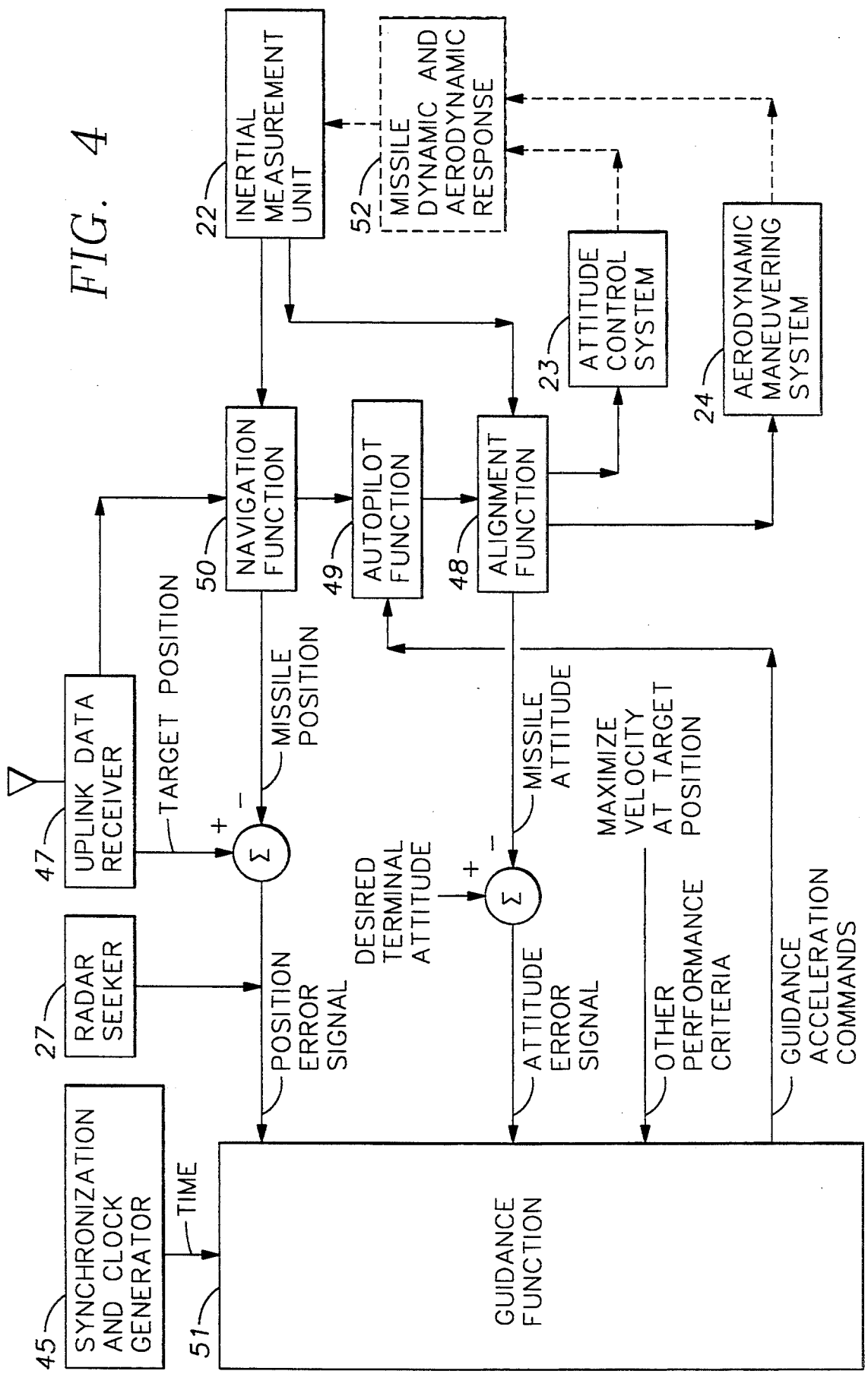
FIG. 4 is a schematic diagram of the guidance system for the tactical missile of FIG. 1, including a dynamic model of the missile.

Turning now to FIG. 4, there is shown a schematic diagram that more particularly illustrates the relation of the guidance function 51 with the other functions and systems in the tactical missile. The guidance function 51 is responsive to time as indicated by the synchronization and clock generator circuits 45. The guidance function 51 is also responsive to a position error signal as indicated by the radar seeker 27 when the seeker 27 has acquired a definite lock on the target, or as indicated by the difference between the target position, as indicated by tracking data received by the uplink data receiver 47, and the position of the tactical missile, as maintained by the navigation function. The target position at desired intercept and the desired missile attitude at intercept are either pre-computed prior to launch and downloaded to the missile's guidance processing unit prior to launch or provided in-flight via an uplink message received by the uplink data receiver 47.

The navigation function 50 is initially programmed with the position of the launch site, and after launch, the navigation function updates the initial position by integration of linear acceleration signals from the inertial measurement unit 22. The navigation function may adjust this position computation with tracking data received by the uplink data receiver 47, to coincide with the position of the missile as determined by the ground or airborne tracking radar (31 and 32 in FIG. 2).

The guidance function is responsive to an attitude error signal that represents the difference between a desired terminal attitude at target interception, and the missile attitude as indicated by the alignment function. The missile attitude is conveniently represented by two attitude angles ($\gamma$, $\Psi$). The first attitude angle $\gamma$, for example, represents a vertical angle from a horizontal inertial plane to the missile's velocity vector. The second attitude angle $\Psi$, for example, represents a horizontal angle measured from North to the projection of the missile's velocity vector on the horizontal plane.

The guidance function 51 is responsive to other performance criteria. The performance criteria may specify that the guidance function 51 is to maximize velocity at the point of interception with the target.

The guidance function 51 computes guidance acceleration commands in order to approximate an optimal trajectory. The acceleration commands, for example, specify linear acceleration in g's along each of body axes ($b_1$, $b_2$, $b_3$) of the missile, as defined in FIG. 6 below. The autopilot 49 is responsive to these linear acceleration commands, and specifies changes to the bank angle ($\phi$) and angle of attack ($\alpha$) of the missile. The bank angle ($\phi$) and angle of attack ($\alpha$) are further discussed below with reference to FIGS. 6 and 7. The alignment function 48 operates the attitude control system 23 or the aerodynamic maneuvering system 24 to change the bank angle ($\phi$) and angle of attack ($\alpha$) of the missile in accordance with the commands from the autopilot 49. The actual change in attitude of the missile is sensed by the inertial measurement unit 22 and indicated to the alignment function, so that the alignment function may use feedback control to compensate for the missile's dynamic and aerodynamic response 52.

The missile's dynamic and aerodynamic response 52 to the reactions of the attitude control system 23 or the aerodynamic maneuvering system 24 result in the missile flying to a new position with an altered attitude and velocity. Linear accelerometers (not shown) and gyros (not shown) sensing angular rates of change in the inertial measurement unit 22 provide measurement data of the missile's new state and enable feedback information for comparison with desired values and the initiation of the next computational cycle in the missile GPU.

The guidance function 51 is restricted by at least one control limit or inequality constraint. For aerodynamic stability, for example, the "angle of attack ($\alpha$)" of the missile must not exceed a predetermined value, such as 20 degrees. In the system of FIG. 4, the guidance function does not receive as an input the actual angle of attack, nor does the guidance function directly specify as an output what the angle of attack ($\alpha$) should be. Instead, the guidance function 51 has a mathematical model of the aerodynamic characteristics of the missile. The guidance function can therefore determine, for any potential trajectory, whether the angle of attack ($\alpha$) will exceed its control limit. Consequently, the guidance function will not produce acceleration commands that would require the angle of attack ($\alpha$) to exceed its control limit.

The guidance function 51 periodically computes guidance acceleration commands. An acceleration command for each of the three missile body axes is computed during each computational cycle. During each cycle, a solution vector X is computed iteratively by the Newton-Raphson solution procedure of Equation 23 above. The solution vector X represents a complete trajectory from the present position of the missile to the predicted position of the target at the time of interception of the target by the missile.

Preferably the system of equations E(X) in Equation 23 above are algebraic equations result from a discretization of Equation 17, above, that computes the integral in Equation 17 by a Finite Element Method. This system of algebraic equations will be listed below, but to understand the listing, it is necessary to first understand the notation employed in the equations. The equations will use the Einstein summation representation, wherein each permutation of the indices represents one equation in the system. The equations are written to represent a system for any number of nodes, and any number of phases, or groups, of consecutive nodes.

Figure 5:
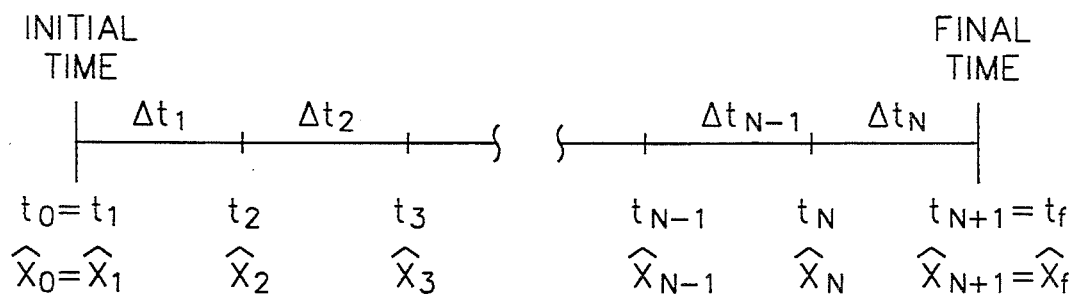
FIG. 5 is a time line illustrating the finite elements and nodes used in the derivation of the system of algebraic equations for optimizing a performance function (J) in accordance with the weak Hamiltonian finite-element method.

As shown in FIG. 5, the time interval from an initial time $t_o$ to a final time $t_f$ is broken into N discrete elements $\Delta t_1$ to $\Delta t_N$. The endpoints of the elements represent nodes at $t_{o=t1}$ to $t_{N+1}=t_f$. The value of a parameter ($\hat{x}$) at a node will be represented as (x) The value of a parameter (x) at a mid-point between a pair of neighboring nodes will be represented as ($\bar{x}$). Moreover, the parameter will be indexed as follows:

| | |
|---|---|
| $\hat{x}$ phase state node | Represents the finite-element node condition for parameter x for a given state, phase and node. |
| $\bar{x}$ phase state element | Represents the mid-point condition for parameter x for a given state, phase, and element. |

Examples:

| | |
|---|---|
| $\hat{x}_{23}^2$ | Represents the 3rd state in phase 2 for the 2nd node. |
| $x_{32}^1$ | Represents the 2nd state in phase 3 for the 1st element. |

With the above notation in mind, the preferred system of algebraic equations is:

$$\hat{\bar{j}}{}^x_{1}k_1 + \bar{j}^x_{1}k_1 - \frac{\Delta t}{2}\bar{j}^j_1 = 0; \quad j = 1, \text{ number of phases } (nph) \quad k = 1, \text{ number of states } (ns) \tag{Equation 24-1}$$

$$\bar{j}^x_i - \frac{\Delta t}{2}\bar{j}^j_i k_i + \bar{j}^x_{i+1}k_{i+1} - \frac{\Delta t}{2}\bar{j}^j_{i+1}k_{i+1} = 0; \quad i = 1, \text{\# of elements in a phase} - 1\ (ne(j)-1) \tag{Equation 24-2}$$

$$\bar{j}^x_{ne(j)}k_{ne(j)} - \frac{\Delta t}{2}\bar{j}^j + \hat{j}^x_2 = 0 \tag{Equation 24-3}$$

$$\hat{\bar{j}}{}^\lambda_1 k_i - \bar{j}^\lambda_i k - \frac{\Delta t}{2}\left[\frac{\partial \bar{L}}{\partial \bar{x}}{}^{jk}_1 + \frac{\partial \bar{f}^T}{\partial \bar{x}}{}^{jk}_1 \bar{\lambda}^j_1 k_1 + \frac{\partial \bar{G}^T}{\partial \bar{x}}{}^{jk}_1 \bar{\mu}^j_1{}^2\right] = 0 \tag{Equation 24-4}$$

$$\bar{j}^\lambda_{i+1}k - \frac{\Delta t}{2}\left[\frac{\partial \bar{L}}{\partial \bar{x}}{}^{jk}_{i+1} + \frac{\partial \bar{f}^T}{\partial \bar{x}}{}^{jk}_{i+1} \bar{\lambda}^{jk}_{i+1} + \frac{\partial \bar{G}^T}{\partial \bar{x}}{}^{j}_{i+1}\bar{\mu}^2\right] = 0 \tag{Equation 24-5}$$

$$\bar{j}^\lambda_{ne(j)}k - \frac{\Delta t}{2}\left[\frac{\partial \bar{L}}{\partial \bar{x}}{}^{jk}_{ne(j)} + \frac{\partial \bar{f}^T}{\partial \bar{x}}{}^{jk}_{ne(j)}\bar{\lambda}^{jk}_{ne(j)} + \frac{\partial \bar{G}^T}{\partial \bar{x}}{}^{j}_{ne(j)}\bar{\mu}^{jk}_2\right] - \hat{\lambda} = 0 \tag{Equation 24-6}$$

$$\frac{\partial \bar{L}}{\partial \bar{u}}{}^{jm}_i + \frac{\partial \bar{f}_K}{\partial \bar{u}}{}^{jm}_i + \frac{\partial \bar{G}^T}{\partial \bar{u}}{}^{j}_i \bar{\mu}^j{}^2 = 0; \quad i = 1, \text{\# element in a phase } (ne(j)) \tag{Equation 24-7}$$

$$\frac{\partial \hat{L}}{\partial \hat{u}}{}^{jm}_i + \frac{\partial \hat{f}_K}{\partial \hat{u}}{}^{jm}_i + \frac{\partial \hat{G}^T}{\partial \hat{u}}{}^{j}_i \hat{\mu}^2 = 0; \quad i = 1,2 \tag{Equation 24-8}$$

$$\bar{G}^j_i + \bar{K}^2_j{}_i = 0 \tag{Equation 24-9}$$

$$\hat{G}^j_i + \hat{K}^2_j{}_i = 0 \tag{Equation 24-10}$$

$$2\bar{\mu}^j_i \bar{K}^j_i = 0 \tag{Equation 24-11}$$

$2\hat{\mu}_j \hat{K}_j = 0$ (Equation 24-12)

$i \quad i$ $\hat{j}^k_1 + \frac{\partial_j \phi_1}{\partial \hat{x}_k} + v^T \frac{\partial_k \Psi_j}{\partial \hat{x}_k} = 0$ (Equation 24-13)

$\quad 1 \quad j \quad j$
$\quad \quad 1 \quad 1$ $\hat{j}^k_2 + \frac{\partial_j \phi_2}{\partial \hat{x}_k} + v^T \frac{\partial_k \Psi_j}{\partial \hat{x}_k} = 0$ (Equation 24-14)

$\quad 2 \quad j \quad j$
$\quad \quad 2 \quad 2$ $j^\Psi = 0$ (Equation 24-15)

In accordance with an aspect of the present invention, the control variables ($u_k$) include a set of control variables functionally related to the angle of attack ($\alpha$) and bank angle ($\phi$) in such a way that convergence problems are avoided when the angle of attack is approximately zero. When the angle of attack ($\alpha$) and bank angle ($\phi$) are used as two of the control variables ($u_k$), there are convergence problems in the iterative solution procedure. These convergence problems arise when the angle of attack ($\alpha$) is approximately zero, because the bank angle ($\phi$) may assume any value when angle of attack ($\alpha$) is zero. To solve these convergence problems, at least two control variables are used that are related to the angle of attack ($\alpha$) and the bank angle ($\beta$) by a predefined mathematical transformation of variables such that the two control variables assume appropriate values for typical flight characteristics of the missile. Moreover, because the guidance function does not directly sense the actual values of the angle of attack ($\alpha$) or the bank angle ($\beta$), nor does the guidance function directly control the angle of attack ($\alpha$) or the bank angle ($\beta$), the two control variables related to the angle of attack ($\alpha$) and the bank angle ($\beta$) are more precisely referred to as "virtual" control variables.

Figure 6:
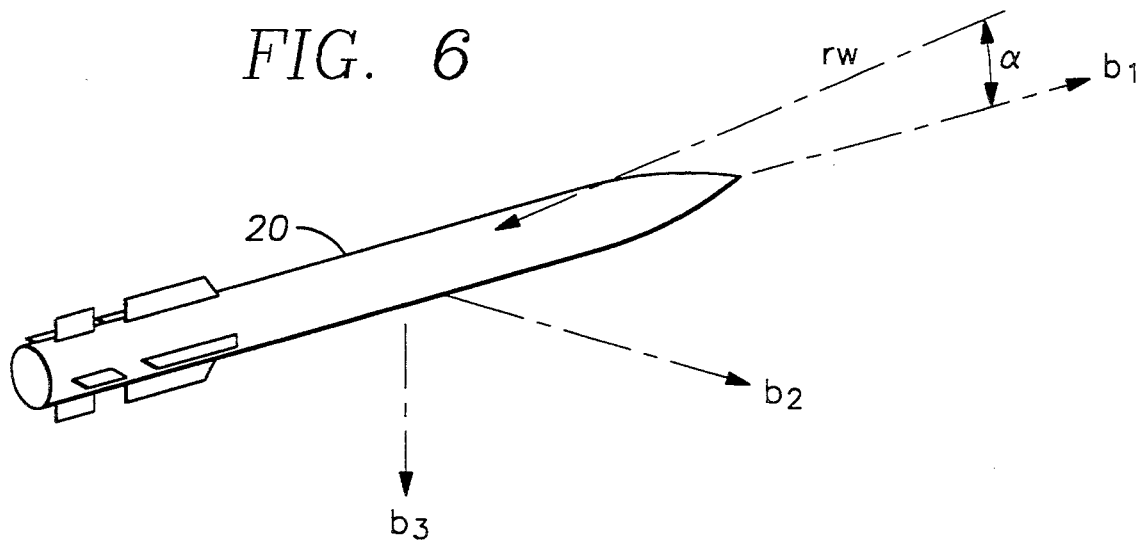
FIG. 6 is a schematic diagram illustrating body axes of the missile, a relative wind vector, and the angle of attack.

The angle of attack is shown in FIG. 6 in relation to the body axes ($b_1, b_2, b_3$) of the tactical missile 20. The $b_1$ body axis is the longitudinal axis of the missile 20. The angle of attack ($\alpha$) is defined as the total angle between the longitudinal axis ($b_1$) of the missile and the relative wind vector rw. The relative wind vector is the velocity of the wind relative to the missile. Therefore, when the velocity of the missile with respect to an inertial frame greatly exceeds the velocity of the wind with respect to an inertial frame, the relative wind vector will become approximately anti-parallel to the velocity vector of the missile, and the angle of attack ($\alpha$) will become relatively small.

The bank angle ($\phi$) is shown in FIG. 7. The bank angle ($\phi$) is the angle of the relative wind vector rw with respect to the $-b_1$ body axis of the missile 20.

The preferred set of control variables are $\beta_2$ and $\beta_3$ such that:

$$\alpha = \arctan \sqrt{\beta_2^2 + \beta_3^2}$$ (Equation 26)

$\phi = \arctan(\beta_3/\beta_2)$

The inverse transformation is:

$$\beta = \tan\alpha = \sqrt{\beta_2^2 + \beta_3^2}$$ (Equation 27)

$\beta_2 = \beta\cos\phi$
$\beta_3 = \beta\sin\phi$
$\phi = \arccos(\beta_2/\beta) = \arcsin(\beta_3/\beta)$ It is also convenient to define an intermediate variable $\beta$ such that:

$\beta_2 = \cos\phi\tan\alpha$ (Equation 25)
$\beta_3 = \sin\phi\tan\alpha$.

The control variables are used in the state equations of the missile, and in particular are related to forces in the equations of motion for the missile. The forces along the missile body axes are given by:

$$\bar{F}_{body} = \begin{bmatrix} \text{Thrust} - \text{Drag} \\ \text{Lift} \\ 0 \end{bmatrix}$$ (Equation 28)

It is convenient to define a 3×3 transformation matrix [CwB] between the wind frame and the missile body frame, and a 3×3 transformation matrix [CwI] between the wind frame and the local inertial frame. Then the forces originating in the inertial frame are due to the mass (m) of the missile and the acceleration (g) due to gravity:

$$\bar{F}_{gravity} = \begin{bmatrix} 0 \\ 0 \\ mg \end{bmatrix}$$ (Equation 29)

The forces in the wind frame are therefore given by:

$$\bar{F}_{wind} = [CwB]\,\bar{F}_{body} + [CwI]\,\bar{F}_{gravity}$$ (Equation 30)

The matrix [CwB] is a function $f(\alpha, 100)$ of the angle of attack $(\alpha)$ and the bank angle $(\phi)$ according to:

$$[CwB] = f(\alpha, \phi) \qquad \text{(Equation 31)}$$

Equation 24-7 and 24-8 above, however, can be satisfied with a negative eigenvalue for the optimality condition when $\alpha \approx 0$. The eigenvalues of the optimality condition are eigenvalues of the matrix $$\frac{\partial H_k}{\partial u_i \partial u_j} \quad \begin{array}{l} i = 1, \text{\# controls} \\ j = 1, \text{\# controls} \\ k = 1, \text{\# states} \end{array} \qquad \text{(Equation 32)}$$

where: $H = \lambda^T f + L + \mu^{2T} G$

A negative eigenvalue indicates that the solution converges upon a stationary point other than the desired extremum. Another formulation that has a negative eigenvalue is $[CwB] = f(\alpha_1, \alpha_2)$, where $\alpha_1$ is a "vertical" angle of attack, and $\alpha_2$ is a "horizontal" angle of attack. Negative eigenvalues are avoided by the "tangent variable" formulation such that:

$$\beta^2 = \beta_2^2 + \beta_3^2 \qquad \text{(Equation 33)}$$
$$[CWB] = f(\beta, \beta_2, \beta_3) \text{ where: } \beta = \cos\phi \tan\alpha$$
$$\beta_3 = \sin\phi \tan\alpha$$

A set of equations governing the motion of the missile 20 is needed for trajectory optimization. It is assumed that the missile 20, represented as a rigid body M, is moving in an inertial frame A subject to inertial, aerodynamic, and body forces. The inertial properties of M are idealized to be those of a particle M* of mass m. The gravity force at M* is mgk, where k is a unit vector directed vertically downward. The geometry of M is axisymmetric, and the aerodynamic forces acting at M* can be characterized in terms of a frame B in which the unit vector $b_1$ is fixed, parallel to the axis of M, and in which the direction of V, the velocity of M* in A, is known. Thus, the aerodynamic forces consist of an axial force $(T-D)b_1$ and a lift force Ln, where n is normal to $b_1$ and parallel to the plane which contains $b_1$ and V. The quantities D and L are known functions of $v = |v|$ and $\alpha$, the angle between V and $b_1$; T is a known function of time. (In the degenerate case for which V is parallel to $b_1$, $L=0$. Note that the frame B, in which $b_1$ is fixed, is not a body-fixed frame. The missile is free to spin about its axis in B.) Initial conditions affect only the initial position and velocity of M* in A.

First, we define a point 0 and a dextral triad $a_i$, for $i=1,2,3$, all fixed in A. Letting p denote the position vector of M* relative to 0 and $x_i = p \cdot a_i$, we can form the velocity of M* in A as $$V = \dot{x}_1 a_1 + \dot{x}_2 a_2 + \dot{x}_3 a_3 \qquad (34\text{-}1)$$

Denoting the unit vector tangent to the path of M* as $w_1$ we can also write the velocity as $$V = v w_1 \qquad (34\text{-}2)$$

One could characterize the direction of V in terms of only two parameters, but we choose instead to introduce an intermediate frame W associated with the path of M* and in which V is fixed. A dextral triad $w_i$, for $i=1,2,3$, is defined to be fixed in W, and we write the associated direction cosine matrix $$C_{ij} = w_i \cdot a_j \qquad (34\text{-}3)$$

in terms of Rodrigues parameters so that $$C = \frac{\left(1 - \frac{1}{4}\theta^T\theta\right)I + \frac{1}{2}\theta^T\theta - \tilde{\theta}}{1 + \frac{1}{4}\theta^T\theta} \qquad (34\text{-}4)$$

where $CC^T = C^TC = I$, the $3 \times 3$ identity matrix, and $$\theta = \begin{Bmatrix} \theta_1 \\ \theta_2 \\ \theta_3 \end{Bmatrix}, \tilde{\theta} = \begin{bmatrix} 0 & -\theta_3 & \theta_2 \\ \theta_3 & 0 & -\theta_1 \\ -\theta_2 & \theta_1 & 0 \end{bmatrix} \qquad (34\text{-}5)$$

Since there are three $\theta_i$ and we only need two parameters, we will need to constrain $\theta_i$. We choose to do so with a nonholonomic constraint on the angular velocity below.

Equating expressions for V from Eqs. (34-1) and (34-2), and using (34-3), we obtain three kinematical equations of the form $$\dot{x}_i = v w_1 \cdot a_i \qquad (34\text{-}6)$$

or, in matrix form $$\dot{x} = v C^T e_1 \qquad (34\text{-}7)$$

where $$e_1 = \begin{Bmatrix} 1 \\ 0 \\ 0 \end{Bmatrix}, x = \begin{Bmatrix} x_1 \\ x_2 \\ x_3 \end{Bmatrix} \qquad (34\text{-}8)$$

Denoting the angular velocity of W in A by $\omega$, we let $$\omega = \begin{Bmatrix} \omega_1 \\ \omega_2 \\ \omega_3 \end{Bmatrix} \qquad (34\text{-}9)$$

where $\omega_1 = \omega \cdot W_i$. Based on Eq. (26-4), one can show that $$\omega = \left(\frac{I - \frac{1}{2}\tilde{\theta}}{1 + \frac{1}{4}\theta^T\theta}\right)\dot{\theta} \qquad (34\text{-}10)$$

the inverse of which is given by $$\dot{\theta} = \left(I + \frac{1}{2}\tilde{\theta} + \frac{1}{4}\theta^T\theta\right)\omega \qquad (34\text{-}11)$$

We need the acceleration of M*, which can be written as the inertial time derivative of $vw_1$ so that $$A = \dot{v}w_1 + v\omega \times w_1 \quad (34\text{-}12)$$
$$= \dot{v}w_1 + v(w_2\omega_3 - w_3\omega_2)$$

Finally, we need to define the relationship between B and A to define the aerodynamic forces. We will actually work in terms of relating B to W, but first W must be well defined. We will set $\omega_1 = 0$, which nonholonomically constrains the set of coordinates $\theta_i$. This way the orientation of frame W is governed only by the path of M*, and only the orientation of $b_1$ and the lift force need to be defined relative to W.

As with pointing the velocity vector in A, we only need two parameters to accomplish this: the angle of attack $\alpha$ and the "bank" angle $\phi$ to orient the plane in W which contains the missile axis. Let B be tentatively oriented so that $b_i$ coincides with $w_i$ for $i=1,2,3$. Now, to get to the final orientation, we rotate B about $b_1$ by an angle $\phi$. Next, rotate B about $b_i$ by an angle $\alpha$. This brings $b_1$ into alignment with the axis of M during flight, and the lift is assumed to act along $b_2$. Thus, $$\begin{Bmatrix} b_1 \\ b_2 \\ b_3 \end{Bmatrix} = \begin{bmatrix} \cos\alpha & \sin\alpha & 0 \\ -\sin\alpha & \cos\alpha & 0 \\ 0 & 0 & 1 \end{bmatrix} \begin{bmatrix} 1 & 0 & 0 \\ 0 & \cos\phi & \sin\phi \\ 0 & -\sin\phi & \cos\phi \end{bmatrix} \begin{Bmatrix} w_1 \\ w_2 \\ w_3 \end{Bmatrix}$$

$$= \begin{bmatrix} \cos\alpha & \cos\phi\sin\alpha & \sin\phi\sin\alpha \\ -\sin\alpha & \cos\phi\cos\alpha & \sin\phi\cos\alpha \\ 0 & -\sin\phi & \cos\phi \end{bmatrix} \begin{Bmatrix} w_1 \\ w_2 \\ w_3 \end{Bmatrix}$$

$$(34\text{-}13)$$

Now, to avoid convergence difficulties created by the vanishing of $\alpha$ in which $\phi$ then becomes undefined, we introduce two variables $\beta_2$ and $\beta_3$ such that $$\beta_2 = \cos\phi \tan\alpha$$
$$\beta_3 = \sin\phi \tan\alpha \quad (34\text{-}14)$$

so that $$\beta^2 = \beta_2{}^2 + \beta_3{}^2 = \tan^2\alpha \quad (34\text{-}15)$$

Thus, $$\begin{Bmatrix} b_1 \\ b_2 \\ b_3 \end{Bmatrix} = \quad (34\text{-}16)$$

$$\begin{bmatrix} \dfrac{1}{\sqrt{1+\beta^2}} & \dfrac{\beta_2}{\sqrt{1+\beta^2}} & \dfrac{\beta_3}{\sqrt{1+\beta^2}} \\ \dfrac{-\beta}{\sqrt{1+\beta^2}} & \dfrac{\beta_2}{\beta\sqrt{1+\beta^2}} & \dfrac{\beta_3}{\beta\sqrt{1+\beta^2}} \\ 0 & \dfrac{-\beta_3}{\beta} & \dfrac{\beta_2}{\beta} \end{bmatrix} \begin{Bmatrix} w_1 \\ w_2 \\ w_3 \end{Bmatrix}$$

When combined with the expressions for the force and with the ( )* operator notation introduced below, an orientation description such as embodied in Eq. (34-16) should be free of convergence difficulties when $\alpha$ and $\beta$ vanish.

This concludes the definition of all kinematical quantities needed to express the equations of motion.

The equations of motion can be written in accordance with Newton's second law $$F = mA \quad (35\text{-}1)$$

where, if k is taken as parallel to $a_3$, the active force resultant acting at M* is given by $$F = (T-D)b_1 + Lb_2 + mga_3 \quad (35\text{-}2)$$

Introducing the column matrix of force components in the W system $$F = \begin{Bmatrix} F_1 \\ F_2 \\ F_3 \end{Bmatrix} \quad (35\text{-}3)$$

where $F_i = F \cdot w_i$ so that $$F_1 = mgC_{13} + \frac{(T-D)}{\sqrt{1+\beta^2}} - \frac{L\beta}{\sqrt{1+\beta^2}} \quad (35\text{-}4)$$

$$F_2 = mgC_{23} + \frac{(T-D)\beta_2}{\sqrt{1+\beta^2}} + \frac{L\beta_2}{\beta\sqrt{1+\beta^2}}$$

$$F_3 = mgC_{33} + \frac{(T-D)\beta_3}{\sqrt{1+\beta^2}} + \frac{L\beta_3}{\beta\sqrt{1+\beta^2}}$$

and taking the dot product of Eq. (35-1) with $w_1$, and making use of Eqs. (34-12) and (35-4), one obtains three equations of motion of the form $$m\dot{v} = F_1$$
$$mv\omega_3 = F_2$$
$$-mv\omega_2 = F_3 \quad (35\text{-}5)$$

Eqs. (35-5b) and (35-5c), along with the definition of $\omega$ and the constraint this $\omega_1 = 0$, $$\omega = \frac{1}{mv}\tilde{e}_1 F \quad (35\text{-}6)$$

The system equations can now be written as a system of seven first-order ordinary differential equations. The three equations embodied in Eq. (34-7) are already in a matrix form. Eq. (35-5a) is one scalar equation. Finally, Eqs. (34-11) and (35-6) can be written as one matrix equation. Thus, the system equations are $$\dot{x} = vC^T e_1 \quad (36\text{-}1)$$

$$\dot{v} = \frac{1}{m} e_1{}^T F$$

$$\dot{\theta} = \frac{1}{mv}\left(I + \frac{1}{2}\tilde{\theta} + \frac{1}{4}\theta\theta^T\right)\tilde{e}_1 F$$

where $F_i$ is given by Eqs. (35-4). Control variables $\beta_2$ and $\beta_3$ can be used to determine the trajectory of M*.

Eqs. (35-4) appear to be quite complex. The reason for the complexity is, at least in part, related to the fact that L and D are functions of $\alpha$ while $\beta$ appears explicitly in the coefficients of L and D, as well as that of T. To circumvent this, L and D can be expressed in terms of $\beta$ instead. All explicit $\beta$ dependence can be grouped into implicit functions which can be splined or approximated as a series. One way to do this is to introduce $$D = \mu v^2 C_A$$
$$L = \mu v^2 C_N \tag{37-1}$$

where $$\mu = \frac{pS_A}{2} \tag{37-2}$$

and where $C_N$ and $C_A$ are considered functions of $\beta$ and Mach number. Thus, the force components become $$F_1 = mgC_{13} + \frac{T}{\sqrt{1+\beta^2}} - \frac{\mu v^2 C_A}{\sqrt{1+\beta^2}} - \frac{\mu v^2 C_N \beta}{\sqrt{1+\beta^2}}$$

$$F_2 = mgC_{23} + \frac{T\beta_2}{\sqrt{1+\beta^2}} - \frac{\mu v^2 C_A \beta_2}{\sqrt{1+\beta^2}} + \frac{\mu v^2 C_N \beta_2}{\beta\sqrt{1+\beta^2}} \tag{37-3}$$

$$F_3 = mgC_{33} + \frac{T\beta_3}{\sqrt{1+\beta^2}} - \frac{\mu v^2 C_A \beta_3}{\sqrt{1+\beta^2}} + \frac{\mu v^2 C_N \beta_3}{\beta\sqrt{1+\beta^2}}$$

Now, upon substitution of the following even functions of $\beta$ $$Q = \frac{1}{\sqrt{1+\beta^2}} \tag{37-4}$$

$$C_a = \frac{C_A}{\sqrt{1+\beta^2}}$$

$$C_n = \frac{C_N}{\beta\sqrt{1+\beta^2}}$$

which can be conveniently represented as splines, Eq. (29-3) simplifies to $$F_1 = mgC_{13} + TQ - \mu v^2(C_a + C_n\beta^2)$$
$$F_2 = mgC_{23} + [TQ + \mu v^2(C_n - C_a)]\beta_2 \tag{37-5}$$
$$F_3 = mgC_{33} + [TQ + \mu v^2(C_n - C_a)]\beta_3$$

In construction of the nonlinear algebraic equations and the associated Jacobian, we will ultimately need to form first and second derivatives of the force components with respect to the control variables $B_2$ and $\beta_3$. Such partial derivatives of any function of $\beta$ must be found from the chain rule, which involves derivatives of the function with respect to $\beta$ times one of the following partial derivatives:

$$\frac{\partial \beta}{\partial \beta_2} = \frac{\beta_2}{\beta} \quad \frac{\partial \beta}{\partial \beta_3} = \frac{\beta_3}{\beta} \tag{37-6}$$

which will have the effect of introducing indeterminate forms $$\left(\frac{0}{0}\right)$$

in the vicinity of $\beta = 0$ every time there is differentiation with respect to one of the control variables.

The first derivative of any even function of $\beta$ will be odd, but its first derivative divided by $\beta$ will be even. Motivated by this observation, the following notation is introduced: $(\ )^* = (\ )'/\beta$ such that $(\ )' = \partial(\ )/\partial\beta$. Now, $$Q^* = \frac{Q'}{\beta} \quad C_a^* = \frac{C_a'}{\beta} \quad C_n^* = \frac{C_n'}{\beta} \tag{37-7}$$

and so forth for higher derivatives $$Q^{**} = \frac{(Q^*)'}{\beta} = \frac{1}{\beta}\left(\frac{Q'}{\beta}\right)' \tag{37-8}$$

$$C_a^{**} = \frac{(C_a^*)'}{\beta} = \frac{1}{\beta}\left(\frac{C_a'}{\beta}\right)'$$

$$C_n^{**} = \frac{(C_n^*)'}{\beta} = \frac{1}{\beta}\left(\frac{C_n'}{\beta}\right)'$$

This way, if any of these functions, say Q, is represented as a power series $$Q = \sum_{i=0,2,4,\ldots}^{n} Q_i \beta^{i-2} \tag{37-9}$$

one can show that $$Q^* = \sum_{i=2,4,6,\ldots}^{n} iQ_i\beta^{i-2} \tag{37-10}$$

$$Q^{**} = \sum_{i=4,6,8,\ldots}^{n} i(i-2)Q_i\beta^{i-4}$$

Once these are calculated, we then can find $$Q' = \beta Q^* \quad Q'' = \beta^2 Q^{**} + Q^* \tag{37-11}$$

We note that if the expansion of Q is limited to cubic order about the origin, say a cubic spline, then $Q^* = 2Q_2$ and $Q^{**} = 0$.

Of course, this operator does not change the results of finding derivatives. It just removes the myriad of indeterminate forms. Also, this operator greatly simplifies the expressions for the second derivatives. For example, $$\frac{\delta^2 F_1}{\delta \beta_2^2} = T(Q^* + \beta_3^2 Q^{**}) - \tag{37-12}$$

$$\mu v^2 [C_a^* + 2C_n + C_n^*\beta^2 + \beta_3^2(C_a^{**} + 4C_n^* + C_n^{**}\beta^2)]$$

and $$\frac{\delta^2 F_3}{\delta \beta_2^2} = \tag{37-13}$$

$$\{T(Q^* + \beta_2^2 Q^{**}) + \mu v^2[C_n^* - C_a^* + \beta_2^2(C_n^{} - C_a^{})]\}\beta_3$$

which are well behaved in the limit of small $\beta$. In fact, $F_i$ and all their first and second derivatives with respect to $\beta_2$ and $\beta_3$ are also well behaved, as has been demonstrated by Mathematica 5 computations. For $\beta = 0$ it can be shown that $$\left.\frac{\partial^2 F_\gamma}{\partial \beta_\delta \partial \beta_n}\right|_{\beta=0} = 0 \quad \delta, n, \text{ and } \gamma = 2 \text{ and } 3 \quad (37\text{-}14)$$

while $$\left.\frac{\partial^2 F_1}{\partial \beta_2 \partial \beta_3}\right|_{\beta=0} = 0 \quad (37\text{-}15)$$

and $$\left.\frac{\partial^2 F_1}{\partial \beta_2^2}\right|_{\beta=0} = \left.\frac{\partial^2 F_1}{\partial \beta_3^2}\right|_{\beta=0} = -T - \mu v^2 \left[C_a^*(0) + 2C_n^*(0)\right] \quad (37\text{-}16)$$

where the fact that $Q^*(0) = -1$ is used.

If H is the Hamiltonian, and u is the column matrix which contains the control variables $\beta_2$ and $\beta_3$, then $H_{uu}$ for this problem becomes a diagonal matrix in the limit as $\beta$ approaches zero. Both diagonal elements are the same and are given by $$(H_{uu})_{11}|_{\beta=0} = \quad (37\text{-}17)$$

$$(H_{uu})_{22}|_{\beta=0} = \frac{\lambda_v}{m} \{T + \mu v^2 [C_a^*(0) + 2C_n^*(0)]\}$$

It is therefore evident that $H_{uu}$ will be positive definite in the vicinity of $\alpha = \beta = 0$ if $\lambda_v < 0$.

A specific solution depends on the mass, thrust, gravitational, atmospheric, and aerodynamic data. In the following data, for example, the thrust is presumed to have discontinuities at Stage1_time seconds and Stage2_time seconds after launch. Therefore, it is convenient to divide the performance integral J into three phases; a first phase from $t=0$ seconds to $t=$ Stage1_time seconds; a second phase from $t=$ Stage1_time seconds to $t=13$ seconds; and a third phase from $t=13$ seconds to the time of intercept with the target.

| MASS = F(time): | |
|---|---|
| weight | time |
| 300 kg | 0.0 sec. |
| 273 | .09 × Stage2_time |
| 240 | .18 × Stage2_time |
| 207 | .27 × Stage2_time |
| 200 | .29 × Stage2_time |
| 180 | .4 × Stage2_time |
| 170 | .55 × Stage2_time |
| 160 | .69 × Stage2_time |
| 150 | .83 × Stage2_time |
| 143 | .95 × Stage2_time |
| 140 | Stage2_time |

THRUST = F(time,ambient condition):
Thrusto = Stage1_thrust Newtons, for: 0-Stage1_time
Thrusto = Stage2_thrust Newtons, for: Stage1_time-Stage2_time
Aexit = .024 meters squared
Thrust = Thrusto - (ambient pressure) × Aexit Turning now to FIG. 8, there is shown a top-level flowchart of the guidance function (introduced as box 51 in FIG. 4). This flowchart includes a number of variable names and symbols. $X^j{}_i$ denotes the solution vector for the jth cycle and the ith Newton-Raphson iteration. The solution vector $X^j{}_i$ is composed of: values for the states, x; the costates, $\lambda$; the Lagrangian multipliers $\mu$ for the control constraint equations; the slack variables K for the control constraint equations; the controls, u; the boundary condition multipliers $\nu$; the time to the end-of-phase, $t_{nph}$; and the time to the end-of-flight, $t_{go}$. An initial solution vector $X^{FCC}$ is downloaded into the guidance processing unit (21 in FIG. 3) from a fire control computer (not shown) external to the missile. $E(X^j{}_i)$ is the vector used in Equations 21 to 23 above and which contains the residuals from the equations when the equations are evaluated with the vector $X^j{}_i$.

The variable NC is the cycle counter. NC is initialized to zero, and NC is incremented every time that the WHOA optimal guidance routine is called. The variable 'k' is a Newton-Raphson iteration counter, which is reinitialized before the Newton-Raphson iteration scheme is called each cycle. The variable '$k_{max}$', is the maximum value number of Newton-Raphson iterations allowed for convergence. ADG is the acceleration command vector for the missile. The acceleration command vector ADG is the output from the guidance procedure.

Figure 8:
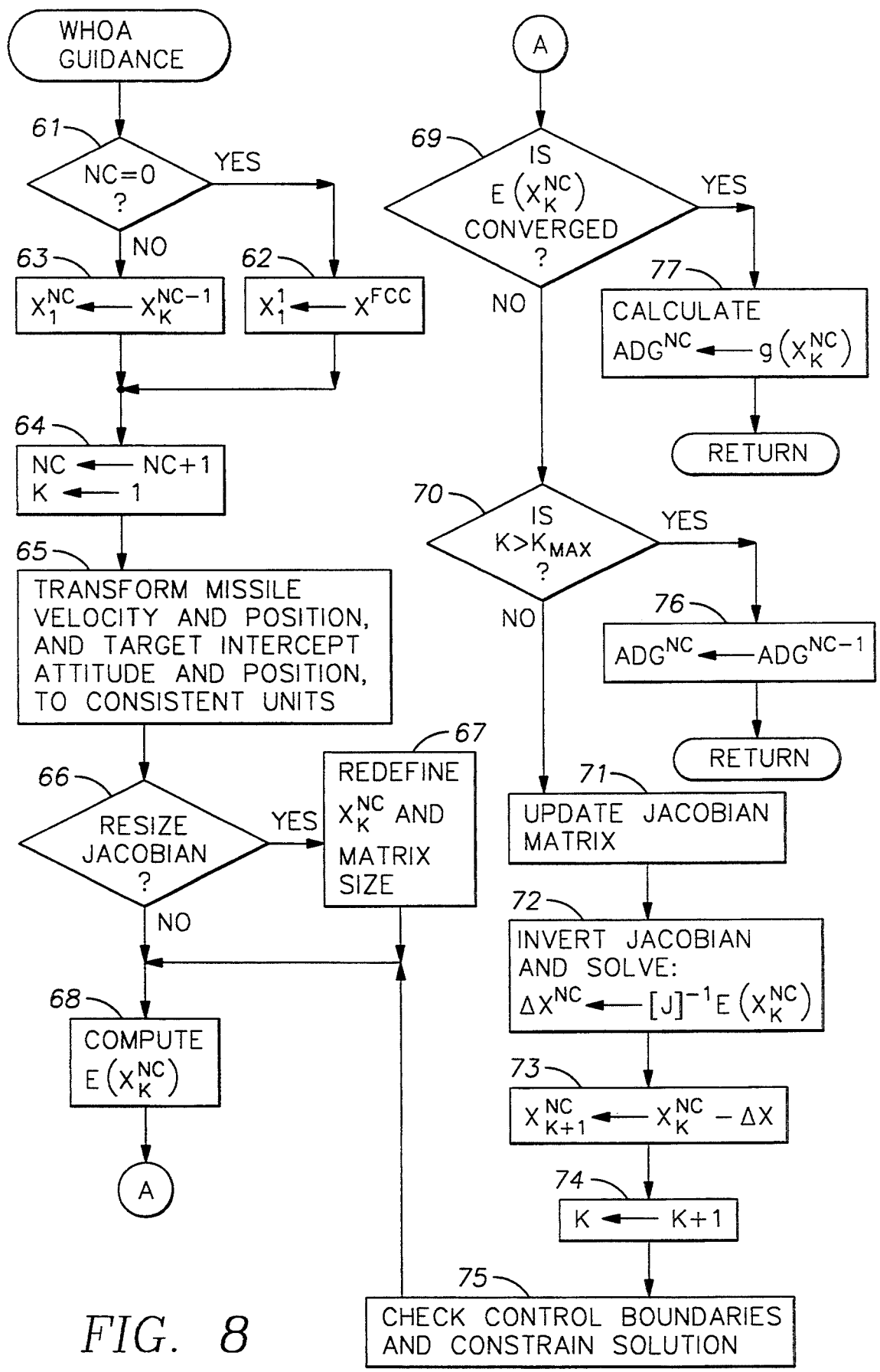
FIG. 8 is a flowchart illustrating the iterative control procedure of the present invention for generating guidance acceleration commands in real time during flight of the missile.

In the first step 61 of FIG. 8, execution branches to step 62 if NC is zero. In step 62, the solution vector $X_1{}^1$ is initialized with the solution vector $X^{FCC}$ downloaded from the fire control computer. If NC is not zero, then step 63 is performed, which loads the initial solution vector $X_1{}^{NC}$ with the last best solution vector $X_1{}^{NC-1}$ from the last cycle. Once the initial solution vector for this cycle is obtained in steps 63 or 64, the execution continues in step 64.

In step 64, the cycle counter NC is incremented, and the iteration counter 'k' is initialized to 1. In step 65, the input boundary conditions are transformed to consistent units used by the program. These input boundary conditions include the missile position and velocity vector as well as the desired target intercept position and attitude. In step 66, execution branches to step 67 if it is desirable to re-size the Jacobian. An increase in the number of elements, for example, increases the precision of the solution, but also increases the computation time needed for computing a solution and obtaining convergence. The computation time is dependent on the particular phase of flight. Therefore, it is generally desirable to re-size the Jacobian if a flight phase transition occurs. In step 67, the solution vector $X_k{}^{NC}$ is redefined based upon the re-sized Jacobian matrix. In step 68, the computation of the equation residuals $E(X_k{}^{NC})$ is done in vector form using the proposed solution vector $X_k{}^{NC}$. This is the initial step in the Newton-Raphson iteration loop including the following steps 68 to 75. During each iteration 'k', the Newton-Raphson iteration loop computes a new solution $X_{k+1}{}^{NC} + 1$ as a predetermined solution function $S(X_k{}^{NC})$ of the last solution $X_k{}^{NC}$. The computation of the new solution, however, involves steps 71, 72 and 73 in addition to the initial step 68.

Once the equation residuals are defined, they are validated against convergence criteria, in step 69. The convergence criteria, for example, are specified by a vector of predefined error limits, and if any element of the vector of equation residuals $E(X_k{}^{NC})$ has a magnitude that exceeds it corresponding error limit, then the solution vector $X_k{}^{NC}$ fails the convergence criteria. Otherwise, if each element of the vector of equation residuals $E(X_k{}^{NC})$ has a magnitude that is less than its corresponding error limit, then the solution vector $X_k{}^{NC}$ passes the convergence criteria, and in step 77, the acceleration command requisite for optimal flight (AGD$^{NC}$) is computed as a predetermined function g($X_k^{NC}$) of the converged solution vector $X_k^{NC}$.

If the convergence criteria are not met, then in step 70, the Newton-Raphson iteration counter k is compared against $k_{max}$. This step is used to control the computation time used by the procedure. If k is greater than $k_{max}$, then an acceleration command vector is computed either based upon the last best acceleration command vector or by using a conventional proportional navigation scheme, depending upon the time-off-light. This is done in step 76.

If the Newton-Raphson iteration counter 'k' does not exceed the limit '$k_{max}$', execution continues from step 70 to step 71. In step 71, the Jacobian matrix is updated by re-evaluating all of the non-zero elements of the Jacobian matrix [J] for the previously-computed solution vector $X_k^{NC}$. In step 72 the Jacobian matrix is inverted, and the inverted Jacobian matrix is multiplied by the previously-computed solution vector $X_k^{NC}$ in order to compute the next delta value $\Delta X$ on the solution vector X. Therefore, in step 73, the new solution vector $X_{k+1}^{NC}$ is computed by subtracting the delta value $\Delta X$ from the previously-computed solution vector $X_k^{NC}$ In step 74 the Newton-Raphson counter, 'k', is incremented by one. Then, in step 75, the control constraint equations are checked using the control values (u) in the new solution vector $X_{k+1}^{NC}$. This step is essential to free up the controls (u) to move on and off of control boundaries. The Newton-Raphson iteration scheme is resumed again in step 68, until either the convergence criteria are passed in step 69 or the maximum number of iterations $k_{max}$ is exceeded in step 70.

Figure 9:
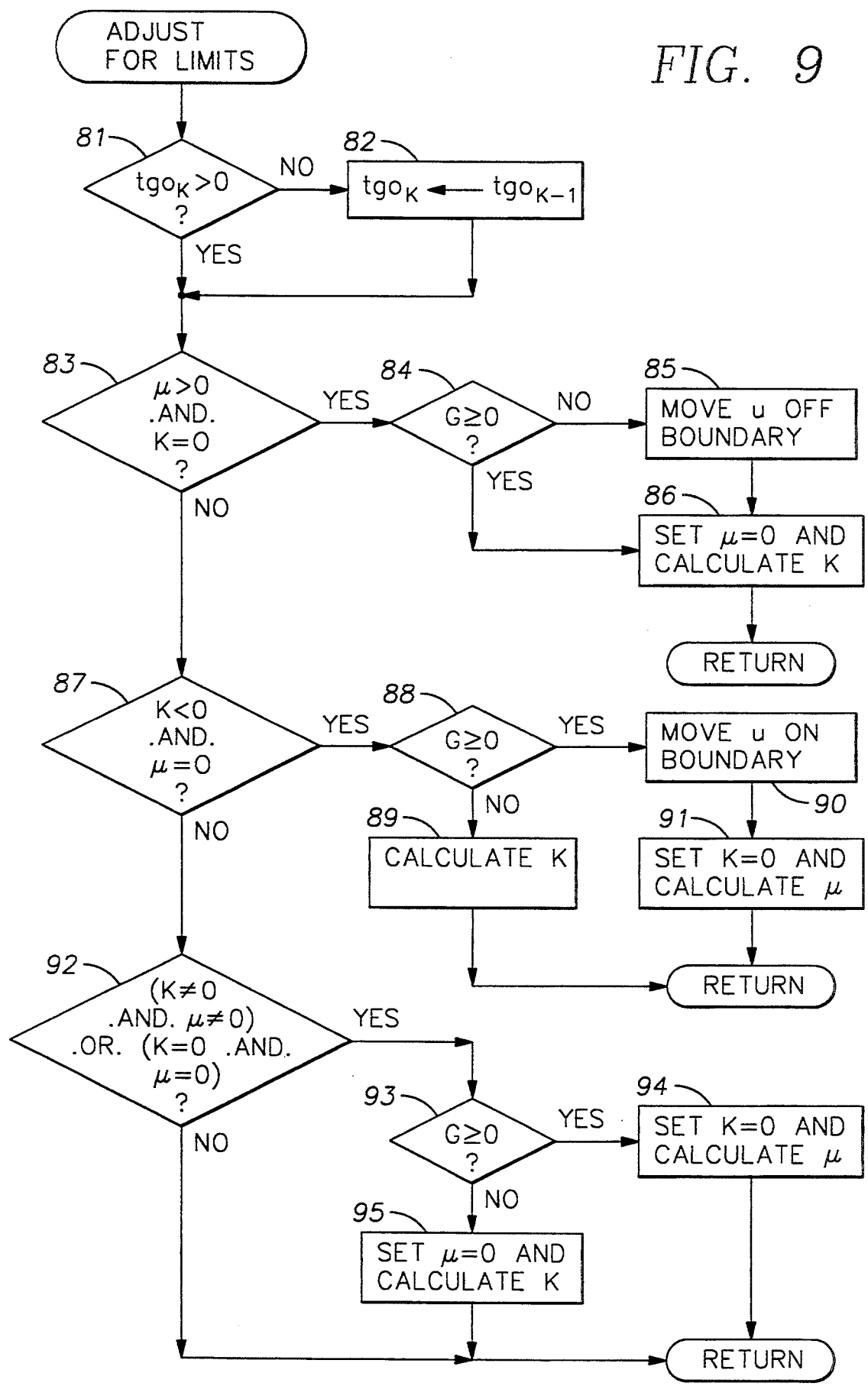
FIG. 9 is a flow chart of a procedure for accelerating convergence when control inequality constraints are reached by modifying iterative solutions between iterations when the iterative solutions fall outside of the inequality constraint boundaries.

Turning now to FIG. 9, there is shown a flowchart of a procedure for checking whether control limits are exceeded in each iterative solution $X_k^{NC}$, and adjusting the iterative solution when the controls move on or off a boundary or when a new time solution exceeds the bounds of realizability. The virtual angle of attack ($\alpha$), for example, should be limited to less than a predetermined value such as 20°. This could be done by imposing a constraint involving $\beta_2$ and $\beta_3$ such as $\tan^2(20°) - \beta_2^2 - \beta_3^2 = G$. The limit of 20° represents a constraint boundary for the angle of attack. If the boundary is exceeded, then the constraint can be enforced by either setting the specified value for the angle of attack to 20° or some value less than 20°. Sometimes the constraint is enforced by setting the specified value for the angle of attack ($\alpha$) to the limit of 20°, because the limit value might be optimum. This is a case where a control is set on the constraint boundary, in order to enforce the constraint. Sometimes the constraint is enforced by setting the specified value for the angle of attack ($\alpha$) to a value less than 20°. In this case, the control is said to be moved off of the boundary. The procedure of FIG. 9 may also check for solution constraints imposed for the express purpose of manifesting realizability thereby accelerating realizable convergence. For example, when it is known that the time step $\Delta t$ must be greater than a certain predetermined amount, then a solution constraint can be imposed on $\Delta t$ to accelerate convergence.

In general, the procedure in FIG. 9 enforces the constraints $k \geq 0$, $\mu^*K = 0$, $G \leq 0$, $t_{go} \geq 0$ and $\mu \geq 0$ in the iterative solution $X_k^{NC}$. Although a true solution to the system of algebraic equations being solved satisfies the constraints, an iterative solution does not necessarily satisfy the constraints because an iterative solution is only a guess at the true solution. Moreover, the procedure is performed on each respective set of K, G, u, and $\mu$ values.

In a first step 81 of FIG. 9, execution branches to step 82 when the computed time to the end of flight (tgo$_k$) is not greater than zero. In step 82, the time to the end of flight tgo$_k$ for the present iteration 'k' is set equal to the time to the end of flight for the previous iteration 'k−1. When the computed time to the end of flight tgo$_k$ is found to be greater than zero in step 81, or after step 82, execution continues in step 83.

In step 83, execution branches depending on the logical value of the proposition "$\mu > 0$. AND. K=0". When this proposition is true, then execution branches to step 84. Execution branches in step 84 depending on whether G is greater than or equal to zero. When G is not greater than or equal to zero, an inequality constraint is violated, and execution branches from step 84 to step 85. In step 85, the value of the control (u) is moved off of the constraint boundary. The degree to which the new value of the control (u) differs from its limit at the control boundary is not critical, and the new value may be set to a value that differs from its limit by an amount proportional to the value of $\mu$. Then, in step 86, the discrete Lagrangian multiplier $\mu$ is set to zero, and K is calculated based on the value of the control (u) and for $\mu = 0$, or example, such that $K^2 = -G(u)$. Then execution returns.

When G is greater than or equal to zero, none of the constraints are violated. However, in this case, execution branches from step 84 to step 86, because convergence can be accelerated in this case by setting $\mu = 0$ and calculating K for $\mu = 0$, for example, such that $K^2 = -G(u)$.

When it is not true that "$\mu 0$. AND. K=0", then execution branches from step 83 to step 87. Execution branches from step 87 depending on the logical value of the proposition "K<0. AND. $\mu = 0$". When this proposition is true, execution branches to step 88. In step 88, execution branches depending on whether G is greater than or equal to zero. When G is found to be less than zero, then execution branches to step 89. In step 89, K is calculated from the values of the other parameters, for example as $K^2 = -G(u)$, and execution returns. When G is found in step 88 to be greater than or equal to zero, then execution branches to step 90. In step 90, the control (u) is moved on the constraint boundary. Next, in step 91, K is set to zero and $\mu$ is calculated for the value of the control (u) and for K=0, for example, by applying Equation 24-7 above. Then execution returns.

When step 87 finds that "K<0. AND. $\mu = 0$" is not true, then execution branches to step 92. In step 92, execution branches depending on the logical value of the proposition "(K$\neq$0. AND. $\mu \neq 0$) .OR. (K=0 .AND. $\mu = 0$)". If this proposition is false, then execution returns. Otherwise, execution branches to step 93.

In step 93, execution branches depending on whether G$\geq$0. When G is greater than or equal to zero, then execution branches to step 94. In step 94, K is set to zero, $\mu$ is calculated for K=0, for example by applying Equation 24-7 above, and execution returns. When G is less than zero, then execution branches to step 95. In step 95, $\mu$ is set equal to zero, and K is calculated for K=0, for example such that $K^2 = -G(u)$. Then execution returns.

Additional features and advantages of the present invention are illustrated in the program listed below in Appendix I to the specification. The entry point of the program is a subroutine Whoa—flight. The subroutine Whoa_flight receives, as an input parameter, a specified time after launch of the missile. The specified time is used to determine the thrust of the rocket motor and the weight of the missile, because the thrust and weight are assumed to be predetermined functions of time. The subroutine WHOA_flight also receives, as input parameters, the present vehicle velocity, vehicle position, and the anticipated final azimuth, final elevation, and final position. The subroutine Whoa_flight returns a parameter body_guidance_cmd(3), which specifies the acceleration in g's, along each of the three body axes ($b_1$, $b_2$, $b_3$), that the missile should have to be guided along an optimal trajectory.

The subroutine Whoa_flight first calls a subroutine Whoa_init_flight that sets up what needs to be initialized for computing the Hamiltonian in flight. Then the subroutine Whoa—flight calls a subroutine Whoa_optimize to compute an optimal trajectory. If a converged solution is obtained, or if the time is less than 0.001 seconds since launch, then the subroutine Whoa_flight calls a subroutine Inert_guidance to compute a new guidance command. Otherwise, the previous guidance command is used. In any case, the subroutine Whoa_flight is finished.

The first time that the subroutine Whoa_init_flight is called, it obtains an initial solution by calling a subroutine Initialize_I_O(sol), which creates aerodynamic data tables by calling a subroutine Bcuaero. Otherwise, the subroutine Whoa_init_flight uses the present vehicular states as boundary conditions. The subroutine Whoa_init_flight then calls a subroutine Find_matrix_size to determine the number of elements needed, and thus determine the size of the Jacobian matrix. If the size needs to be changed, then the subroutine Whoa_init_flight calls a subroutine Gen_whoa_init_param in order to alter the solution vector to accommodate a new matrix size. Finally, the subroutine Whoa_init_flight determines an initial estimate for the time-of-flight (tgo).

The subroutine Whoa_optimize first determines the number of non-zero elements in the Jacobian matrix. This information is used by low-level matrix manipulation routines (e.g., Factor_matrix, Invert_matrix) that are from the Harwell Subroutine Library, as cited above. The subroutine Whoa_optimize then calls a subroutine Newton that performs the Newton-Raphson iterations. The subroutine Whoa_optimize is then finished.

The subroutine Newton calls a subroutine Errjac to compute the error of a solution, to fill in the Jacobian matrix, and to invert the Jacobian matrix, which is actually done by the Invert_matrix routine from the Harwell Subroutine Library. The subroutine Newton computes a new solution from the previous solution and the inverted Jacobian matrix. The subroutine Newton calls a subroutine Eval_cc to check control boundaries and constrain the solution, and calls a subroutine Evaluate_convergence to check the new solution. The subroutine Newton returns when a converged solution has been found, or after a predetermined number of iterations.

The subroutine Eval_cc calls either a subroutine Check_cc1 to check a single control constraint equation, or a subroutine Check_cc2 to check two control constraint equations. The subroutine Check_cc1 calls a subroutine Eval_bndry_cnd1 to evaluate the single boundary condition, and the subroutine Check_cc2 calls a subroutine Eval_bndry_cn2 to evaluate two boundary conditions. These subroutines are specific examples of programming for the flowchart of FIG. 9, as described above.

A large portion of the program in Appendix I is devoted to subroutines called by the subroutine Errjac and used to fill the Jacobian matrix. A low-level routine Get_f_g_eqn_der, for example, computes the derivatives for the elements of the Jacobian matrix, and also computes the derivative terms appearing in Equation 17.

In view of the above, there has been described a weak Hamiltonian finite element method for real-time iterative computation of missile guidance acceleration commands that define and optimal solution for maximizing the missile's terminal velocity while satisfying control authority limits and terminal attitude constraints. The guidance acceleration commands include commands for controlling the angle of attack ($\alpha$) and the bank angle ($\phi$) of the missile. In the virtual model of the missile contained in the guidance procedure, control variables $\beta 2$ and $\beta_2$ are utilized in lieu of $\alpha$ and $\phi$ to avoid convergence problems when the angle of attack is approximately zero. This transformation avoids negative eigenvalues in the Hamiltonian corresponding to the performance function (J). Iterative convergence is permitted when control inequality constraint parameters are reached by modifying iterative solutions between iterations so that the iterative solutions satisfy the inequality constraints. This facilitates the movement of the controls on and off of constraint boundaries. Moreover, solution constraints can be imposed for the purpose of accelerating convergence by using this technique.

Preferably, an optimal trajectory is calculated at each guidance cycle during missile flight using data that are revised during each guidance cycle. The revised data include current position data for the target and the current position for the missile. The revised data are taken from the most reliable source currently available, such as on-board target-seeking radar when the target-seeking radar is locked onto the target, uplink data from ground or airborne tracking radar when an uplink is operational, or inertial guidance data.

APPENDIX I

WEAK HAMILTONIAN REAL-TIME GUIDANCE PROGRAM

```
        Subroutine Whoa_flight ( Time
$,                               vehicle_velocity,
$                                vehicle_position
$,                               final_azimuth
$,                               final_elevation, final_position $,                               Body_guidance_cmd)
```

```
      Implicit None
      Include '[-.include]wfc_all_r6.inc' c  Inputs:

real*8   time                ! time since launch in seconds
      real*8   vehicle_velocity(3) ! ft/s
      real*8   vehicle_position(3) ! ft
      real*8   final_azimuth       ! final angle constraint
                                   ! degrees
      real*8   final_elevation     ! final elevation constraint
                                   ! degrees
      real*8   final_position(3)   ! final position constraint
                                   ! (ft)

c  Outputs:

real*8   Body_guidance_cmd(3) ! g's
c                                   ! for the beta angles.
c  Local Variables real*8   sol(835)

real*8   state(mx_x),control(mx_u)
     S,        old_body_cmd(3),beta_2,beta_3
     S,        min_guid_range/600.0/

Integer i,j,k,l,
                num_phases,num_points_in_traj,num_iterations
     S,        creep_count, max_creep/20/,iteration_total(3)
      Logical  converged/.false./,factor_matrix
      real*8   crossing_constraint/1.0d0/,init_tgo c   call the initialization algorithm which will set up what needs
to
c   be initialized for computing the hamiltonian in flight.

10    call whoa_init_flight (  Time
     S,                vehicle_velocity, vehicle_position
     S,                final_azimuth
     S,                final_elevation, final_position
     S,                converged S,                sol,factor_matrix)

converged = .false.   ! initialize every time c   compute the optimal trajectory call whoa_optimize( factor_matrix, sol S,                   state,control
     S,                   converged )

c  using the trajectory pull out the appropriate guidance command if (converged.or.time.lt.0.001) then   ! compute a new
c                                            ! guidance commmand call Inert_guid(state,control,time
```

```
    $,              body_guidance_cmd )

do i = 1,3
         old_body_cmd(i) = body_guidance_cmd(i)
      enddo else !  use old guidance command on non converged solution
         do i = 1,3
            body_guidance_cmd(i) = old_body_cmd(i)
         enddo
      endif return
      end Subroutine Inert_guid (state,control,time,body_guid_cmd)

Implicit None

Include '[-.include]wfc_all_r6.inc'
      Include '[-.include]wfc_thrust_r6.inc'
      Include '[-.include]wfc_bcu_r6.inc' c inputs real*8 state(mx_x)    ! vehicle optimal states at the nodes
      real*8 control(mx_u)  ! vehicle optimal states at the
      real*8 time           ! midpoints time since launch in
                            ! seconds
c outputs real*8 body_guid_cmd(3)

c local variables integer nid,i,j,ierr
      real*8 rho,p,temp,a,mach,cl,cd,alpha
    $,      thrust,drag,lift,throt,throst,denom,c(3,3),d(3,3)
    $,      calpha,salpha,cphi,sphi,acc_body(3),acc_wind(3)
    $,      total_magnitude,control_magnitude,que,beta_2,beta_3
    $,      beta,vel,cl_1,cd_1,dragq,liftq_b,gw(3)
    $,      acc_wind_from_body(3),cr1,sr1,roll1,grav_inv
    $,      body_guidance_cmd(3),beta1,alpha1,sal,cal,sb1,cb1
    $,      dum8
      real*8 beta_r4,mach_r4,beta_2_r4,beta_3_r4,beta_max/5.5/
    $,      mach_max/6.0/ c  get atmos situation
      grav_inv = 1.0d0/grav

CALL ATMOS62_METRIC(-state(3),RHO,P,TEMP,A)

C   Get Mach Number
      vel = state(4)
      MACH = vel/A

C   Get Lift And Drag Coefficient
```

```
      beta_2 = control(1)
      beta_3 = control(2)
      beta   = dsqrt(beta_2**2+beta_3**2)
      que    = 1/dsqrt(1+beta**2)

mach_r4 = mach
      beta_2_r4 = beta_2
      beta_3_r4 = beta_3
      beta_r4 = dsqrt(beta_2**2+beta_3**2)
c
c check for table limit values
c
      if(beta_r4.gt.beta_max) beta_r4 = beta_max
      if(abs(beta_2_r4).gt. beta_max )
     $              beta_2_r4=dsign(beta_max,beta_2_r4)
      if(abs(beta_3_r4).gt. beta_max )
     $              beta_3_r4=dsign(beta_max,beta_3_r4)
      if(mach_r4.gt. beta_max ) mach_r4=mach_max call bcuint(1,mach_r4,beta_r4)
      cl_1= yans(7)

cd_1= yans(1)

c    GET MASS
c
      if(time.le.thrust_time_out) then
         call seval(mass_time_tbl,mass_tbl,mass_a,mass_b,mass_c
     $,               mass_n,time,mass,dum8,dum8)
      else  ! finished burnout phase.
         mass      = terminal_mass
      endif if(time.lt.thrust_time_out) then
         call seval(thr_time_tbl,thr_tbl,thr_a,thr_b,thr_c
     $,               thr_n,time,throst,dum8,dum8)
         throt  = aexit
      else  ! thrust is constant after the final burnout time
         throst   = 0.0d0
         throt    = 0.0d0
      endif c   begin computing acceleration terms:

Thrust   = throst - throt*p
      Dragq    = rho*vel*vel*sa*cd_1/2.0
      liftq_b  = rho*vel*vel*sa*cl_1/2.0 c  compute the wind frame accelerations from the body frame acc_wind(1) = ( (Thrust*que-Dragq)  -
                        liftq_b*beta**2)/mass acc_wind(2) = ( (Thrust*que-Dragq)*beta_2 +
                        liftq_b*beta_2 )/mass acc_wind(3) = ( (thrust*que-dragq)*beta_3 +
                        liftq_b*beta_3 )/mass
```

```
c clear out the commands do i = 1,3
        body_guid_cmd(i)       = 0.0d0
        inert_guid_cmd(i)      = 0.0d0
        acc_wind_from_body(i)  = 0.0d0
      enddo c define the wind to inertial matrix denom = ( state(5)*state(5)
     $        + state(6)*state(6)
     $        + state(7)*state(7)
     $        ) /4.0 + 1.0d0
      c(1,1) = (state(5)*state(5)
     $        - state(6)*state(6)
     $        - state(7)*state(7)
     $        ) /4.0 + 1.0d0
      c(2,2) = (state(6)*state(6)
     $        - state(5)*state(5)
     $        - state(7)*state(7)
     $        ) /4.0 + 1.0d0
      c(3,3) = (state(7)*state(7)
     $        - state(6)*state(6)
     $        - state(5)*state(5)
     $        ) /4.0 + 1.0d0 c(1,2) = (state(5)*state(6)/2.0) - state(7)
      c(1,3) = (state(5)*state(7)/2.0) + state(6)
      c(2,1) = (state(5)*state(6)/2.0) + state(7)
      c(2,3) = (state(6)*state(7)/2.0) - state(5)
      c(3,1) = (state(5)*state(7)/2.0) - state(6)
      c(3,2) = (state(6)*state(7)/2.0) + state(5)
c
c define the gravity acceleration  vector in the wind frame
c
      gw(1) = c(3,1)
      gw(2) = c(3,2)
      gw(3) = c(3,3)
c c   define Euler Roll matrix cr1    = cos(vehicle_attitude(1))
      sr1    = sin(vehicle_attitude(1))

d(1,1) =    0.0d0   ! zeroed command in x axis
      d(1,2) =    0.0d0
      d(1,3) =    0.0d0
      d(2,1) =    0.0d0
      d(2,2) =    cr1
      d(2,3) =   -sr1
      d(3,1) =    0.0d0
      d(3,2) =    sr1
      d(3,3) =    cr1
c
c Transform the wind acceleration to the body frame
c
      acc_wind(1) = 0.0d0
      call MA_A3_eq_B33T_dot_C3(body_guid_cmd,d,acc_wind)
```

```
      call MA_A3_eq_B3_dot_C(body_guid_cmd,
                body_guid_cmd,grav_inv)
      call MA_A3_eq_B3_dot_C(body_guid_cmd,
                body_guid_cmd,body_cmd_sf)

return
      end

Subroutine Find_matrix_size(time,sol
     $,                          switch_phase_3_2,switch_phase_2_1
     $,                          d2_phase_1,drop_cc_eq
     $,                          drop_time_eq,resize,factor_matrix)

Implicit None
      Include '[-.Include]wfc_all_r6.inc' c Inputs
      real*8  time,sol(*)

c Outputs
      logical factor_matrix
      logical switch_phase_3_2, switch_phase_2_1, d2_phase_1
     $,       drop_time_eq,resize,drop_cc_eq
c locals logical stage_ii/.false./,stage_iii/.false./
     $,       first_divide/.true./,second_divide/.true./
     $,       dropped_time/.false./
     $,       dropped_capphi/.false./
      real*8 last_x_accel c check for time to switch if((nph.eq.1).and.(sol(iorder).lt.time_go_1st_divide)
     $           .and.(.not.first_divide)) then
        d2_phase_1 = .true.
        factor_matrix   = .true.
        resize = .true.
        first_divide = .true.
      elseif((nph.eq.1).and.(sol(iorder).lt.time_go_2nd_divide)
     $           .and.(.not.second_divide)) then
        d2_phase_1 = .true.
        factor_matrix   = .true.
        second_divide = .true.
        resize = .true.
      elseif(time.ge.drop_cc.and.set_drop_cc
     $           .and.(.not.dropped_capphi)) then
        drop_cc_eq = .true.
        resize = .true.
        factor_matrix   = .true.
        dropped_capphi = .true.
      endif
      return
      end Subroutine whoa_init_flight( Time
     $,                 vehicle_velocity, vehicle_position
```

```
     $,               final_azimuth
     $,               final_elevation, final_position
     $,               converged $,               sol,factor_matrix)

Implicit None
     Include '[-.Include]wfc_all_r6.inc' c Inputs:

real*8   time                  !  time since launch in seconds
     real*8   vehicle_velocity(3)   !  ft/s
     real*8   vehicle_position(3)   !  ft
     real*8   final_azimuth         !  final angle constraint
                                    !  degrees
     real*8   final_elevation       !  final elevation constraint
                                    !  degrees
     real*8   final_position(3)     !  final position constraint
                                    !  (ft)
     logical  converged             !  indicates goodness of last
                                    !  sol.

c Outputs:

real*8   sol(1)                !  initialization parameters
     logical  factor_matrix         !  initially true c Local variables Double Precision angle(3),attitude_init(3)

Integer Status/0/,good/0/,i
     Logical initial/.true./   !  true the very first time to
                               !  simulate
     logical first/.true./     !  essentially what the fcs would
                               !  load.
     logical switch_phase_3_2/.false./,switch_phase_2_1/.false./
    $,
d2_phase_1/.false./,drop_time_eq/.false./,resize/.false./
    $,          drop_cc_eq/.false./
c On the very first call go get the namelist and the name of the
c initial file which we will use for the first initialization
c routine's solution and the convergence criteria.  This would
c ordinarily be supplied by the fire control computer at launch.
     Time_since_launch = time   ! set time since launch in mmass
                                ! for table look-ups if(initial) then ! first time read the initialization files
        Call Initialize_I_O(sol)
        factor_matrix = .true.
        initial = .false.
     else   ! use the present vehicular states as boundary
            !   conditions.
            ! First find the phase we're in which we are located x01 = vehicle_position(1)*ft_to_meters
        x02 = vehicle_position(2)*ft_to_meters
        x03 = vehicle_position(3)*ft_to_meters
        call MA_A_eq_mag_B3(x04,vehicle_velocity)
```

```
          x04 = x04 * ft_to_meters

Call Init_bc_attitude(attitude_init
     $,                      vehicle_velocity,status)

x05 = attitude_init(1)
          x06 = attitude_init(2)
          x07 = attitude_init(3)

f_c11 = dcos(final_elevation*deg_to_rad)
     $           *dcos(final_azimuth*deg_to_rad)
          f_c12 = dcos(final_elevation*deg_to_rad)
     $           *dsin(final_azimuth*deg_to_rad)
          f_c13 = -dsin(final_elevation*deg_to_rad)
          xf1 = final_position(1)*ft_to_meters
          xf2 = final_position(2)*ft_to_meters
          xf3 = final_position(3)*ft_to_meters Call Find_matrix_size(time,sol $,                  switch_phase_3_2,switch_phase_2_1
     $,                  d2_phase_1,drop_cc_eq
     $,                  drop_time_eq,resize,factor_matrix)

c now alter the solution vector to accomodate a new matrix size if(resize)  Call Gen_whoa_init_param(switch_phase_3_2
     $,                                       switch_phase_2_1
     $,                                       d2_phase_1
     $,                                       drop_cc_eq
     $,                                       drop_time_eq,sol)
          resize = .false.
c set the time; everytime if(converged.and.first.and.sol(iorder).le.4.0) then
            xtime_start(1) = sol(iorder) +time ! TOF estimate with
                                               !  1  15 s. tgo
           first = .false.
         else
           if(sol(iorder).lt.3.0) then  ! only for a couple seconds
             sol(iorder) = xtime_start(1) - time
           endif
         endif 9999   return
       end Subroutine Gen_whoa_init_param(switch_phase_3_2
     $,                              switch_phase_2_1,d2_phase_1
     $,                              drop_cc_eq,drop_time_eq,sol)

implicit none
       Include '[-.include]wfc_all_r6.inc' c Inputs logical
switch_phase_3_2,switch_phase_2_1,d2_phase_1,drop_time_eq
     $,         drop_cc_eq
c Inputs/Outputs
```

```
      real*8 sol(*)

c local variables logical dummy_logical
      real*8 t1nx(40),t2nx(40)         ! maximum equations this can
handle
                                       ! per element
      Integer i,out_offset,inp_offset,old_iorder,old_n,old_netot
     $,          old_nph,old_xne1,
nbc32/22/,nbc21/13/,nibc/8/,ntbc/5/
     $,
old_ns,old_n,old_ntot,j,k,nbc4/12/,nbc5/13/,ns2/7/
     $,          old_np old_iorder = iorder
      old_nbc    = nbc
      old_netot  = netot
      old_nph    = nph
      old_xne1   = xne(1)
      old_ns     = ns
      old_np     = np
      old_n      = n
      old_ntot   = ntot if(switch_phase_3_2.or.switch_phase_2_1) then
        nph=nph-1                        ! set number of new phases
        do i = 1,nph
          write(26,'(''xtime_start shifted at: '',g14.5)')
     $                                        time_since_launch
          xtime_start(i) = xtime_start(i+1)   ! new phase start
                                              ! time(s)
        enddo
        do i = 1, nph
          xne(i) = xne(i+1)              ! shift for new elements
        enddo
      endif if(switch_phase_3_2) then ! reset the number of boundary
                                ! conditions
        nbc = nbc32
      elseif(switch_phase_2_1) then
        nbc = nbc21
      elseif(drop_time_eq)   then
        ns = ns2
        nbc = nbc4
      elseif(drop_cc_eq)     then
c       nbc = nbc5
        np = 0   ! dropping control constriant equations
      elseif(d2_phase_1)     then
        xne(1) = xne(1)/2
      endif n = ns + np
      ntot = 2*n + m
      NETOT = 0
      DO 5 I=1,NPH
        NETOT = NETOT + xNE(I) ! count the number of elements
 5    CONTINUE

IORDER = NTOT*(NETOT + 2*NPH) + NBC + NPH
```

```
c   This shifts everything straight from old phase 2
C     to new phase 1.

if(switch_phase_3_2) then inp_offset = (xne(1)+2)*ntot   ! start of next phase
         do i = 1,iorder - nbc-nph
            sol(i) = sol(i+inp_offset)
         enddo out_offset = iorder-nbc-nph
                                        ! start of the new bc
         inp_offset = old_iorder-old_nbc-old_nph
                                        ! start of old + skp old bc do i = 1, nib      ! do the state bc's, for the initial
            sol(out_offset + i) = sol(inp_offset + i)
         enddo
         inp_offset = inp_offset + i-1 + ns   ! skip the first
                                        !  internal node bc's
         out_offset = out_offset + i-1 do i = 1,(nph-1)*ns              ! do the internal node bc
            sol(out_offset + i) = sol(inp_offset + i)
         enddo out_offset = out_offset + i-1
         inp_offset = inp_offset + i-1 do i = 1, ntbc    ! do the state bc's, 5 is for the end
            sol(out_offset + i) = sol(inp_offset + i)
         enddo inp_offset = inp_offset + i-1
         out_offset = out_offset + i-1 sol(out_offset + 1) = sol(inp_offset + 2) ! move 2nd phs
                                        !  bc time to 1st
         sol(out_offset + 2) = sol(inp_offset + 4)
                                        ! move 2nd phase
                                        ! time to 1st
         sol(out_offset + 3) = sol(inp_offset + 5)
                                        ! move 3rd phase
                                        ! time to 2nd switch_phase_3_2 = .false.

elseif(switch_phase_2_1) then
                          ! shift the number of states 8 to 7.

inp_offset = (xne(1)+2)*ntot   ! start of next phase
         do i = 1,iorder - nbc-nph
            sol(i) = sol(i+inp_offset)
         enddo out_offset = iorder-nbc-nph              ! start of the new bc
         inp_offset = old_iorder-old_nbc-old_nph  ! strt of
                                        ! old + skp old bc do i = 1, nibc    ! do the state bc's, init, drop time
```

```
        sol(out_offset + i) = sol(inp_offset + i)
      enddo
      inp_offset = inp_offset + i-1 + ns   ! skip the first
                                           !   internal node bc's
      out_offset = out_offset + i-1 do i = 1, ntbc   ! do the state bc's, 5 is for the end
        sol(out_offset + i) = sol(inp_offset + i)
      enddo
      inp_offset = inp_offset + i-1
      out_offset = out_offset + i-1 sol(out_offset + 1) = sol(inp_offset + 3)
                                      !  move 2nd phs time to 1st
      switch_phase_2_1 = .false.  ! the last time this is used elseif(drop_time_eq) then
                           ! shift the number of states 8 to 7.
      do i = 1,xne(1)+2
        do j = 1,2
          do k = 1,ns
            sol( ntot*(i-1) + (j-1)*n + k ) =
  $              sol( (i-1)*old_ntot + (j-1)*old_n + k)
          enddo
          do k = 1,np
            sol( ntot*(i-1) + (j-1)*n + ns + k ) =
  $          sol( (i-1)*old_ntot + (j-1)*old_n + old_ns+k)
          enddo
        enddo
        do j = 1,m
          sol( ntot*(i-1) + n*2 + j ) =
  $          sol( (i-1)*old_ntot + old_n*2 + j )
        enddo
      enddo out_offset = iorder-nbc-nph     ! start of the new bc
      inp_offset = old_iorder-old_nbc-old_nph  ! strt of
                                      !  old + skp old bc do i = 1, nibc-1    ! do the state bc's, init, drop time
        sol(out_offset + i) = sol(inp_offset + i)
      enddo
      inp_offset = inp_offset + i-1 + 1      ! skip the first
                                             !  internal node bc's
      out_offset = out_offset + i-1 do i = 1, ntbc   ! do the state bc's, 5 is for the end
        sol(out_offset + i) = sol(inp_offset + i)
      enddo inp_offset = inp_offset + i-1
      out_offset = out_offset + i-1 sol(out_offset + 1) = sol(inp_offset + 1) ! move 2nd phs
                                                !  time to 1st drop_time_eq = .false.  ! the last time this is used
      ulimit    = ulimit_r1         ! change the limit elseif(drop_cc_eq) then ! drop the cc equations
```

```fortran
      do i = 1,netot+2*nph
        do j = 1,n
          sol(ntot*(i-1)+j) = sol(old_ntot*(i-1)+j)
          sol(ntot*(i-1)+n+j) = sol(old_ntot*(i-1)+old_n+j)
        enddo
        do j = 1,m
          sol(ntot*(i-1)+2*n+j) = sol(old_ntot*(i-1)+2*old_n+j)
        enddo
      enddo
      do i = 1,nbc
        sol(iorder-nbc+i)=sol(old_iorder-old_nbc+i)
      enddo
      drop_cc_eq = .false.  ! the last time this is used elseif(d2_phase_1) then
                      ! we're doing a divide phase 1 by 2.

c ** Dividing the number of elements in phase 1, in stage 3 by 2 d2_phase_1 = .false.   ! last time this is used if(old_xne1 .eq. 4) then
                  ! shift from 4 to 2 elements in phase 1
        do i = 1 , ntot
          sol(ntot   + i ) =   (sol  (ntot + i)
     $                           + sol(ntot*2 + i))/2
          sol(ntot*2 + i ) = (sol(ntot*3 + i)
     $                           + sol(ntot*4 + i) )/2
          sol(ntot*3 + i ) =   sol(ntot*(old_xne1+1) + i)
        enddo
      else  ! shift from 2 to 1 element in phase 1
            ! stage iii only.
        do i = 1 , ntot
          sol(ntot + i ) =   (sol  (ntot + i)
     $                           + sol(ntot*2 + i))/2
          sol(ntot*2 + i ) =  sol(ntot*(old_xne1+1) + i)
        enddo
      endif
      do i = 1 ,nbc + nph  ! shift the bc & time down
        sol(ntot*(netot+2) + i ) = sol(ntot*(old_netot+2) + i)
      enddo
      if(np.eq.2)
     $  call check_cc2(time_since_launch,sol,dummy_logical)
                                              ! new controls
      if(np.eq.1)
     $  call check_cc1(time_since_launch,sol,dummy_logical)
                                              ! new controls
   endif return
   end Subroutine Init_bc_attitude( attitude_init
     $,                  vehicle_velocity,status)

Implicit None
      Include '[-.include]wfc_all_r6.inc' c Inputs
      Real*8 vehicle_velocity(3) ! inertial vehicle velocity
``` ft/s c Outputs

```
        Real*8 attitude_init(3)    ! either Rodriquez parameters
c                                  ! or FP unit vector
        Integer status
``` c Locals

```
      Integer i
      Double Precision Maximum_value,Trans_Inertial_VEL(3,3)
     $,                Inert_level_mag,Trans_VEL_Inertial(3,3)
      Double Precision c11,c12,c13,c21,c22,c23,c31,c32,c33,denom
     $,
angle_rad(3),ca1,ca2,ca3,sa1,sa2,sa3,dum2,dum3 logical use_euler/.false./,use_two_init_bc/.false./
c
c
      Inert_level_mag= sqrt(vehicle_velocity(1)**2
     $                    + vehicle_velocity(2)**2  )

Angle_rad (1) =  0.0D0
      Angle_rad (2) = datan(-vehicle_velocity(3)/Inert_level_mag)
      Angle_rad (3) = dacos( vehicle_velocity(1)/Inert_level_mag)

ca3 = cos(angle_rad(3))
      sa3 = sin(angle_rad(3))
      ca2 = cos(angle_rad(2))
      sa2 = sin(angle_rad(2))
      ca1 = cos(angle_rad(1))
      sa1 = sin(angle_rad(1))

c13 =  ca3 * sa2 * ca1 + sa3 * sa1
      c31 = -sa2
      c23 = sa3 * sa2 * ca1 - ca3 * sa1
      c32 = ca2 * sa1
      c12 = ca3 * sa2 * sa1 - sa3 * ca1
      c21 = ca2 * sa3
      c11 = ca2 * ca3
      c22 = sa3 * sa2 * sa1 + ca3 * ca1
      c33 = ca2 * ca1
      denom = (1+c11+c22+c33)
      attitude_init(1) = 2*(c32-c23)/denom
      attitude_init(2) = 2*(c13-c31)/denom
      attitude_init(3) = 2*(c21-c12)/denom
      Return
      end Subroutine Initialize_I_O(sol)

Implicit None
      Include '[-.include]wfc_all_r6.inc'
      Include '[-.include]wfc_thrust_r6.inc'
      Include '[-.include]wfc_bcu_r6.inc'
``` c Outputs

```
      real*8 sol(1)
      Integer status ,i
``` c local variables

```
      real*8 z8/0.0d0/
      integer ierr namelist/bc_and_constants/ aexit,grav,sa,thrust1,thrust2,a1
     $,a2,ulimit,x01,x02,x03,x04,x05,x06,x07,x08,xf1,xf2,xf3
     $,f_c11,f_c12,f_c13,m,nbc,np,nph,ns,xtime,xne
     $,ccerr,ccexp,cmerr,ulimit_r1,range_o2,thrust_time_out namelist/controls/file_name_in,file_name_out
     $,              mass_file_in,thrust_file_in
     $,              sav_matrix,sav_matrix_time
     $,              Conver,use_spline_thrust
     $,              newton_scale_factor,Max_num_of_iterations $,              execute_frequency
     $,              print_derivatives
     $,              save_first_solution
     $,              cap_cc,final_conver_crit
     $,              print_derivatives_start_time,pn_kn,pn_ks
     $,              print_derivatives_end_time,
     $,               final_conver_time
     $,              time_go_1st_divide,time_go_2nd_divide
     $,              set_drop_time,drop_time
     $,              write_initial_derivatives
     $,              set_drop_cc,drop_cc,ccv8,ccv9
     $,
     body_cmd_sf,use_spline_thrust,use_spline_mass Data Conver/5*0.0001/    ! avg. eqn. convergence criteria
     $,    ulimit_r1/0.09/    ! new ulimit set at 'drop_time'
     $,    newton_scale_factor/835*1.0d0/
                              ! init. newton scale factor
     $,    time_go_1st_divide /10.0d0/
     $,    time_go_2nd_divide /5.0d0/,nptr/1/
     $,    max_num_of_iterations/5*4/
                              ! max number of iterations
     $,    pn_kn/0.1557/,pn_ks/1.8/ ! between the error vector
                                    ! calculation before the
                                    ! iteration file saves the
                              ! difference in the error vector
                              ! calculation of the max error.

c     This routine tries to open the necessary files to costruct
c     the initialization necessary for WHOA.

open(unit=13,file='whoa_flight_r6.nml',status='old'
     $        ,form='formatted',err=9004)
      read(13,nml=controls,err=9007)
      read(13,nml=bc_and_constants,err=9008)
      close(13)    !

do i = 1,nph  ! read in the initial phase times.
        xtime_start(i) = xtime(i)
      enddo C DEFINE THE initial SIZE OF THE SYSTEM
```

```
      N = NS+NP
      NTOT=2*N+M
      NETOT = 0
      DO 5 I=1,NPH
      NETOT = NETOT + xNE(I)
   5  CONTINUE

IORDER = NTOT*(NETOT + 2*NPH) + NBC + NPH open(unit=10,file=file_name_in,status='old',form='formatted'
     $,                 err=9001)
      print *,' order = ',iorder
      do i = 1,iorder
         read(10,*,err=9006)sol(i)
      enddo
      close (10)

c define range_o2 , the initial range to target squared.
c  this assumes the first three states are x,y,and z. inertially, i = iorder-nbc-nph-ntot range_o2 = sol(i+1)2 + sol(i+2)2 + sol(i+3)**2
      CALL BCUAERO  ! create aero tables

C   READ IN THE MASS TIME HISTORY

OPEN (15,FILE=mass_file_in,STATUS='old',err=9009)
      READ (15,*) mass_n
      DO 11 I = 1, mass_n
  11      READ (15,*,err=9010) mass_time_tbl(i),mass_tbl(i)
      close(15)
      terminal_mass = mass_tbl(mass_n)

c initialize the mass spline data
      call cbspl (mass_time_tbl,mass_tbl,mass_a,mass_b,mass_c
     $,           mass_n,0,0,z8,z8,ierr)

C   READ IN THE thrust TIME HISTORY

OPEN (15,FILE=thrust_file_in,STATUS='old',err=9011)
! gth
      READ (15,*) thr_n
      DO 12 I = 1, thr_n
  12      READ (15,*,err=9012) thr_time_tbl(i),thr_tbl(i)
      close(15)

c initialize the thrust spline data call cbspl (thr_time_tbl,thr_tbl,thr_a,thr_b,thr_c
     $,           thr_n,0,0,z8,z8,ierr)

goto 9000
9001  write(*,*)' Error opening input file name '
      goto 9000
9004  write(*,*) 'error opening whoa_init_controls.nml'
      goto 9000
```

```
9006  write(*,*) 'error reading input initialization parameters '
      goto 9000
9007  write(*,*) 'error reading controls namelist '
      goto 9000
9008  write(*,*) 'error reading bc, and initial state namelist '
      goto 9000
9009  write(*,*) 'error opening file:', mass_file_in
      goto 9000
9010  write(*,*) 'error reading file:', mass_file_in
      goto 9000
9011  write(*,*) 'error opening file:', thrust_file_in
      goto 9000
9012  write(*,*) 'error reading file:', thrust_file_in
      goto 9000
9000  continue
      return
      end C File Name: ATMOS62_METRIC
C Last Update: 10 April 1992
C
      SUBROUTINE ATMOS62_METRIC ( ALT , RHO , PRESS , T , VSOUND )
C
C*****************************************************************
C     CALCULATES DIMENSIONAL ATMOSPHERIC QUANTITIES.
C   **
C
C   **
C     INPUTS -
C   **
C        ALT    = ALTITUDE, METERS
C   **
C
C   **
C     OUTPUTS -
C   **
C        RHO    = DENSITY, KG / METER CUBED
C   **
C        PRESS  = PRESSURE, PASCALS
C   **
C        TK     = TEMPERATURE, DEGREES KELVIN
C   **
C        VSOUND = SPEED OF SOUND, METERS / SECOND
C   **
C
C   **
C
C*******************************************************************
*****
C
      IMPLICIT REAL*8 (A-H,O-Z)
      DIMENSION H(8),TEMP(8),DELT(8),DTDH(8)
C
C THIS IS THE 1962 U.S. STANDARD ATMOSPHERE DEFINITION
C H,HKM ARE IN GEOPOTENTIAL KILOMETERS. ALT SHOULD BE
C  GEOPOTENTIAL METERS.
C TEMP IS IN DEGREES K.
C C=G*M0/R   G=9.80665 M/SEC**2, M0=28.9644  R=8.31432(METRIC)
C DTDH IS DEGREES K/KM
C
```

```
      DATA C        /34.1632/
      DATA H        /0.,11.,20.,32.,47.,52.,61.,79./
      DATA DELT
/1.,.223361,.0540328,.00856663,.00109455,.000582289,
     $              .000179718,.000010241/
      DATA DTDH     /-6.5,0.,1.,2.8,0.,-2.,-4.,0./
      DATA R        /287.04/
      DATA SLPRES   /101325.0/
      DATA TEMP     /288.15,216.65,216.65,228.65,270.65,270.65,
     $              252.65,180.65/
      DATA VSCON    /20.04645/
C
      HKM = ALT * 0.001
      I=1
      DO 10 J=2,8
           IF (HKM.LE.H(J)) GO TO 20
           I=I+1
   10 CONTINUE
   20 DH=HKM-H(I)
C
      IF (DTDH(I).EQ.0.0) THEN
           TK = TEMP(I)
           DELTEMP = -C * DH / TEMP(I)
           IF (DELTEMP.LT.-675.0) DEL=0.0
           IF (DELTEMP.GE.-675.0) DEL=DELT(I)*EXP(DELTEMP)
      ELSE
           TK  = TEMP(I) + DTDH(I)*DH
           DEL = DELT(I) * (TEMP(I)/TK)**(C/DTDH(I))
      END IF
C
      DELTA=DEL
      PRESS = SLPRES * DELTA
      VSOUND = VSCON * SQRT (TK)
      RHO = PRESS / (R*TK)
C
      RETURN
      END
C
      SUBROUTINE BCUAERO
      IMPLICIT DOUBLE PRECISION(A-H,O-Z)
C ROUTINE TO CALCULATE GRIDPOINT DERIVATIVES USING FORWARD &
C  BACKWARD PERTURBATIONS OR ONE-DIRECTIONAL PERTURABTION IF
C  GRIDPOINT IS ON THE EDGE.
C SHOULD BE FIRST EXECUTED IN THE MAIN PROGRAM BEFORE ANY
C  CALCULATION IS DONE.
      Include '[-.include]wfc_bcu_r6.inc'

OPEN (1,FILE='aero.ini',STATUS='OLD')
      DO 5 I=1,1
      READ(1,*) J1,K1
      READ(1,*) (X1A(I,J),J=1,J1)                !MACH NO.
      READ(1,*) (X2A(I,K),K=1,K1)                !ALPHA DO 3 J=1,J1
      DO 3 L=1,12   ! originally cl and cd
    3 READ(1,*) (YA(I,L,J,K),K=1,K1)
C YA=YA(STAGE,COEFF,MACH,ALPA)
      N_MACH(I)=J1     ! mach
      N_ALPHA(I)=K1    ! alpha
    5 CONTINUE
      CLOSE(UNIT=1,STATUS='KEEP')
```

```
      DO 30 I=1,1

DO 30 J=1,N_MACH(I)
      JB=J
      JF=J
      IF (J.EQ.1) JB=J+1
      IF (J.EQ.N_MACH(I)) JF=J-1
      FWDX1=X1A(I,JF+1)-X1A(I,JF)
      BWDX1=X1A(I,JB)-X1A(I,JB-1)

DO 20 K=1,N_ALPHA(I)
      KB=K
      KF=K
      IF (K.EQ.1) KB=K+1
      IF (K.EQ.N_ALPHA(I)) KF=K-1
      FWDX2=X2A(I,KF+1)-X2A(I,KF)
      BWDX2=X2A(I,KB)-X2A(I,KB-1)

DO 10 L=1,12
      Y1A(I,L,J,K)=((YA(I,L,JF+1,K)-YA(I,L,JF,K))/FWDX1+(
     1 YA(I,L,JB,K)-YA(I,L,JB-1,K))/BWDX1)/2.D0
      Y2A(I,L,J,K)=((YA(I,L,J,KF+1)-YA(I,L,J,KF))/FWDX2+(
     1 YA(I,L,J,KB)-YA(I,L,J,KB-1))/BWDX2)/2.D0
      DUMMY=(YA(I,L,JF+1,KF+1)-YA(I,L,JF,KF+1))/2.D0/FWDX1/
     1 FWDX2-(YA(I,L,JF+1,KF)-YA(I,L,JF,KF))/2.D0/FWDX1/FWDX2
      FWY12=DUMMY+(YA(I,L,JB,KF+1)-YA(I,L,JB-1,KF+1))/2.D0/BWDX1
     1 /FWDX2-(YA(I,L,JB,KF)-YA(I,L,JB-1,KF))/2.D0/BWDX1/FWDX2
      DUMMY=(YA(I,L,JF+1,KB)-YA(I,L,JF,KB))/2.D0/FWDX1/BWDX2-
     1 (YA(I,L,JF+1,KB-1)-YA(I,L,JF,KB-1))/2.D0/FWDX1/BWDX2
      BWY12=DUMMY+(YA(I,L,JB,KB)-YA(I,L,JB-1,KB))/2.D0/BWDX1/
     1 BWDX2-(YA(I,L,JB,KB-1)-YA(I,L,JB-1,KB-1))/2.D0/BWDX1/BWDX2
10    Y12A(I,L,J,K)=(FWY12+BWY12)/2.D0
20    CONTINUE
30    CONTINUE
      JM=1
      KA=1
      RETURN
      END

SUBROUTINE BCUINT(ID,X1,X2)

C ROUTINE TO DO THE BICUBIC INTERPOLATION/EXTRAPOLATION OF THE
C AERODYNAMICS DATA (Cd,Cl).
C REFERENCE: 'NUMERICAL RECIPES', pp.89, 99 & 100
C ARGUMENTS:
C       ID                      - STAGE NO./INPUT
C       X1                      - MACH NO./INPUT
C       X2                      - ALPHA (RADIAN)/INPUT
C       YANS(1),YANS(2)         - CL,CD/OUTPUT
C       DYDX1(1),DYDX1(2)       - d(Cl)/d(Mach),d(Cd)/d(Mach)/OUTPUT
C       DYDX2(1),DYDX2(2)       - d(Cl)/d(Alpha),d(Cd)/d(Alpha)/OUTPUT
C       DYDDX1(1),DYDDX1(2)     - CL,CD 2ND DERIVATIVES W.R.T.
C                                 X1/OUTPUT
C       DYDDX2(1),DYDDX2(2)     - CL,CD 2ND DERIVATIVES W.R.T.
C                                 X2/OUTPUT
C       DYDX12(1),DYDX12(2)     - CL,CD JOINT DERIVATIVES/OUTPUT

IMPLICIT DOUBLE PRECISION(A-H,O-Z)
      DIMENSION Y(4),Y1(4),Y2(4),Y12(4),
```

```
         C(4,4),ANSY(12),ANSY1(12),
1 ANSY2(12),ANSY11(12),ANSY22(12),ANSY12(12),CX(16),X(16),
2 WT(16,16),JC(4),KC(4)

include '[-.include]wfc_bcu_r6.inc'

DATA WT/1,0,-3,2,4*0,-3,0,9,-6,2,0,-6,4,8*0,3,0,-9,6,-2,0,
1 6,-4,10*0,9,-6,2*0,-6,4,2*0,3,-2,6*0,-9,6,2*0,6,-4,4*0,1,
2 0,-3,2,-2,0,6,-4,1,0,-3,2,8*0,-1,0,3,-2,1,0,-3,2,10*0,-3,
3 2,2*0,3,-2,6*0,3,-2,2*0,-6,4,2*0,3,-2,0,1,-2,1,5*0,-3,6,
4 -3,0,2,-4,2,9*0,3,-6,3,0,-2,4,-2,10*0,
       -3,3,2*0,2,-2,2*0,-1,
5 1,6*0,3,-3,2*0,-2,2,5*0,1,-2,1,0,-2,4,-2,0,1,-2,1,9*0,-1,
6 2,-1,0,1,-2,1,10*0,1,-1,2*0,-1,1,
       6*0,-1,1,2*0,2,-2,2*0,-1,1/
      DATA JC,KC/0,1,1,0,0,0,1,1/

C SEARCH ALONG THE X1-AXIS (MACH NO.)
      IF (X1.GT.X1A(ID,J1) .AND. X1.LT.X1A(ID,J1+1)) GOTO 2
      IF (X1.LE.X1A(ID,1)) THEN
        J1=1
      ELSE IF (X1.GE.X1A(ID,N_MACH(ID))) THEN
        J1=N_MACH(ID)-1
      ELSE
        KLO=1
        KHI=N_MACH(ID)
1     IF (KHI-KLO.GT.1) THEN
        J=(KHI+KLO)/2
        IF (X1A(ID,J).GT.X1) THEN
          KHI=J
        ELSE
          KLO=J
        ENDIF
        GOTO 1
      ENDIF
      J1=KLO
      ENDIF
2     X1L=X1A(ID,J1)
      X1U=X1A(ID,J1+1)

C SEARCH ALONG THE X2-AXIS (ALPHA)
      IF (X2.GT.X2A(ID,K1) .AND. X2.LT.X2A(ID,K1+1)) GOTO 5
      IF (X2.LE.X2A(ID,1)) THEN
        K1=1
      ELSE IF (X2.GE.X2A(ID,N_ALPHA(ID))) THEN
        K1=N_ALPHA(ID)-1
      ELSE
        KLO=1
        KHI=N_ALPHA(ID)
4     IF (KHI-KLO.GT.1) THEN
        K=(KHI+KLO)/2
        IF (X2A(ID,K).GT.X2) THEN
          KHI=K
        ELSE
          KLO=K
        ENDIF
        GOTO 4
      ENDIF
      K1=KLO
      ENDIF
```

```
 5      X2L=X2A(ID,K1)
        X2U=X2A(ID,K1+1)
        D1=X1U-X1L
        D2=X2U-X2L

C GRIDPOINTS NUMBERED COUNTER-CLOCKWISE FROM
C   THE LOWER LEFT CORNER
        DO 50 L=1,12
        DO 10 I=1,4
        J1JC=J1+JC(I)
        K1KC=K1+KC(I)
        Y(I)=YA(ID,L,J1JC,K1KC)
        Y1(I)=Y1A(ID,L,J1JC,K1KC)
        Y2(I)=Y2A(ID,L,J1JC,K1KC)
 10     Y12(I)=Y12A(ID,L,J1JC,K1KC)

C START OF 'BCUCOF'
        D1D2=D1*D2
        DO 21 I=1,4
        X(I)=Y(I)
        X(I+4)=Y1(I)*D1
        X(I+8)=Y2(I)*D2
        X(I+12)=Y12(I)*D1D2
 21     CONTINUE
        DO 23 I=1,16
        XX=0.0
        DO 22 K=1,16
 22     XX=XX+WT(I,K)*X(K)
        CX(I)=XX
 23     CONTINUE
        LI=0
        DO 25 I=1,4
        DO 24 J=1,4
        LI=LI+1
 24     C(I,J)=CX(LI)
 25     CONTINUE
C END OF 'BCUCOF'

T=(X1-X1L)/D1
        U=(X2-X2L)/D2
        ANSY(L)=0.D0
        ANSY1(L)=0.D0
        ANSY2(L)=0.D0
        ANSY11(L)=0.D0
        ANSY22(L)=0.D0
        DO 40 I=4,1,-1
        ANSY(L)=T*ANSY(L)+((C(I,4)*U+C(I,3))*U+C(I,2))*U+C(I,1)
        ANSY1(L)=U*ANSY1(L)+(3.D0*C(4,I)*T+2.D0*C(3,I))*T+C(2,I)
        ANSY2(L)=T*ANSY2(L)+(3.D0*C(I,4)*U+2.D0*C(I,3))*U+C(I,2)
        ANSY11(L)=U*ANSY11(L)+6.D0*C(4,I)*T+2.D0*C(3,I)
 40     ANSY22(L)=T*ANSY22(L)+6.D0*C(I,4)*U+2.D0*C(I,3)
        ANSY12(L)=(3.D0*((3.D0*C(4,4)*T+2.D0*C(3,4))*T+C(2,4))*U+
     1  2.D0*((3.D0*C(4,3)*T+2.D0*C(3,3))*T+C(2,3)))*U+
     2  (3.D0*C(4,2)*T+2.D0*C(3,2))*T+C(2,2)
        YANS(L)=ANSY(L)
        DYDX1(L)=ANSY1(L)/D1
        DYDX2(L)=ANSY2(L)/D2
        DYDDX1(L)=ANSY11(L)/D1/D1
        DYDDX2(L)=ANSY22(L)/D2/D2
        DYDX12(L)=ANSY12(L)/D1/D2
```

```
   50 CONTINUE
      RETURN
      END

SUBROUTINE CBSPL (X, Y, A, B, C, N, IBEG, IEND, ALPHA,
     BETA, IERR)
C-----------------------------------------------------------------
C                  CUBIC SPLINE INTERPOLATION
C-----------------------------------------------------------------
      IMPLICIT DOUBLE PRECISION(A-h,O-Z)
      REAL*8 X(N), Y(N), A(N), B(N), C(N)
C
      IF (N .LT. 3) GO TO 200

C     A TRIDIAGONAL LINEAR SYSTEM FOR THE UNKNOWN SLOPES S(I) OF
C     F AT X(I), I=1,...,N, IS GENERATED AND THEN SOLVED BY GAUSS
C     ELIMINATION, WITH S(I) ENDING UP IN A(I) FOR ALL I. A, B, C
C     ARE USED INITIALLY FOR WORK SPACES.
C
      DO 10 M = 2,N
         B(M) = X(M) - X(M-1)
         IF (B(M) .LE. 0.0) GO TO 210
         C(M) = (Y(M) - Y(M-1))/B(M)
   10 CONTINUE
      IERR = 0
C
C     CONSTRUCT THE FIRST EQUATION FROM THE BOUNDARY CONDITION,
OF
C     THE FORM
C
C              C(1)*S(1) + B(1)*S(2) = A(1)
C
      IF (IBEG - 1) 20,30,40
C
C     NO CONDITION AT LEFT END.
C
   20 C(1) = B(3)
      B(1) = X(3) - X(1)
      A(1) = ((B(2) + 2.0*B(1))*B(3)*C(2) + B(2)*B(2)*C(3))/B(1)
      GO TO 50
C
C     SLOPE PRESCRIBED AT LEFT END.
C
   30 C(1) = 1.0
      B(1) = 0.0
      A(1) = ALPHA
      GO TO 50
C
C     SECOND DERIVATIVE PRESCRIBED AT LEFT END.
C
   40 C(1) = 2.0
      B(1) = 1.0
      A(1) = 3.0*C(2) - 0.5*ALPHA*B(2)
C
C     FOR THE INTERIOR KNOTS, GENERATE THE CORRESPONDING
C     EQUATIONS AND CARRY OUT THE FORWARD PASS OF GAUSS
C     ELIMINATION, AFTER WHICH THE M-TH EQUATION READS
C     C(M)*S(M) + B(M)*S(M+1) = A(M).
C
```

```
   50 NM1 = N - 1
      DO 51 M = 2,NM1
         T = -B(M+1)/C(M-1)
         A(M) = T*A(M-1) + 3.0*(B(M)*C(M+1) + B(M+1)*C(M))
         C(M) = T*B(M-1) + 2.0*(B(M) + B(M+1))
   51 CONTINUE
C
C     IF THE SLOPE AT THE RIGHT END IS GIVEN, THEN SET A(N) TO
C     THE SLOPE AND GO TO BACK SUBSTITUTION. OTHERWISE, CONSTRUCT
C     THE LAST EQUATION FROM THE SECOND BOUNDARY CONDITION, OF
C     THE FORM R*S(N-1) + C(N)*S(N) = A(N)
C
      IF (IEND - 1) 60,80,90
   60 IF (N .EQ. 3 .AND. IBEG .EQ. 0) GO TO 70
C
C     NO CONDITION AT THE RIGHT END. EITHER  N .GE. 4  OR
C     THERE IS A CONDITION AT THE LEFT END.
C
      R = X(N) - X(N-2)
      DEL = (Y(NM1) - Y(N-2))/B(NM1)
      A(N) = ((B(N) + 2.0*R)*B(NM1)*C(N) + B(N)*B(N)*DEL)/R
      C(N) = B(NM1)
      GO TO 100
C
C     NO CONDITIONS AT THE END POINTS AND N = 3. IN THIS CASE,
C     THE SECOND BOUNDARY CONDITION DOES NOT PROVIDE US WITH A
C     NEW EQUATION. FOR CONVENIENCE, WE USE THE FOLLOWING...
C
   70 A(N) = 2.0*C(N)
      C(N) = 1.0
      R = 1.0
      GO TO 100
C
C     SLOPE PRESCRIBED AT RIGHT END.
C
   80 A(N) = BETA
      GO TO 110
C
C     SECOND DERIVATIVE PRESCRIBED AT RIGHT END.
C
   90 A(N) = 3.0*C(N) + 0.5*BETA*B(N)
      C(N) = 2.0
      R = 1.0
C
C     COMPLETE FORWARD PASS OF GAUSS ELIMINATION.
C
  100 T = -R/C(NM1)
      A(N) = (T*A(NM1) + A(N))/(T*B(NM1) + C(N))
C
C     CARRY OUT BACK SUBSTITUTION.
C
  110 DO 120 I = 1,NM1
         J = N - I
         A(J) = (A(J) - B(J)*A(J+1))/C(J)
  120 CONTINUE
C
C     GENERATE THE CUBIC COEFFICIENTS B(I) AND C(I).
C
      DO 130 I = 1,NM1
         H = B(I+1)
```

```
              DEL = (Y(I+1) - Y(I))/H
              T = A(I) + A(I+1) - 2.0*DEL
              B(I) = (DEL - A(I) - T)/H
              C(I) = (T/H)/H
  130 CONTINUE
      RETURN
C
C     ERROR RETURN
C
  200 IERR = 1
      RETURN
  210 IERR = 2
      RETURN
      END
C
      SUBROUTINE SEVAL (X,Y,A,B,C,N,XI,YI,YPI,YPPI)
C
C     ABSTRACT
C
C         SEVAL EVALUATES A CUBIC SPLINE AND ITS FIRST AND SECOND
C         DERIVATIVES AT THE ABSCISSAS IN XI.  IT IS ASSUMED THAT
C         THE COEFFICIENTS OF THE POLYNOMIALS WHICH FORM THE
SPLINE
C         ARE PROVIDED.
C
C     DESCRIPTION OF ARGUMENTS
C
C         --INPUT--
C
C         X   - ARRAY OF THE FIRST N ABSCISSAS (IN INCREASING
ORDER)
C               THAT DEFINE THE SPLINE.
C         Y   - ARRAY OF THE FIRST N ORDINATES THAT DEFINE THE
SPLINE.
C         A,B,C ARRAYS THAT CONTAIN THE COEFFICIENTS OF THE
POLYNOMIALS
C               WHICH FORM THE SPLINE. IF I = 1,...,N  THEN THE
SPLINE
C               HAS THE VALUE
C                  Y(I) + A(I)*DX + B(I)*DX**2 + C(I)*DX**3
C               FOR X(I) .LE. XX .LE. X(I+1).  HERE DX = XX-X(I).
C         N   - THE NUMBER OF POLYNOMIALS THAT DEFINE THE SPLINE.
C               THE ARRAYS X, Y, A, B, C  MUST BE DIMENSIONED AT
C               LEAST N.  N MUST BE GREATER THAN OR EQUAL TO 1.
C         XI  - THE ABSCISSA OR ARRAY OF ABSCISSAS (IN ARBITRARY
C               ORDER) AT WHICH THE SPLINE IS TO BE EVALUATED.
C
C         --OUTPUT--
C
C         YI  - ARRAY OF VALUES OF THE SPLINE (ORDINATES) AT XI.
C         YPI - ARRAY OF VALUES OF THE FIRST DERIVATIVE OF SPLINE
C                AT XI.
C         YPPI- ARRAY OF VALUES OF SECOND DERIVATIVES OF SPLINE
C                AT XI.
C
      IMPLICIT DOUBLE PRECISION(A-h,O-Z)
      REAL*8 X(N),Y(N),A(N),B(N),C(N),XI,YI,YPI,YPPI
C
      XX = XI
      IF (XX .LT. X(1)) GO TO 90
      IF (XX .GE. X(N)) GO TO 80
```

```
      IL = 1
      IR = N
C
C     BISECTION SEARCH
C
   10 I = (IL + IR)/2
      IF (I .EQ. IL) GO TO 100
      IF (XX - X(I)) 20,100,30
   20 IR = I
      GO TO 10
   30 IL = I
      GO TO 10
C
C     LINEAR FORWARD SEARCH
C
   50 IF (XX .LT. X(I+1)) GO TO 100
      I = I + 1
      GO TO 50
C
C     XX IS GREATER THAN X(N) OR LESS THAN X(1)
C
   80 I = N
      GO TO 100
   90 I = 1
C
C     EVALUATION
C
  100 DX = XX - X(I)
      YI = Y(I) + DX*(A(I) + DX*(B(I) + DX*C(I)))
      BI = B(I) + B(I)
      CI = 3.0*C(I)
      YPI = A(I) + DX*(BI + DX*CI)
      YPPI = BI + DX*(CI + CI)
      return
      END

C     ***************************************************************

Subroutine whoa_optimize(factor_matrix,sol
     $,                             state,control
     $,                             converged )

IMPLICIT DOUBLE PRECISION(A-H,O-Z)

Include '[-.include]wfc_prob_order_r6.inc'
      Include '[-.include]wfc_mass_r6.inc'
      Include '[-.include]wfc_bcu_r6.inc'
      Include '[-.include]wfc_sol_r6.inc'
      Include '[-.include]wfc_controls_r6.inc'
c Inputs
      Real*8 sol(*)         ! initialization parameters
      Logical factor_matrix ! should the matrix be inverted ?

c Outputs
      real*8 state(mx_x)   ! nodal values
(state/cc.slk,init/final,phase)
      real*8 control(mx_u) ! midpoint values
(state/cc.slk,element,phase)
      logical converged    ! did we meet the average
```

! convergence criteria ?

c local variable definitions

C    NZ......NUMBER OF NONZERO ENTRIES IN JACOBIAN

```
      logical stop_nri/.false./
               ! Stop newton raphson, the error is too big.
```

C  DEFINE THE NUMBER OF NONZEROES IN THE JACOBIAN FOR USE BY HARWELL

```
         if(stop_nri) return if(factor_matrix) then
 99     IJST = 2*N + M*NTOT + NP*(NS÷2)
        IJIN1 = NETOT * (2*NS*(NS+M) + 2*NS*(NS+N+M) + M*(NS+N+M)
     $             + NP*(NS+M+2) + 2*NP)
        IJIN2 = NS*(xNE(1)+1) + 2*NS*(NETOT-xNE(1)+NPH-1)

IJEN = 2*NS + m*ns

IJBC = 2*NS*(1+NBC) + M*(NS+N+M) +
     $                 NP*(NS+M+2) + 2*NP

IJPS = 2*NS*NPH*NBC + NPH*NBC
        IJTI = (NPH-1)*(2*(2*NS+M)+NBC) + 2*NS+M+NBC
        NZ1 = (IJST+IJEN+IJBC)*NPH + IJIN1 + IJPS+IJTI
        NZ2 = NZ1+IJIN2
        NZ = NZ2+IJIN2
      endif CALL NEWTON(NZ1,NZ2,NZ,factor_matrix
     $,           SOL,num_iterations,converged,stop_nri)

do i = 1,ns
         state(i) = sol(i)
      enddo
      do i = 1,m
         control(i) = sol(ntot-m+i)
      enddo
      return
      END SUBROUTINE BCTERM(KSW,IRTOT,IJTOT,PN,PHIX,PHIXX,
     &            PSIX,PSIXX,A,B,IRN,ICN)

IMPLICIT DOUBLE PRECISION (A-H,O-Z)

Include '[-.include]wfc_prob_order_r6.inc'
         Include '[-.include]wfc_mass_r6.inc'
         Include '[-.include]wfc_sol_r6.inc'

INTEGER PN,IRN(*),ICN(*),tEN
      DOUBLE PRECISION PHIX(mx_bc),PHIXX(mx_bc,mx_bc),
     &       PSIX(mx_bc,mx_nu),PSIXX(mx_bc,mx_bc,mx_nu)
      DOUBLE PRECISION X(mx_x),U(mx_u),F(mx_eqn,0:mx_ux,0:mx_ux)
     $,                  L(0:mx_ux,0:mx_ux)
      DOUBLE PRECISION A(*),B(*)
         DOUBLE PRECISION CAPHIX(mx_bc),CAPHXX(mx_bc,mx_bc)
```

```
      IF (KSW .EQ. 0) then
          CALL INDEX4 (IRTOT,IJTOT,PN,IRN,ICN)

else
         DO 17 I=1,NS
           X(I)=XHAT(I,2,PN)
17       CONTINUE
         DO 18 I=1,M
           U(I)=UHAT(I,2,PN)
18       CONTINUE
         ten = 0
         do i = 1,pn
            ten = ten + xne(i)+2
         enddo
         CALL GET_F_G_EQN_DER (PN,ten,X,U,F,L)
       endif

IF (KSW .EQ. 1) THEN

CCCCCCCCCCCCC  BEGIN ERROR VECTOR FILL IN  CCCCCCCCCCCCCCC

IL=IRTOT

C   DEFINE CAPHIX = D(PHI)/DX + NU^T*D(PSI)/DX
C   WHERE 'X' REPRESENTS ALL OF THE STATES AT ALL OF THE PHASE
C   BOUNDARIES

DO 5 J=1,2*NS*NPH
         SUM=0.0D+00
         DO 10 I=1,NBC
            SUM=SUM+PSIX(J,I)*GNU(I)
10       CONTINUE
         CAPHIX(J)=PHIX(J)+SUM
5     CONTINUE

C
C   COSTATE BOUNDARY CONDITIONS AT START AND END OF PHASE
C
      J=2*NS*(PN-1)
      DO 15 I=1,NS
         B(IL+I)=-CAPHIX(J+I)-LHAT(I,1,PN)
         B(IL+NS+I)=-CAPHIX(J+NS+I)+LHAT(I,2,PN)
15    CONTINUE

IL=IL+2*NS

C   OPTIMALITY CONDITION (DH/DU == 0) AT END OF PHASE

DO 25 I=1,M
            SUM = 0.0D+00
            DO 20 K=1,N
               IF (K .LE. NS) THEN
                  SUM = SUM + F(K,NS+I,0)*LHAT(K,2,PN)
               ELSE
         SUM = SUM + vccu(F(K,NS+I,0),XHAT(K,2,PN),LHAT(K,2,PN))
               ENDIF
20          CONTINUE
            B(IL+I) = -L(NS+I,0) - SUM
25       CONTINUE
      IL=IL+M
```

```
C   CONTROL CONSTRAINT (G + K^2 == 0) AT END OF PHASE
       DO 35 I=1,NP
          B(IL+I) =-vccmu(F(NS+I,0,0),XHAT(ns+i,2,PN),
                          LHAT(ns+i,2,PN))
 35    CONTINUE
       IL=IL+NP

C   MULTIPLIER CONDITION (MU K == 0) AT END OF PHASE

DO 45 I=1,NP
          B(IL+I) =-vcck(F(NS+I,0,0),XHAT(ns+i,2,PN),
                         LHAT(ns+i,2,PN))
 45    CONTINUE

IL = IL + NP
       IRTOT = IL

CCCCCCCCCCCCC   END ERROR VECTOR FILL IN   CCCCCCCCCCCCCCC
       ENDIF

IF (KSW .EQ. 2) THEN

CCCCCCCCCCCCCC   BEGIN JACOBIAN FILL IN   CCCCCCCCCCCCCCC

IJ=IJTOT

NSM = NS*M
       NM  = N*M
       MSQ = M*M
       NPM = NP*M
       NPNS = NP*NS

C   DEFINE CAPHXX=D^2(PHI)/DX^2 + NU^T*D^2(PSI)/DX^2

DO 37 K=1,2*NS*NPH
       DO 38 J=1,2*NS*NPH
          SUM=0.0D+00
          DO 40 I=1,NBC
             SUM=SUM+PSIXX(K,J,I)*GNU(I)
 40       CONTINUE
          CAPHXX(K,J)=PHIXX(K,J)+SUM
 38    CONTINUE
 37    CONTINUE

C   TAKE DERIVATIVE OF COSTATE BOUNDARY CONDITIONS
C   W.R.T. STATES:

IPTST=2*NS*(PN-1)
       INJ=0

C        W.R.T. COSTATES:

DO 52 I=1,NS
          A(IJ+I)=1.0D+00
          A(IJ+I+NS)=-1.0D+00
 52    CONTINUE
       IJ=IJ+2*NS

C        W.R.T. DISCRETE MULTIPLIERS NU:
```

```
            DO 53 I=1,NS
              DO 54 J=1,NBC
              INJ=INJ+1
              A(IJ+INJ)=PSIX(IPTST+I,J)
              A(IJ+NS*NBC+INJ)=PSIX(IPTST+NS+I,J)
54            CONTINUE
53        CONTINUE
         IJ=IJ+2*NS*NBC

C    TAKE DERIVATIVE OF OPTIMALITY CONDITION
C       W.R.T. STATES (X):

INJ = 0
         DO 75 I=1,M
            DO 65 J=1,NS
               INJ = INJ+1
               SUM = 0.0D+00
               DO 60 K=1,N
                  if(k.le.ns) then
                     SUM = SUM + F(K,NS+I,J)*LHAT(K,2,PN)
                  else
                     sum=sum+puvccu(f(k,ns+i,j),xhat(k,2,pn),
                                                lhat(k,2,pn))
                  endif
60             CONTINUE
               A(IJ+INJ) = L(NS+I,J) + SUM

65          CONTINUE
75       CONTINUE
         IJ = IJ + NSM

C       W.R.T. COSTATES (LAMBDA) AND MULTIPLIER (MU):

INJ = 0
         DO 90 I = 1, M
            DO 80 J=1,N
               INJ = INJ + 1
               IF (J .LE. NS) THEN
                  A(IJ+INJ) = F(J,NS+I,0)
               ELSE
                  A(IJ+INJ) = pmuvccu(F(j,NS+I,0),XHAT(j,2,PN),
s                                               LHAT(j,2,PN))
               ENDIF
80          CONTINUE
90       CONTINUE
         IJ = IJ+NM

C       W.R.T. CONTROL (U):

INJ = 0
         DO 110 I=1,M
            DO 105 J=1,M
               INJ = INJ + 1
               SUM = 0.0D+00
               DO 100 K=1,N
                  IF (K .LE. NS) THEN
                     SUM = SUM + F(K,NS+I,NS+J)*LHAT(K,2,PN)
                  ELSE
               SUM = SUM + puvccu(F(k,NS+I,NS+I),XHAT(k,2,PN),
```

```
     $                                          LHAT(k,2,PN))
              ENDIF
100        CONTINUE
           A(IJ+INJ) = L(NS+I,NS+J) + SUM
105      CONTINUE
110    CONTINUE
       IJ = IJ+MSQ

C    DERIVATIVES OF CONTROL CONSTRAINTS
C       W.R.T. STATES X:

INJ = 0
       DO 125 I=1,NP
          DO 120 J=1,NS
             INJ = INJ+1
             a(ij+inj)=puvccmu(f(ns+i,j,0),xhat(ns+i,2,pn)
     $,                              lhat(ns+i,2,pn))
120       CONTINUE
125    CONTINUE
       IJ = IJ+NPNS

C       W.R.T. SLACK VARIABLES (K):

DO 135 I=1,NP
          A(IJ+I) =
pkvccmu(F(NS+I,0,0),XHAT(ns+i,2,PN),LHAT(ns+i,2,PN))
135    CONTINUE
       IJ = IJ+NP C       W.R.T. multipliers (mu):

DO 136 I=1,NP
          A(IJ+I) =
pmuvccmu(F(NS+I,0,0),XHAT(ns+i,2,PN),LHAT(ns+i,2,PN))
136    CONTINUE
       IJ = IJ+NP

C       W.R.T. CONTROLS (U):

INJ = 0
       DO 150 I=1,NP
          DO 140 J=1,M
             INJ = INJ + 1
A(IJ+INJ)=puvccmu(F(NS+I,ns+j,0),XHAT(ns+i,2,PN),LHAT(ns+i,2,PN))
140       CONTINUE
150    CONTINUE
       IJ = IJ+NPM C    DERIVATIVES OF MULTIPLIER CONDITIONS
C       W.R.T. MULTIPLIERS AND SLACK VARIABLES DO 250 I=1,NP
          A(IJ+I) =
pkvcck(F(NS+I,0,0),XHAT(ns+i,2,PN),LHAT(ns+i,2,PN))
       A(IJ+NP+I)=pmuvcck(F(NS+I,0,0),XHAT(ns+i,2,PN),LHAT(ns+i,2,PN))
250    CONTINUE
       IJ = IJ+2*NP
       IJTOT = IJ
```

CCCCCCCCCCCCCCCCCCCCC  END JACOBIAN   FILL IN  CCCCCCCCCCCCCCC

```
      ENDIF

RETURN
      END
      SUBROUTINE INTER(KSW,IRTOT,IJTOT,IJTIM1,IJTIM2,PN,EN,
     $                 DELT,A,B,IRN,ICN)

IMPLICIT DOUBLE PRECISION(A-H,O-Z)

Include '[-.include]wfc_prob_order_r6.inc'
       Include '[-.include]wfc_sol_r6.inc'

INTEGER PN,EN,ten
      DOUBLE PRECISION X(mx_x),U(mx_u),F(mx_eqn,0:mx_ux,0:mx_ux)
     $,                 L(0:mx_ux,0:mx_ux)
      DIMENSION A(*),B(*),IRN(*),ICN(*)

C THIS routine LOADS THE PART OF THE EQUATIONS THAT DEPENDS ON THE
C QUANTITIES AT THE MIDPOINTS OF THE (EN)TH ELEMENT OF THE (PN)TH PHASE
C THIS INCLUDES TWO SETS OF STATE EQUATIONS, COSTATE EQUATIONS,
C OPTIMALITY CONDITIONS, AND CONTROL CONSTRAINTS.
C
C ALL JACOBIAN ELEMENTS ARE IN THE COLUMN CORRESPONDING TO THE BARRED
C QUANTITIES IN ELEMENT NUMBER (EN)
C
C     KSW = 1 ==> FILL IN INDICES OF JACOBIAN ELEMENTS
C     KSW = 2 ==> FILL IN PARTS OF EQUATIONS
C     KSW = 3 ==> FILL IN COMPLETE JACOBIAN ELEMENTS IF (KSW .EQ. 0) THEN
           CALL INDEX2(IRTOT,IJTOT,IJTIM1,IJTIM2,PN,IRN,ICN)
      ELSE
            DO 7 I = 1, NS
          X(I) = XBAR(I,EN,PN)
 7          CONTINUE
            DO 8 I = 1, M
               U(I) = UBAR(I,EN,PN)
 8          CONTINUE
            ten = en +1
            do i = 1,pn-1
              ten = ten + xne(i) + 2
            enddo
            CALL GET_F_G_EQN_DER (PN,ten,X,U,F,L)
      ENDIF

IF (KSW .EQ. 1) THEN

CCCCCCCC  BEGIN ERROR VECTOR FILL IN  CCCCCCCCCCCCCCCCCCCCCCC

IL=IRTOT - NTOT
      IK=IRTOT

C=DELT/2.0D+00

C  COMPUTE RIGHT HAND SIDE:
```

```
C     TWO SETS OF STATE EQUATIONS

DO 10 I=1,NS

B(IL+I) = B(IL+I) - XBAR(I,EN,PN) + C*F(I,0,0)
         B(IK+I) = B(IK+I) + XBAR(I,EN,PN) + C*F(I,0,0)

10    CONTINUE

IL=IL+NS
      IK=IK+NS

C     TWO SETS OF COSTATE EQUATIONS

DO 25 I=1,NS
         SUM = 0.0D+00
         DO 20 K=1,N
            IF (K .LE. NS) THEN
               SUM = SUM + F(K,I,0)*LBAR(K,EN,PN)
            ELSE
         sum = sum + vccx(F(K,I,0),Xbar(K,en,PN),
     $                                   Lbar(K,en,PN))
            ENDIF
20       CONTINUE B(IL+I) = B(IL+I) + LBAR(I,EN,PN) + C*(L(I,0)+SUM)
         B(IK+I) = B(IK+I) - LBAR(I,EN,PN) + C*(L(I,0)+SUM)
25    CONTINUE
      IK=IK+NS

C     OPTIMALITY CONDITION FOR (EN)TH ELEMENT

DO 45 I=1,M
         SUM = 0.0D+00
         DO 40 K=1,N
            IF (K .LE. NS) THEN
               SUM = SUM + F(K,NS+I,0)*LBAR(K,EN,PN)
            ELSE
         SUM=SUM+  vccu(F(K,NS+I,0),Xbar(K,en,PN),Lbar(K,en,PN))
            ENDIF
40       CONTINUE
         B(IK+I) = -1.0*(L(NS+I,0) + SUM)
45    CONTINUE
      IK=IK+M

C     CONTROL CONSTRAINT FOR (EN)TH ELEMENT

DO 55 I=1,NP

B(IK+I)=-vccmu(F(NS+I,0,0),Xbar(ns+i,en,PN),Lbar(ns+i,en,PN))
55    CONTINUE
      IK=IK+NP

C     CONTROL CONSTRAINT MULTIPLIER CONDITION FOR (EN)TH ELEMENT

DO 65 I=1,NP
         B(IK+I) = -vcck(F(NS+I,0,0),Xbar(ns+i,en,PN),
     $                                   Lbar(ns+i,en,PN))
65    CONTINUE
```

```
      IK = IK+NP
      IRTOT=IRTOT+NTOT

CCCCCCCCC  END ERROR VECTOR FILL IN  CCCCCCCCCCCCCCCCCCCCCC

ENDIF

IF (KSW .EQ. 2) THEN

CCCCCCCC  FILL JACOBIAN  CCCCCCCCCCCCCCCCCCCCCCCCCCCCCCCCCCC

IJ=IJTOT

NM=N*M
      NSM=NS*M
      NSSQ=NS*NS
      NSN=NS*N
      MSQ=M*M
      NPM=NP*M
      NPNS=NP*NS

C=DELT/2.0D+00
      CN=2.0D+00*xNE(PN)

C  TAKE DERIVATIVES OF STATE EQUATIONS FOR THIS ELEMENT (IJR)
C  AND THE PREVIOUS (IJ)
C  (OR, FOR EN = 1, THE EQUATIONS AT THE START OF THE PHASE)
C  IR = TOTAL NUMBER OF JACOBIAN ELEMENTS IN BLOCK FOR PREVIOUS
C    ELEMENT

IR=NSSQ+NSM+NS*(NS+N+M)
      IJR=IJ+IR

C        DERIVATIVE W.R.T. STATES (XBAR) IN EN'TH ELEMENT

INJ = 0
         DO 75 I=1,NS
            DO 70 J=1,NS
               INJ = INJ + 1
               IF (I .EQ. J) THEN
                  A(IJ+INJ)  =  1.0D+00 - C*F(I,J,0)
                  A(IJR+INJ) = -1.0D+00 - C*F(I,J,0)
               ELSE
                  A(IJ+INJ)  = -C*F(I,J,0)
                  A(IJR+INJ) =  A(IJ+INJ)
               ENDIF
 70         CONTINUE
 75      CONTINUE

IJ = IJ+NSSQ
      IJR = IJ+IR

C        DERIVATIVE W.R.T. CONTROL (UBAR) IN EN'TH ELEMENT

INJ = 0
         DO 85 I=1,NS
            DO 80 J=1,M
               INJ = INJ + 1
               A(IJ+INJ)  = -C*F(I,NS+J,0)
               A(IJR+INJ) =  A(IJ+INJ)
```

```
80         CONTINUE
85      CONTINUE
        IJ=IJ+NSM
        IJR=IJ+IR

C    DERIVATIVE W.R.T. TIME AT EITHER END OF CURRENT PHASE.
C    EACH PHASE AFTER THE FIRST ONE RELIES ON TWO TIME PARAMETERS

IF (PN .EQ. 1) THEN
     DO 86 I=1,NS
        A(IJTIM1+I)    = A(IJTIM1+I)    - F(I,0,0)/CN
        A(IJTIM1+NS+I) = A(IJTIM1+NS+I) - F(I,0,0)/CN
 86  CONTINUE
     IJTIM1=IJTIM1+NS
      ELSE
     DO 87 I=1,NS
        A(IJTIM1+I)=A(IJTIM1+I)-F(I,0,0)/CN
        A(IJTIM1+NS+I)=-A(IJTIM1+I)
        A(IJTIM1+2*NS+I)=A(IJTIM1+2*NS+I)-F(I,0,0)/CN
        A(IJTIM1+3*NS+I)=-A(IJTIM1+2*NS+I)
 87  CONTINUE
        IJTIM1=IJTIM1+2*NS
     ENDIF

C    TAKE DERIVATIVES OF THE COSTATE EQUATIONS FOR THIS
C    ELEMENT (IJ) AND THE PREVIOUS (IJR)
C       (OR, FOR EN = 1, THE EQUATIONS AT THE START OF THE PHASE)

INJ = 0
        JNJ = 0

DO 100 I=1,NS

C   W.R.T. STATES (XBAR) IN EN'TH ELEMENT

DO 95 J=1,NS
              JNJ = JNJ+1
              SUM = 0.0D+00
              DO 90 K=1,N
                 IF (K .LE. NS) THEN
                    SUM = SUM + F(K,I,J)*LBAR(K,EN,PN)
                 ELSE
                sum = sum +puvccx(f(k,i,j),xbar(k,en,pn),
    $                                       lbar(k,en,pn))
                 ENDIF
 90           CONTINUE
              A(IJ+JNJ) = -C*(L(I,J) + SUM)
              A(IJR+JNJ) = A(IJ+JNJ)
 95        CONTINUE

C   W.R.T. LAMBDA AND MU IN EN'TH ELEMENT

DO 98 J=1,N
              INJ = INJ + 1
              IF (I .EQ. J) THEN
                 A(IJ+NSSQ+INJ) = -1.0D+00 - C*F(J,I,0)
                 A(IJR+NSSQ+INJ) = 1.0D+00 - C*F(J,I,0)
              ELSE IF (J .LE. NS) THEN
                 A(IJ+NSSQ+INJ) = -C*F(J,I,0)
```

```
                    A(IJR+NSSQ+INJ) = A(IJ+NSSQ+INJ)
                ELSE
                    A(IJ+NSSQ+INJ) = -c*pmuvccx(F(J,I,0),xbar(j,en,pn)
     $,                                          LBAR(J,EN,PN))
                    A(IJR+NSSQ+INJ) = A(IJ+NSSQ+INJ)
                ENDIF
 98         CONTINUE
100     CONTINUE

IJ = IJ+NSN+NSSQ
        IJR = IJ+IR

C   W.R.T. CONTROL (UBAR) IN EN'TH ELEMENT

INJ = 0
        DO 130 I=1,NS
            DO 125 J=1,M
                INJ = INJ + 1
                SUM = 0.0D+00
                DO 120 K=1,N
                    IF (K .LE. NS) THEN
                        SUM = SUM + F(K,I,NS+J)*LBAR(K,EN,PN)
                    ELSE
sum=sum+puvccx(f(k,i,ns+j),xbar(k,en,pn),lbar(k,en,pn))
                    ENDIF
120             CONTINUE
                A(IJ+INJ) = -C*(L(I,NS+J)+SUM)
                A(IJR+INJ) = A(IJ+INJ)
125         CONTINUE
130     CONTINUE

IJ=IJ+NSM
        IJR = IJ+IR

C   DERIVATIVE W.R.T. TIMES AT EITHER END OF THE PHASE
C   EACH PHASE AFTER THE FIRST ONE RELIES ON TWO TIME PARAMETERS

IF (PN .EQ. 1) THEN
            DO 76 I=1,NS
                SUM=0.0D+00
                DO 97 J=1,N
                    IF (J .LE. NS) THEN
                        SUM=SUM + F(J,I,0)*LBAR(J,EN,PN)
                    ELSE
                sum=sum+vccx(f(j,i,0),xbar(j,en,pn),lbar(j,en,pn))
                    ENDIF
 97             CONTINUE
                A(IJTIM2+I)=A(IJTIM2+I)-(L(I,0)+SUM)/CN
                A(IJTIM2+NS+I)=A(IJTIM2+NS+I)-(L(I,0)+SUM)/CN
 76         CONTINUE
            IJTIM2=IJTIM2+NS
        ELSE
            DO 77 I=1,NS
                SUM=0.0D+00
                DO 78 J=1,N
                    IF (J .LE. NS) THEN
                        SUM=SUM + F(J,I,0)*LBAR(J,EN,PN)
                    ELSE
                sum=sum+vccx(f(j,i,0),xbar(j,en,pn),lbar(j,en,pn))
```

```
                 ENDIF
78         CONTINUE
           A(IJTIM2+I)=A(IJTIM2+I)-(L(I,0)+SUM)/CN
           A(IJTIM2+NS+I)=-A(IJTIM2+I)

A(IJTIM2+2*NS+I)=A(IJTIM2+2*NS+I)-(L(I,0)+SUM)'/CN
           A(IJTIM2+3*NS+I)=-A(IJTIM2+2*NS+I)
77         CONTINUE
           IJTIM2=IJTIM2+2*NS
       ENDIF

C TAKE DERIVATIVE OF OPTIMALITY CONDITION JUST FOR THIS
C   ELEMENT (IJR)

INJ = 0
       JNJ = 0
       DO 150 I=1,M

C     W.R.T. STATES (XBAR) FOR EN'TH ELEMENT

DO 140 J=1,NS
               JNJ = JNJ+1
               SUM = 0.0D+00
               DO 135 K=1,N
                   IF (K .LE. NS) THEN
                       SUM = SUM + F(K,NS+I,J)*LBAR(K,EN,PN)
                   ELSE
                       sum=sum+puvccu(f(k,ns+i,j),xbar(k,en,pn),
     S                                              lbar(k,en,pn))
                   ENDIF
135            CONTINUE
               A(IJR+JNJ) = L(NS+I,J) + SUM
140        CONTINUE

C     W.R.T. COSTATES (LBAR) IN THE EN'TH ELEMENT

DO 145 J=1,N
               INJ = INJ + 1
               IF (J .LE. NS) THEN
                   A(IJR+NSM+INJ) = F(J,NS+I,0)
               ELSE
                   A(IJR+NSM+INJ) =pmuvccu(F(j,NS+I,0),Xbar(j,en,PN),
     S                                              Lbar(j,en,PN))
               ENDIF
145        CONTINUE
150    CONTINUE
       IJR = IJR+NM+NSM

C     W.R.T. CONTROL (UBAR) IN THE EN'TH ELEMENT

INJ = 0
       DO 180 I=1,M
           DO 175 J=1,M
               INJ = INJ + 1
               SUM = 0.0D+00
               DO 170 K=1,N
                   IF (K .LE. NS) THEN
                       SUM = SUM + F(K,NS+I,NS+J)*LBAR(K,EN,PN)
                   ELSE
```

```
                    SUM=SUM+puvccu(F(k,NS+I,NS+j),Xbar(k,en,PN),
     $                                          Lbar(k,en,PN))
                 ENDIF
 170        CONTINUE
            A(IJR+INJ) = L(NS+I,NS+J) + SUM
 175     CONTINUE
 180  CONTINUE
      IJR = IJR+MSQ C  TAKE DERIVATIVE OF CONTROL CONSTRAINT EQUATION:
C     W.R.T. STATES (XBAR) IN THE EN'TH ELEMENT INJ = 0
         DO 200 I=1,NP
            DO 190 J=1,NS
               INJ = INJ+1
               A(IJR+INJ) = F(NS+I,J,0)
 190        CONTINUE
 200     CONTINUE
      IJR = IJR+NPNS

C     W.R.T. SLACK VARIABLES (K) IN THE EN'TH ELEMENT

DO 210 I=1,NP
         A(IJR+I) = pkvccmu(F(NS+I,0,0),Xbar(ns+i,en,PN),
     $                                  Lbar(ns+i,en,PN))
 210     CONTINUE
      IJR = IJR+NP C     W.R.T. cc multipliers (mu) IN THE EN'TH ELEMENT DO 211 I=1,NP
         A(IJR+I)=pmuvccmu(F(NS+I,0,0),Xbar(ns+i,en,PN),
     $                                  Lbar(ns+i,en,PN))
 211     CONTINUE
      IJR = IJR+NP

C     W.R.T. CONTROLS (U) IN THE EN'TH ELEMENT

INJ = 0
         DO 225 I=1,NP
            DO 220 J=1,M
               INJ = INJ + 1
            A(IJR+INJ)=puvccmu(F(NS+I,ns+j,0),Xbar(ns+i,en,PN)
     $,                                 Lbar(ns+i,en,PN))
 220        CONTINUE
 225     CONTINUE
      IJR = IJR+NPM C TAKE DERIVATIVE OF MULTIPLIER CONDITION:
C     W.R.T. MULTIPLIER (MU), THEN SLACK VARIABLE
C     IN THE EN'TH ELEMENT

DO 235 I=1,NP

A(IJR+I)   =pmuvcck(F(NS+I,0,0),Xbar(ns+i,en,PN),
     $                       Lbar(ns+i,en,PN))
         A(IJR+NP+I)=pkvcck(F(NS+I,0,0),Xbar(ns+i,en,PN),
     $                       Lbar(ns+i,en,PN))
 235     CONTINUE
```

```
      IJR = IJR+2*NP
      IJTOT = IJR

CCCCCCCCCCC   END JACOBIAN   FILL IN CCCCCCCCCCCCCCC
      ENDIF

RETURN
      END
C
      SUBROUTINE START(KSW,IRTOT,IJTOT,PN,A,B,IRN,ICN)

IMPLICIT DOUBLE PRECISION(A-H,O-Z)

Include '[-.include]wfc_prob_order_r6.inc'
          Include '[-.include]wfc_controls_r6.inc'
          Include '[-.include]wfc_sol_r6.inc'
          Include '[-.include]wfc_mass_r6.inc'

INTEGER PN,EN,ten
      DOUBLE PRECISION X(mx_x),U(mx_u),F(mx_eqn,0:mx_ux,0:mx_ux)
     $,                    L(0:mx_ux,0:mx_ux)
      DIMENSION A(*),B(*),IRN(*),ICN(*)

C THIS ROUTINE LOADS THE PART OF THE EQUATIONS FOR THE FIRST
C ELEMENT IN A PHASE THAT DEPENDS ON THE QUANTITIES AT THE
C NODES, I.E. HATTED QUANTITIES
C
C ALL DERIVATIVES ARE WITH RESPECT TO THESE HATTED QUANTITIES
C    KSW = 0 ==> FILL IN INDICES OF JACOBIAN ELEMENTS
C    KSW = 1 ==> FILL IN RIGHT HAND SIDES OF EQUATIONS
C    KSW = 2 ==> FILL IN ACTUAL JACOBIAN ELEMENTS

IF (KSW .EQ. 0) THEN
             CALL INDEX1 (IRTOT,IJTOT,IRN,ICN)
         ELSE
C  USE VALUES AT THE BEGINNING OF PHASE IN ERROR VECTOR AND
C    JACOBIAN

EN=1
             DO 7 I = 1, NS
                X(I) = XHAT(I,EN,PN)
    7        CONTINUE
             DO 8 I = 1, M
                U(I) = UHAT(I,EN,PN)
    8        CONTINUE
             ten = 0
             do i = 1,pn-1
                ten = ten +xne(i)+2
             enddo
             ten = ten + en
          CALL GET_F_G_EQN_DER(PN,ten,X,U,F,L)

ENDIF

IF (KSW .EQ. 1) THEN

CCCCCCCCCC   BEGIN ERROR VECTOR FILL IN   CCCCCCCCCCCCCCC

IL=IRTOT
```

```
C     STATE AND COSTATE EQUATIONS
      DO 10 I=1,NS
         B(IL+I) = XHAT(I,1,PN)
         B(IL+NS+I) = -LHAT(I,1,PN)
 10   CONTINUE
      IL=IL+2*NS

C     OPTIMALITY CONDITION (DH/DU == 0)

DO 25 I=1,M
         SUM = 0.0D+00
         DO 20 K=1,N
            IF (K .LE. NS) THEN
               SUM = SUM + F(K,NS+I,0)*LHAT(K,1,PN)
            ELSE
            SUM = SUM +  vccu(F(K,NS+I,0),Xhat(K,1,PN),
     $                                    Lhat(K,1,PN))
            ENDIF
 20      CONTINUE
         B(IL+I) = -L(NS+I,0) - SUM
 25   CONTINUE
      IL=IL+M

C     CONTROL CONSTRAINT (G + K^2 == 0)

DO 35 I=1,NP
         B(IL+I) = -vccmu(F(NS+I,0,0),Xhat(ns+i,1,PN)
     $,                               Lhat(ns+i,1,PN))
 35   CONTINUE
      IL=IL+NP

C     MULTIPLIER CONDITION (MU K == 0)

DO 45 I=1,NP
         B(IL+I)=-vcck(F(NS+I,0,0),Xhat(ns+i,1,PN),
     $                              Lhat(ns+i,1,PN))
 45   CONTINUE

IL = IL + NP
      IRTOT = IL

CCCCCCCCCCCCC  END ERROR VECTOR FILL IN   CCCCCCCCCCCCCCC
      ENDIF

IF (KSW .EQ. 2) THEN

CCCCCCCCCCCCC  BEGIN JACOBIAN FILL IN   CCCCCCCCCCCCCCC

IJ=IJTOT

NSM = NS*M
         NM  = N*M
         MSQ = M*M
         NPM = NP*M
         NPNS = NP*NS

C     DERIVATIVE OF STATE AND COSTATE EQUATIONS W.R.T. X AND
C     LAMBDA

DO 55 I=1,NS
```

```
              A(IJ+I) = -1.0D+00
              A(IJ+NS+I) = 1.0D+00
   55     CONTINUE
          IJ = IJ + 2*NS

C     DERIVATIVE OF OPTIMALITY CONDITION, ...
C        W.R.T. STATES (XHAT)

INJ = 0
          DO 75 I=1,M
             DO 65 J=1,NS
                 INJ = INJ+1
                 SUM = 0.0D+00
                 DO 60 K=1,N
                    IF (K .LE. NS) THEN
                        SUM = SUM + F(K,NS+I,J)*LHAT(K,1,PN)
                    ELSE
              SUM = SUM + puvccu(F(K,NS+I,J),Xhat(K,1,PN),
     $                                       Lhat(K,1,PN))
                    ENDIF
   60            CONTINUE
                 A(IJ+INJ) = L(NS+I,J) + SUM

65        CONTINUE
   75     CONTINUE
          IJ = IJ + NSM

C        W.R.T. COSTATES (LAMBDA_HAT) AND MULTIPLIER (MU_HAT)

INJ = 0
          DO 90 I = 1, M
             DO 80 J=1,N
                 INJ = INJ + 1
                 IF (J .LE. NS) THEN
                     A(IJ+INJ) = F(J,NS+I,0)
                 ELSE
                A(IJ+INJ)=pmuvccu(F(j,NS+I,0),Xhat(j,1,PN),
     $                                     Lhat(j,1,PN))
                 ENDIF
   80        CONTINUE
   90     CONTINUE
          IJ = IJ+NM

C        W.R.T. CONTROL (U_HAT)

INJ = 0
          DO 110 I=1,M
             DO 105 J=1,M
                 INJ = INJ + 1
                 SUM = 0.0D+00
                 DO 100 K=1,N
                    IF (K .LE. NS) THEN
                        SUM = SUM + F(K,NS+I,NS+J)*LHAT(K,1,PN)
                    ELSE
              SUM = SUM+ puvccu(F(k,NS+I,NS+j),Xhat(k,1,PN),
     $                                     Lhat(k,1,PN))
                    ENDIF
  100            CONTINUE
```

```
              A(IJ+INJ) = L(NS+I,NS+J) + SUM
 105       CONTINUE
 110     CONTINUE
         IJ = IJ+MSQ

C    DERIVATIVES OF CONTROL CONSTRAINTS
C       W.R.T. STATES X_HAT

INJ = 0
         DO 125 I=1,NP
           DO 120 J=1,NS
             INJ = INJ+1
             A(IJ+INJ) = puvccmu(F(NS+I,J,0),Xhat(ns+i,1,PN)
     $,                                     Lhat(ns+i,1,PN))
 120       CONTINUE
 125     CONTINUE
         IJ = IJ+NPNS

C       W.R.T. SLACK VARIABLES (K_HAT)

DO 135 I=1,NP
             A(IJ+I)=pkvccmu(F(NS+I,0,0),Xhat(ns+i,1,PN),
     $                                     Lhat(ns+i,1,PN))
 135       CONTINUE
         IJ = IJ+NP C       W.R.T. Multiplier VARIABLES (MU_HAT)

DO 137 I=1,NP
             A(IJ+I)=pmuvccmu(F(NS+I,0,0),Xhat(ns+i,1,PN),
     $                                     Lhat(ns+i,1,PN))
 137       CONTINUE
         IJ = IJ+NP

C       W.R.T. CONTROLS (U_HAT)

INJ = 0
         DO 150 I=1,NP
           DO 140 J=1,M
             INJ = INJ + 1
             A(IJ+INJ) =puvccmu(F(NS+I,ns+j,0),Xhat(ns+i,1,PN)
     $,                                     Lhat(ns+i,1,PN))
 140       CONTINUE
 150     CONTINUE
         IJ = IJ+NPM C    DERIVATIVES OF MULTIPLIER CONDITIONS
C       W.R.T. MULTIPLIERS (MU_HAT) AND SLACK VARIABLES (K_HAT)

DO 250 I=1,NP
             A(IJ+I)=pkvcck(F(NS+I,0,0),Xhat(ns+i,1,PN),
     $                                     Lhat(ns+i,1,PN))
             A(IJ+NP+I)=pmuvcck(F(NS+I,0,0),Xhat(ns+i,1,PN),
     $                                     Lhat(ns+i,1,PN))
 250       CONTINUE
         IJ = IJ+2*NP
         IJTOT = IJ

CCCCCCCCCCCCCCCC  END JACOBIAN  FILL IN CCCCCCCCCCCCCCCCCCCCCCC
```

```
      ENDIF
      RETURN
      END
C
      SUBROUTINE INDEX1 (IRTOT,IJTOT,IRN,ICN)

IMPLICIT DOUBLE PRECISION(A-H,O-Z)
        Include '[-.include]wfc_prob_order_r6.inc'
      INTEGER IRN(*),ICN(*)

C THIS ROUTINE MARKS THE PLACE IN THE JACOBIAN OF THE VARIOUS
C PARTIAL DERIVATIVE TERMS OF THE EQUATIONS FOR THE FIRST ELEMENT
C IN A PHASE (HATTED QUANTITIES ONLY)

NM = N*M
         NSM = NS*M
         NPM = NP*M
         NPNS = NP*NS
      MSQ = M*M

IL = IRTOT
      IJ = IJTOT

C     DERIVATIVE OF STATE AND COSTATE EQUATIONS W.R.T. X AND
C           LAMBDA

DO 5 I=1,NS
      IRN(IJ+I) = IL+I
      ICN(IJ+I) = IL+I
      IRN(IJ+NS+I) = IL+NS+I
      ICN(IJ+NS+I) = IL+N+I
   5  CONTINUE
      IJ = IJ + 2*NS

C     DERIVATIVE OF OPTIMALITY CONDITION EQUATION
C           W.R.T. STATES (X):

INJ = 0
         DO 35 I=1,M
            DO 20 J=1,NS
               INJ = INJ+1
               IRN(IJ+INJ) = IL+2*NS+I
            ICN(IJ+INJ) = IL+J
  20        CONTINUE
  35  CONTINUE
      IJ=IJ+NSM

C        W.R.T. COSTATES (LAMBDA) AND MULTIPLIER (MU):

INJ=0
         DO 30 I=1,M
            DO 25 J=1,N
               INJ = INJ + 1
             IRN(IJ+INJ)=IL+2*NS+I
             ICN(IJ+INJ) = IL+N+J
  25     CONTINUE
  30     CONTINUE
      IJ = IJ+NM

C        W.R.T. CONTROL (U)
```

```
            INJ = 0
            DO 50 I=1,M
               DO 45 J=1,M
                  INJ = INJ + 1
            IRN(IJ+INJ)=IL+2*NS+I
            ICN(IJ+INJ)=IL+2*N+J
45          CONTINUE
50       CONTINUE
         IJ=IJ+MSQ

C   DERIVATIVES OF CONTROL CONSTRAINTS:
C      W.R.T. STATES X

INJ = 0
            DO 65 I=1,NP
               DO 60 J=1,NS
                  INJ = INJ+1
            IRN(IJ+INJ)=IL+2*NS+M+I
            ICN(IJ+INJ)=IL+J
60          CONTINUE
65       CONTINUE
         IJ = IJ+NPNS

C      W.R.T. SLACK VARIABLES (K)

DO 75 I=1,NP
            IRN(IJ+I)=IL+2*NS+M+I
            ICN(IJ+I)=IL+NS+I
75       CONTINUE
         IJ=IJ+NP

C      W.R.T. Multiplier (mu)

DO 76 I=1,NP
            IRN(IJ+I)=IL+2*NS+M+I
            ICN(IJ+I)=IL+2*ns+np+I
76       CONTINUE
         IJ=IJ+NP

C      W.R.T. CONTROLS (U)

INJ = 0
            DO 85 I=1,NP
               DO 80 J=1,M
                  INJ = INJ + 1
            IRN(IJ+INJ)=IL+2*NS+M+I
            ICN(IJ+INJ)=IL+2*N+J
80          CONTINUE
85       CONTINUE
         IJ = IJ+NPM

C   DERIVATIVES OF MULTIPLIER CONDITIONS
C      W.R.T. MULTIPLIERS AND SLACK VARIABLES

DO 115 I=1,NP
            IRN(IJ+I)=IL+2*NS+M+NP+I
            ICN(IJ+I)=IL+NS+I
            IRN(IJ+NP+I)=IL+2*NS+M+NP+I
            ICN(IJ+NP+I)=IL+N+NS+I
115      CONTINUE
```

```
      IJ=IJ+2*NP
      IJTOT = IJ
      IRTOT = IL+2*N+M

RETURN
      END
C
      SUBROUTINE INDEX2(IRTOT,IJTOT,IJTIM1,IJTIM2,PN,IRN,ICN)

IMPLICIT DOUBLE PRECISION(A-H,O-Z)
         Include '[-.include]wfc_prob_order_r6.inc'
      INTEGER IRN(*),ICN(*),PN C THIS ROUTINE MARKS THE PLACE IN THE JACOBIAN OF
C PARTIAL DERIVATIVES WITH RESPECT TO BARRED QUANTITIES.
C THE EQUATIONS INCLUDE TWO SETS OF STATE EQUATIONS AND COSTATE
C EQUATIONS, AND ONE SET OF OPTIMALITY CONDITIONS AND CONTROL
C CONSTRAINTS PER CALL.  THIS ROUTINE IS CALLED ONCE FOR EACH
C ELEMENT OF EACH PHASE
C
C THE POINTERS IRTOT AND IJTOT MARK WHICH BLOCKS YOU'RE FILLING
C
      NM=N*M
      NSM=NS*M
      NSSQ=NS*NS
      NSN=NS*N
      MSQ=M*M
      NPM=NP*M
      NPNS=NP*NS
      N2=2*N

C    DERIVATIVES OF STATE EQUATIONS

IL = IRTOT
      IJ = IJTOT
      IR = NSSQ+NSM+NS*(NS+N+M)
      IJR = IJ+IR

C       W.R.T. STATES (X):

INJ = 0
         DO 75 I=1,NS
            DO 70 J=1,NS
          INJ = INJ + 1
          IRN(IJ+INJ) = IL-NTOT+I
          ICN(IJ+INJ) = IL+J
             IRN(IJR+INJ) = IL+I
          ICN(IJR+INJ) = IL+J
70          CONTINUE
75       CONTINUE
      IJ = IJ+NSSQ
      IJR = IJ+IR

C       W.R.T. CONTROL (U)

INJ = 0
         DO 85 I=1,NS
            DO 80 J=1,M
               INJ = INJ + 1
               IRN(IJ+INJ) = IL-NTOT+I
```

```
              ICN(IJ+INJ) = IL+2*N+J
              IRN(IJR+INJ) = IL+I
              ICN(IJR+INJ) = IL+2*N+J
 80        CONTINUE
 85      CONTINUE
       IJ=IJ+NSM
       IJR=IJ+IR

C    DERIVATIVE W.R.T. THE UNKNOWN TIMES AT THE END OF EACH
C       PHASE.
C    EACH PHASE AFTER THE FIRST ONE RELIES ON TWO TIME
C       PARAMETERS.
C    THE FIRST PHASE IS ASSUMED TO START AT T=0.

IF (PN .EQ. 1) THEN
       DO 86 I=1,NS
          IRN(IJTIM1+I)=IL-NTOT+I
          ICN(IJTIM1+I)=IORDER-NPH+PN
          IRN(IJTIM1+NS+I)=IL+I
          ICN(IJTIM1+NS+I)=IORDER-NPH+PN
 86   CONTINUE
      IJTIM1=IJTIM1+NS
       ELSE
       DO 87 I=1,NS
          IRN(IJTIM1+I)=IL-NTOT+I
          ICN(IJTIM1+I)=IORDER-NPH+PN
          IRN(IJTIM1+NS+I)=IL-NTOT+I
          ICN(IJTIM1+NS+I)=IORDER-NPH+PN-1

IRN(IJTIM1+2*NS+I)=IL+I
          ICN(IJTIM1+2*NS+I)=IORDER-NPH+PN
          IRN(IJTIM1+3*NS+I)=IL+I
          ICN(IJTIM1+3*NS+I)=IORDER-NPH+PN-1
 87   CONTINUE
          IJTIM1=IJTIM1+2*NS
        ENDIF

C    DERIVATIVES OF COSTATE EQUATIONS

INJ = 0
          JNJ = 0
          DO 100 I=1,NS

C       W.R.T. STATES (X)

DO 95 J=1,NS
                JNJ = JNJ+1
                IRN(IJ+JNJ) = IL-NTOT+NS+I
                ICN(IJ+JNJ) = IL+J
                IRN(IJR+JNJ) = IL+NS+I
                ICN(IJR+JNJ) = IL+J
 95        CONTINUE

C       W.R.T. LAMBDA AND MU

DO 98 J=1,N
                INJ = INJ + 1
                IRN(IJ+NSSQ+INJ) = IL-NTOT+NS+I
                ICN(IJ+NSSQ+INJ) = IL+N+J
                IRN(IJR+NSSQ+INJ) = IL+NS+I
```

```
              ICN(IJR+NSSQ+INJ) = IL+N+J
 98        CONTINUE

100     CONTINUE
        IJ = IJ+NSN+NSSQ
        IJR = IJ+IR

C     W.R.T. CONTROL (U)

INJ = 0
         DO 130 I=1,NS
            DO 125 J=1,M
               INJ = INJ + 1
               IRN(IJ+INJ) = IL-NTOT+NS+I
            ICN(IJ+INJ) = IL+N2+J
               IRN(IJR+INJ) = IL+NS+I
               ICN(IJR+INJ) = IL+N2+J
125         CONTINUE
130      CONTINUE
        IJ=IJ+NSM
        IJR = IJ+IR

C     DERIVATIVE W.R.T. TIME
C     EACH PHASE AFTER THE FIRST ONE RELIES ON TWO TIME PARAMETERS

IF (PN .EQ. 1) THEN
      DO 96 I=1,NS
         IRN(IJTIM2+I)=IL-NTOT+NS+I
         ICN(IJTIM2+I)=IORDER-NPH+PN
         IRN(IJTIM2+NS+I)=IL+NS+I
         ICN(IJTIM2+NS+I)=IORDER-NPH+PN
  96  CONTINUE
      IJTIM2=IJTIM2+NS
       ELSE
      DO 97 I=1,NS
         IRN(IJTIM2+I)=IL-NTOT+NS+I
         ICN(IJTIM2+I)=IORDER-NPH+PN
         IRN(IJTIM2+NS+I)=IL-NTOT+NS+I
         ICN(IJTIM2+NS+I)=IORDER-NPH+PN-1

IRN(IJTIM2+2*NS+I)=IL+NS+I
         ICN(IJTIM2+2*NS+I)=IORDER-NPH+PN
         IRN(IJTIM2+3*NS+I)=IL+NS+I
         ICN(IJTIM2+3*NS+I)=IORDER-NPH+PN-1
  97  CONTINUE
         IJTIM2=IJTIM2+2*NS
        ENDIF

C   DERIVATIVES OF OPTIMALITY CONDITION

INJ = 0
         JNJ = 0
         DO 150 I=1,M

C     W.R.T. STATES (X)

DO 140 J=1,NS
              JNJ = JNJ+1
              IRN(IJR+JNJ) = IL+2*NS+I
            ICN(IJR+JNJ) = IL+J
```

```
 140        CONTINUE

C    W.R.T. COSTATES (LAMBDA)

DO 145 J=1,N
           INJ = INJ + 1
           IRN(IJR+NSM+INJ) = IL+2*NS+I
           ICN(IJR+NSM+INJ) = IL+N+J
 145       CONTINUE
 150    CONTINUE
C    W.R.T. CONTROL (U)

IJR = IJR+NM+NSM

INJ = 0
        DO 180 I=1,M
           DO 175 J=1,M
              INJ = INJ + 1
          IRN(IJR+INJ)=IL+2*NS+I
          ICN(IJR+INJ)=IL+2*N+J
 175       CONTINUE
 180    CONTINUE
        IJR = IJR+MSQ

C DERIVATIVES OF CONTROL CONSTRAINT EQUATION:
C    W.R.T. STATES (X)

INJ = 0
        DO 200 I=1,NP
           DO 190 J=1,NS
              INJ = INJ+1
          IRN(IJR+INJ)=IL+2*NS+M+I
          ICN(IJR+INJ)=IL+J
 190       CONTINUE
 200    CONTINUE
        IJR = IJR+NPNS

C    W.R.T. SLACK VARIABLES (K)

DO 210 I=1,NP
          IRN(IJR+I)=IL+2*NS+M+I
          ICN(IJR+I)=IL+NS+I
 210    CONTINUE
        IJR = IJR+NP

C    W.R.T. multiplier (mu)

DO 211 I=1,NP
          IRN(IJR+I)=IL+2*NS+M+I
          ICN(IJR+I)=IL+2*NS+np+I
 211    CONTINUE
        IJR = IJR+NP

C    W.R.T. CONTROLS (U)

INJ = 0
        DO 225 I=1,NP
           DO 220 J=1,M
              INJ = INJ + 1
          IRN(IJR+INJ)=IL+2*NS+M+I
```

```
            ICN(IJR+INJ)=IL+2*N+J
220       CONTINUE
225    CONTINUE
       IJR = IJR+NPM

C DERIVATIVE OF MULTIPLIER CONDITION
C    W.R.T. MULTIPLIER (MU), THEN SLACK VARIABLE (K)

DO 235 I=1,NP
         IRN(IJR+I)=IL+2*NS+M+NP+I
         ICN(IJR+I)=IL+N+NS+I
         IRN(IJR+NP+I)=IL+2*NS+M+NP+I
         ICN(IJR+NP+I)=IL+NS+I
235    CONTINUE

IJR = IJR+2*NP
    IJTOT = IJR
    IRTOT = IRTOT+NTOT

RETURN
    END

SUBROUTINE INDEX4 (IRTOT,IJTOT,PN,IRN,ICN)

C
C THIS ROUTINE MARKS THE PLACE IN THE JACOBIAN FOR PARTIAL
C DERIVATIVES WITH RESPECT TO THE HATTED QUANTITIES.  THE
C EQUATIONS OF INTEREST HERE ARE THE COSTATE BOUNDARY
C CONDITIONS.  ALSO INCLUDED ARE THE CONTROL CONSTRAINTS,
C OPTIMALITY CONDITIONS AND THE MULTIPLIER CONDITIONS AT
C THE END OF EACH PHASE.

IMPLICIT DOUBLE PRECISION(A-H,O-Z)

Include '[-.include]wfc_prob_order_r6.inc'
    INTEGER IRN(*),ICN(*),PN

IJ=IJTOT
    IL=IRTOT

NSM = NS*M
     NM  = N*M
     MSQ = M*M
     NPM = NP*M
     NPNS = NP*NS

C   DERIVATIVE OF COSTATE BOUNDARY CONDITIONS
C    W.R.T. STATES

INJ=0
    DO 44 K=1,NPH
       IF (K .EQ. 1) THEN
          IPTST=0
       ELSE
          IPTST=IPTEND+NTOT
       ENDIF
       IPTEND=IPTST+NTOT*(xNE(K)+1)
       IF (K .EQ. PN) THEN
          IKEEPS=IPTST
          IKEEPE=IPTEND
```

```
         ENDIF

44 CONTINUE

C      W.R.T. COSTATES

DO 52 I=1,NS
            IRN(IJ+I)= IL+I
            ICN(IJ+I)= IKEEPS+N+I
            IRN(IJ+NS+I)=IL+NS+I
            ICN(IJ+NS+I)=IKEEPE+N+I
   52    CONTINUE
         IJ=IJ+2*NS

C      W.R.T. DISCRETE MULTIPLIERS NU
         DO 53 I=1,NS
            DO 54 J=1,NBC
            INJ=INJ+1
            IRN(IJ+INJ)= IL+I
            ICN(IJ+INJ)= IORDER-NPH-NBC+J
            IRN(IJ+NS*NBC+INJ)=IL+NS+I
            ICN(IJ+NS*NBC+INJ)=IORDER-NPH-NBC+J
   54       CONTINUE
   53    CONTINUE

IJ=IJ+2*NS*NBC

C   DERIVATIVE OF OPTIMALITY CONDITION EQUATION

C      W.R.T. STATES (X)

INJ = 0
         DO 35 I=1,M
            DO 20 J=1,NS
               INJ = INJ+1
               IRN(IJ+INJ) = IL+2*NS+I
            ICN(IJ+INJ) = IL+J
   20       CONTINUE
   35 CONTINUE
      IJ=IJ+NSM

C      W.R.T. COSTATES (LAMBDA) AND MULTIPLIER (MU)

INJ=0
      DO 30 I=1,M
            DO 25 J=1,N
               INJ = INJ + 1
            IRN(IJ+INJ)=IL+2*NS+I
            ICN(IJ+INJ) = IL+N+J
   25       CONTINUE
   30    CONTINUE
         IJ = IJ+NM

C      W.R.T. CONTROL (U)

INJ = 0
         DO 50 I=1,M
            DO 45 J=1,M
               INJ = INJ + 1
```

```
            IRN(IJ+INJ)=IL+2*NS+I
            ICN(IJ+INJ)=IL+2*N+J
 45         CONTINUE
 50      CONTINUE
         IJ=IJ+MSQ

C    DERIVATIVES OF CONTROL CONSTRAINTS:
C       W.R.T. STATES X

INJ = 0
         DO 65 I=1,NP
            DO 60 J=1,NS
               INJ = INJ+1
            IRN(IJ+INJ)=IL+2*NS+M+I
            ICN(IJ+INJ)=IL+J
 60         CONTINUE
 65      CONTINUE
         IJ = IJ+NPNS

C       W.R.T. SLACK VARIABLES (K)

DO 75 I=1,NP
            IRN(IJ+I)=IL+2*NS+M+I
            ICN(IJ+I)=IL+NS+I
 75      CONTINUE
         IJ=IJ+NP

C       W.R.T. Multipliers (Mu)

DO 76 I=1,NP
            IRN(IJ+I)=IL+2*NS+M+I
            ICN(IJ+I)=IL+2*NS+np+I
 76      CONTINUE
         IJ=IJ+NP

C       W.R.T. CONTROLS (U)

INJ = 0
         DO 85 I=1,NP
            DO 80 J=1,M
               INJ = INJ + 1
            IRN(IJ+INJ)=IL+2*NS+M+I
            ICN(IJ+INJ)=IL+2*N+J
 80         CONTINUE
 85      CONTINUE
         IJ = IJ+NPM

C    DERIVATIVES OF MULTIPLIER CONDITIONS
C       W.R.T. MULTIPLIERS AND SLACK VARIABLES

DO 115 I=1,NP
            IRN(IJ+I)=IL+2*NS+M+NP+I
            ICN(IJ+I)=IL+NS+I
            IRN(IJ+NP+I)=IL+2*NS+M+NP+I
            ICN(IJ+NP+I)=IL+N+NS+I
 115     CONTINUE

IJ=IJ+2*NP
      IJTOT=IJ

IRTOT=IL+2*NS+M+2*NP
```

```
RETURN
END

Function g_eqn(u1,u2,x,y,z)
      Implicit None
      Include '[-.include]wfc_prob_order_r6.inc'
      Include '[-.include]wfc_namcom_r6.inc'
      Real*8 g_eqn,u1,u2,x,y,z g_eqn =  u1*u1 - ulimit *
     $    ((abs(range_o2*(1+cmerr)-x*x-y*y-z*z))/range_o2)**ccexp return
      end Function vccu(pg,k,mu)
         Implicit None
         Include '[-.include]wfc_prob_order_r6.inc'
         Include '[-.include]wfc_controls_r6.inc'
         Real*8 pg,k,mu,vccu
         if(ccv8) then
            vccu = 2*pg*(mu*mu+dabs(mu))
         elseif(ccv9) then
            vccu = abs(mu)*pg
         else
            vccu = mu*mu*pg
         endif
         return
         end Function puvccu(ppg,k,mu)
         Implicit None
         Include '[-.include]wfc_prob_order_r6.inc'
         Include '[-.include]wfc_controls_r6.inc'
         Real*8 ppg,k,mu,puvccu
         if(ccv8) then
            puvccu = 2*ppg*(mu*mu+dabs(mu))
         elseif(ccv9) then
            puvccu = abs(mu)*ppg
         else
            puvccu = ppg*mu*mu
         endif
         return
         end Function pmuvccu(pg,k,mu)
         Implicit None
         Include '[-.include]wfc_prob_order_r6.inc'
         Include '[-.include]wfc_controls_r6.inc'
         Real*8 pg,k,mu,pmuvccu
         if(ccv8) then
            pmuvccu = 2*pg*(2*mu+1)
         elseif(ccv9) then
            pmuvccu = pg
         else
            pmuvccu = 2*mu*pg
         endif
         return
         end Function vccx(pg,k,mu)
```

```
      Implicit None
      Include '[-.include]wfc_prob_order_r6.inc'
      Include '[-.include]wfc_controls_r6.inc'
      Real*8 pg,k,mu,vccx
      if(ccv8) then
         vccx = 2*pg*(mu*mu+dabs(mu))
      elseif(ccv9) then
         vccx = abs(mu)*pg
      else
         vccx = mu*mu*pg
      endif
      return
      end Function puvccx(ppg,k,mu)
      Implicit None
      Include '[-.include]wfc_prob_order_r6.inc'
      Include '[-.include]wfc_controls_r6.inc'
      Real*8 ppg,k,mu,puvccx
      if(ccv8) then
         puvccx = 2*ppg*(mu*mu+dabs(mu))
      elseif(ccv9) then
         puvccx = abs(mu)*ppg
      else
         puvccx = ppg*mu*mu
      endif
      return
      end Function pmuvccx(pg,k,mu)
      Implicit None
      Include '[-.include]wfc_prob_order_r6.inc'
      Include '[-.include]wfc_controls_r6.inc'
      Real*8 pg,k,mu,pmuvccx
      if(ccv8) then
         pmuvccx = 2*pg*(2*mu+1)
      elseif(ccv9) then
         pmuvccx = pg
      else
         pmuvccx = 2*mu*pg
      endif
      return
      end Function vccmu(g,k,mu)
      Implicit None
      Include '[-.include]wfc_prob_order_r6.inc'
      Include '[-.include]wfc_namcom_r6.inc'
      Include '[-.include]wfc_controls_r6.inc'
      Real*8 g,k,mu,vccmu
      if(ccv8) then
         vccmu = (2*g+k*k+dabs(k))*(2*mu+1)
      elseif(ccv9) then
         vccmu = g+k*k   +k*ccerr
      else
         vccmu = g+k*k
      endif
      return
      end Function puvccmu(pg,k,mu)
```

```
Implicit None
Include '[-.include]wfc_prob_order_r6.inc'
Include '[-.include]wfc_controls_r6.inc'
Include '[-.include]wfc_namcom_r6.inc'
Real*8 pg,k,mu,puvccmu
if(ccv8) then
   puvccmu = 2*pg*(2*mu+1)
elseif(ccv9) then
   puvccmu = pg
else
   puvccmu = pg
endif
return
end Function pkvccmu(g,k,mu)
Implicit None
Include '[-.include]wfc_prob_order_r6.inc'
Include '[-.include]wfc_controls_r6.inc'
Include '[-.include]wfc_namcom_r6.inc'
Real*8 g,k,mu,pkvccmu
if(ccv8) then
   pkvccmu = (2*k+1)*(2*mu+1)
elseif(ccv9) then
   pkvccmu = 2*k + ccerr
else
   pkvccmu = 2*k
endif
return
end Function pmuvccmu(g,k,mu)
Implicit None
Include '[-.include]wfc_prob_order_r6.inc'
Include '[-.include]wfc_controls_r6.inc'
Include '[-.include]wfc_namcom_r6.inc'
Real*8 g,k,mu,pmuvccmu
if(ccv8) then
   pmuvccmu = 2*(2*g+k*k+dabs(k))
elseif(ccv9) then
   pmuvccmu = 0
else
   pmuvccmu = 0
endif
return
end Function vcck(g,k,mu)
Implicit None
Include '[-.include]wfc_prob_order_r6.inc'
Include '[-.include]wfc_controls_r6.inc'
Include '[-.include]wfc_namcom_r6.inc'
Real*8 g,k,mu,vcck
if(ccv8) then
   vcck = (2*k+1)*(mu*mu+dabs(mu))
elseif(ccv9) then
   vcck = abs(mu)*k+ccerr
else
   vcck = mu*k
endif
return
```

```fortran
      end

Function pkvcck(g,k,mu)
      Implicit None
      Include '[-.include]wfc_prob_order_r6.inc'
      Include '[-.include]wfc_controls_r6.inc'
      Include '[-.include]wfc_namcom_r6.inc'
      Real*8 g,k,mu,pkvcck
      if(ccv8) then
         pkvcck = 2*(mu*mu+dabs(mu))
      elseif(ccv9) then
         pkvcck = mu
      else
         pkvcck = mu
      endif
      return
      end Function pmuvcck(g,k,mu)
      Implicit None
      Include '[-.include]wfc_prob_order_r6.inc'
      Include '[-.include]wfc_controls_r6.inc'
      Include '[-.include]wfc_namcom_r6.inc'
      Real*8 g,k,mu,pmuvcck
      if(ccv8) then
         pmuvcck = (2*mu+1)*(2*k+1)
      elseif(ccv9) then
         pmuvcck = k + ccerr
      else
         pmuvcck = k
      endif
      return
      end Function filt(temp,shift_i)
      real*8 temp,gfilter,filt
      integer shift_i
      integer*2 ifilter(4),shift,iishft,filter
      equivalence (gfilter,ifilter)
      shift = shift_i
      gfilter = temp
      filter = ifilter(4)
      filter = iishft(filter, shift)
      filter = iishft(filter,-shift)
      ifilter(4) = filter
      filt = gfilter
      return
      end subroutine check_cc1(time,sol,refactor_matrix)
      implicit none
      Include '[-.include]wfc_prob_order_r6.inc'
      Include '[-.include]wfc_namcom_r6.inc'
      Include '[-.include]wfc_sol_r6.inc'
      Include '[-.include]wfc_controls_r6.inc'
c
c  Routine to evaluate a single control costraint equation
c
```

```fortran
      double precision sol(*),k_off_bmn/0.0d0/,k_off_bmx
     $,              k_on_bv/0.0d0/,mu_off_bv/0.0d0/
     $,              highest_mu_value/0.0d0/,time
     $,              mu_delta_exceeding_bndry/-1.0/
     $,              k_delta_leaving_bndry/0.001/
     $,              percent_leaving_bndry/0.005/
     $,              mu_alpha_slope/-5.0/
     $,              alpha_percent_error/0.0001/
     $,              k_percent_error/0.0002/
     $,              mu_percent_error/0.003/
     $,              state(mx_x),costate(mx_x),
     $,                control(mx_u),sum,x,y
     $,              f(mx_eqn,0:mx_ux,0:mx_ux),
     $,                l(0:mx_ux,0:mx_ux)
     $,              last_refactor_time,mu_upper_error,
     $                mu_lower_error
      real*8   k_i(mx_cc),k_o(mx_cc),mu_o(mx_cc),
     $              mu_i(mx_cc),ratio,z
     $,     u_i(mx_cc),u_o(mx_cc),g_isol,g_coup,tot_u
     $,     g_i(mx_cc),g_o(mx_cc),g_eqn,u_max,u,filt
     $,     xi,yi,zi integer i,j,k,error_trig_val(mx_cc),phase,shift
      integer lw_sl,up_sl,up_mu,lw_mu,alpha_i,
     $        limit_trig_val(mx_cc),i1
      logical refactor_matrix,limit_trig(mx_cc),error_trig(mx_cc)
     $,       u_ride(mx_cc),clc_k(mx_cc),clc_mu(mx_cc),
     $          refactor(mx_cc)

c
c   Initialize u_max     = dsqrt(ulimit)

k_on_bv   = -ccerr/2.0
      k_off_bmn = 0.0d0   !  -ccerr*1000.0 highest_mu_value = 0.0d0 mu_lower_error = u_max*mu_percent_error
      mu_upper_error = u_max*mu_percent_error c do for each unit (ie. elements and phase nodes)
      do i = 1,netot+2*nph xi = sol(ntot*(i-1) + 1)
         yi = sol(ntot*(i-1) + 2)
         zi = sol(ntot*(i-1) + 3)

k_off_bmx = dsqrt(dabs(g_eqn(0.0d0,0.0d0,xi,yi,zi)))

c
c check for errors before resetting the cc's
c
         do j = 1,m  ! filtering out bit twiddling
            u_i(j) = sol(ntot*(i-1)+2*n+j)
            u_o(j) = filt(u_i(j),0)   ! drop lower 4 bits
            u_i(j) = u_o(j)
         enddo
         do j = 1,np
```

```
            k_i(j)    = sol(ntot*(i-1)+ns+j)
            mu_i(j)   = sol(ntot*(i-1)+n+ns+j)

k_o(j)    = filt(k_i(j),0)   ! drop lower 4 bits
            mu_o(j)   = filt(mu_i(j),0)  ! drop lower 4 bits k_i(j)    = k_o(j)
            mu_i(j)   = mu_o(j)
            u         = u_o(1)
            y         = u_o(2)
            g_i(j)    = g_eqn(u,y,xi,yi,zi)
            g_o(j)    = g_i(j)

enddo if(dabs(g_i(1)).lt.ulimit*alpha_percent_error ) then
               g_o(1) = g_eqn(u_o(1),u_o(2),xi,yi,zi)
            endif
         if(k_i(1).gt.k_off_bmx
     $       .and.k_i(1).lt.
     $         k_off_bmx*(1+k_percent_error)) then
               k_o(1) = k_off_bmx endif
            if(mu_i(1).gt.highest_mu_value
     $        .and.mu_i(1).lt.mu_upper_error) then
               mu_o(1) = -mu_i(1)
            endif c
c   Begin evaluating the control constraints which have come in
c   and been compensated for errors.  The values used are the
c   "xx_o" values.  The "xx_i" values are strictly for record.
c
            call eval_bndry_cnd1(percent_leaving_bndry,u_max
     $,                         xi,yi,zi,cmerr,ccexp,range_o2
     $,                         k_off_bmn,k_off_bmx,k_on_bv,mu_off_bv
     $,                         mu_o(1),k_o(1),g_o(1),u_o(1),u_o(2)
     $,                         clc_k(1),clc_mu(1),u_ride(1),refactor(1))
c
c  Okay the bndary conditions have been evaluated and the proper
c  values have been set for "u".  Now, I have to check to see if I
c  need to calculate values for mu or k and do so.
c
            if(refactor(1)) refactor_matrix = .true.
            if(clc_mu(1)) then
               do k = 1,ns
                  state(k)   = sol(ntot*(i-1)+k)
                  costate(k) = sol(ntot*(i-1)+n+k)
               enddo control(1)   = u_o(1)
            control(2)   = u_o(2)

if(i.le.xne(1)+2) then
               phase = 1
            elseif(i.le.xne(1)+xne(2)+4) then
               phase = 2
            elseif(i.le.xne(1)+xne(2)+xne(3)+6) then
               phase = 3
```

```fortran
            endif
            call get_f_g_eqn_der(phase,i,state,control,f,1)
            sum = 0.0d0
            do j = 1,m
              do k = 1,ns
                sum = sum + f(k,ns+j,0)*costate(k)
              enddo
            enddo if( dabs(2*(u_o(1)+u_o(2))).lt. 1.0e-5) then
                        ! added for single cc problem
              sum = 1.0d0
            else
              sum = dsqrt(dabs(sum/(2*(u_o(1)+u_o(2)))))
            endif
            mu_o(1) = -dabs(sum)
          endif   ! mu's have been appropriately set, now do k's.

if(clc_k(1)) k_o(1) = dsqrt(dabs(g_o(1)))
          if(clc_k(2)) k_o(2) = dsqrt(dabs(g_o(2)))

c   now write the appropriate values in the suggested solution and
c   save a file do j = 1,np
            sol(ntot*(i-1)+ns+j)   = k_o(j)
            sol(ntot*(i-1)+n+ns+j) = mu_o(j)
          enddo
          do j = 1,m
            sol(ntot*(i-1)+n+n+j)  = u_o(j)
          enddo
        enddo
        return
        end Function ratio(u1,u2,u_mod,u_max)
        Implicit None
        real*8 u1,u2,u_mod,u_max,ratio,d d = dsqrt(u1*u1+u2*u2)
        if(d .gt. 1e-15) then
          ratio = u_mod*u_max/d
        else
          ratio = 0.0d0
        endif return
        end subroutine eval_bndry_cnd1(percent_leaving_bndry,u_max
     $,                           xi,yi,zi,cmerr,ccexp,range_o2
     $,                           k_off_bmn,k_off_bmx,k_on_bv,mu_off_bv
     $,                           mu,k,g,u,y
     $,                           clc_k,clc_mu,u_ride,refactor )

implicit none real*8  u_max,mu,k,g,u,percent_leaving_bndry,
     $          y,z,ratio,g_eqn,tu
```

```
     $,        xi,yi,zi,cmerr,ccexp,range_o2
     $,        k_off_bmn,k_off_bmx,k_on_bv,mu_off_bv
      logical clc_k,clc_mu,u_ride,refactor,limit_trig
      integer limit_trig_val c initialize the output values clc_k      = .false.
      clc_mu     = .false.
      u_ride     = .false.
      refactor   = .false.
      limit_trig = .false.

if(mu.lt.mu_off_bv.and.k.eq.k_on_bv) then
        if(g.gt.0) then     ! mu:on, u:on  the bndry
          u_ride   = .true.
          tu       = dsign(ratio(u,y,u,u_max),u)
          y        = dsign(ratio(u,y,y,u_max),y)
          u        = tu
          g        = 0.0d0
        elseif(g.eq.0.0d0) then ! mu:on, u:on  the bndry
          u_ride   = .true.
        else
          if(g_eqn(u,y,xi,yi,zi).gt.0.050) then ! believe u
            clc_k    = .true.
            mu       = mu_off_bv
            refactor = .true.
          else                                  ! believe mu
            if(mu.ge.0.0d0) then
              clc_mu   = .true.
            endif
            k        = 0.0d0
            u_ride   = .true.
            tu       = dsign(ratio(u,y,u,u_max),u)
            y        = dsign(ratio(u,y,y,u_max),y)
            u        = tu
            g        = 0.0d0
          endif
        endif
      elseif(mu.gt.mu_off_bv.and.k.eq.k_on_bv) then
        if(g.lt.0) then   ! leaving the bndry
          mu       = mu_off_bv
          clc_k    = .true.
          refactor = .true.
        else
          clc_k    = .true.
          refactor = .true.
          g        = - percent_leaving_bndry
          tu    = dsign(ratio(u,y,u,u_max)*
     $                  (1-percent_leaving_bndry),u)
          y     = dsign(ratio(u,y,y,u_max)*
     $                  (1-percent_leaving_bndry),y)
          u     = tu
          mu    = mu_off_bv
        endif
      elseif(mu.eq.mu_off_bv.and.k.gt.k_off_bmn) then
                                           ! mu: off, k:off
        if(g.lt.0) then   ! k and u agree to stay off the bndry
          refactor = .false.
        elseif(g.eq.0) then   ! k: off, u: on, believing k.
```

```
      clc_k    = .true.
      g        = - percent_leaving_bndry
      tu       = dsign(ratio(u,y,u,u_max)*
     $                         (1-percent_leaving_bndry),u)
      y        = dsign(ratio(u,y,y,u_max)*
     $                         (1-percent_leaving_bndry),y)
      u        = tu
    else
      if (dabs(g).ge.k) then   ! believing u
        clc_mu   = .true.
        u_ride   = .true.
        refactor = .true.
        g        = 0.0d0
        k        = k_on_bv
        tu       = dsign(ratio(u,y,u,u_max),u)
        y        = dsign(ratio(u,y,y,u_max),y)
        u        = tu
      else                     ! believing k
        mu       = mu_off_bv
        clc_k    = .true.
        tu       = dsign(ratio(u,y,u,u_max)*
     $                         (1-percent_leaving_bndry),u)
        y        = dsign(ratio(u,y,y,u_max)*
     $                         (1-percent_leaving_bndry),y)
        u        = tu
        g        = g_eqn(u,y,xi,yi,zi)
      endif
    endif
  elseif(mu.eq.mu_off_bv.and.k.lt.k_off_bmn) then
                                ! mu:off, k:on
    if(g.ge.0) then
      clc_mu   = .true.
      u_ride   = .true.
      refactor = .true.
        tu       = dsign(ratio(u,y,u,u_max),u)
        y        = dsign(ratio(u,y,y,u_max),y)
        u        = tu
      g        = 0.0d0
      k        = k_on_bv
    else
      clc_k    = .true.
      mu       = mu_off_bv
    endif
  elseif(k.ne.k_on_bv.and.((k.lt.k_off_bmn ) .or.
     $   (k.gt.k_off_bmx) ) ) then
                       ! k is out of good bounds, check u
    if(g.ge.0) then   ! move on bndry
      k        = k_on_bv
      u_ride   = .true.
      tu       = dsign(ratio(u,y,u,u_max),u)
      y        = dsign(ratio(u,y,y,u_max),y)
      u        = tu
      if(mu.ge.mu_off_bv) clc_mu  = .true.
      if(mu.eq.mu_off_bv) refactor = .true.
      g        = 0.0d0
    else              ! move off bndry
      clc_k    = .true.
      if(mu.eq.mu_off_bv) refactor = .false.
      mu       = mu_off_bv
    endif
```

```
      elseif((k.gt.k_off_bmn.and.mu.ne.mu_off_bv)    .or.
$     (k.eq.k_on_bv.and.mu.eq.mu_off_bv) ) then
        if(g.ge.0) then          ! moving on bndry
          clc_mu   = .true.
          u_ride   = .true.
          refactor = .true.
          k        = k_on_bv
          g        = 0.0d0
          tu       =  dsign(ratio(u,y,u,u_max),u)
          y        =  dsign(ratio(u,y,y,u_max),y)
          u        = tu
        else                    ! leaving bndry
          clc_k    = .true.
          refactor = .true.
          mu       = mu_off_bv
        endif
      endif
      return
      end subroutine eval_cc(time,sol,refactor_matrix)
      implicit none
      Include '[-.include]wfc_prob_order_r6.inc' real*8 sol(*),time
      logical refactor_matrix if(np.eq.1)   then
        call check_cc1(Time,sol,refactor_matrix)
      elseif(np.eq.2) then
        call check_cc2(Time,sol,refactor_matrix)
      endif return
      end subroutine check_cc2(time,sol,refactor_matrix)
      implicit none Include '[-.include]wfc_prob_order_r6.inc'
      Include '[-.include]wfc_namcom_r6.inc'
      Include '[-.include]wfc_sol_r6.inc'
      Include '[-.include]wfc_controls_r6.inc' double precision sol(*),k_off_bmn/0.0d0/,k_off_bmx
$,                    k_on_bv/0.0d0/,mu_off_bv/0.0d0/,time
$,                    mu_delta_exceeding_bndry/-1.0/
$,                    k_delta_leaving_bndry/0.001/
$,                    percent_leaving_bndry/0.005/
$,                    mu_alpha_slope/-5.0/
$,                    alpha_percent_error/0.0001/
$,                    k_percent_error/0.0002/
$,                    mu_percent_error/.003/
$,                    state(mx_x),costate(mx_x),
$,                    control(mx_u),sum,x,y
$,                    f(mx_eqn,0:mx_ux,0:mx_ux),
$                     l(0:mx_ux,0:mx_ux)
$,                    last_refactor_time,mu_upper_error,
```

```
     $              mu_lower_error
      real*8  k_i(mx_cc),k_o(mx_cc),mu_o(mx_cc),mu_i(mx_cc)
     $,       u_i(mx_cc),u_o(mx_cc),g_isol,g_coup,tot_u
     $,       g_i(mx_cc),g_o(mx_cc),g_eqn,sqrt_two,u_max,u,filt
     $,       cal_k,cal_1mu_bndry,cal_2mu_bndry
     $,       ck_1mu_bndry,ck_2mu_bndry
     $,       xi,yi,zi integer i,j,k,error_trig_val(mx_cc),phase,shift
      integer lw_sl,up_sl,up_mu,lw_mu,alpha_i,
     $        limit_trig_val(mx_cc),i1
      logical refactor_matrix,limit_trig(mx_cc),error_trig(mx_cc)
     $,       u_ride(mx_cc),clc_k(mx_cc),clc_mu(mx_cc),
     $        refactor(mx_cc)
     $,       ck_k
c
c  Initialize c  Define Functions cal_k(u,xi,yi,zi)  =(-1.0d0+dsqrt(1.0d0-
     S                              4*g_eqn(u,u,xi,yi,zi)))/2.
      ck_k(u,xi,yi,zi)   =(1.0d0.ge.4*g_eqn(u,u,xi,yi,zi))

ck_1mu_bndry(sum)  = 1
      ck_2mu_bndry(sum)  = 1
      cal_1mu_bndry(sum) = -dsqrt(abs(sum)/(2*u_max))
      cal_2mu_bndry(sum) = -dsqrt(abs(sum)/(4*u_max))

k_on_bv    = -ccerr/2.0
      k_off_bmn  = 0.0d0    !  -ccerr*1000.0
      sqrt_two   = dsqrt(2.0d0)

c do for each unit (ie. elements and phase nodes)

do i = 1,netot+2*nph xi = sol(ntot*(i-1)+1)
         yi = sol(ntot*(i-1)+2)
         zi = sol(ntot*(i-1)+3)

k_off_bmx = cal_k(0.0d0,xi,yi,zi)
         u_max     = dsqrt(dabs(g_eqn(0.0d0,0.0d0,xi,yi,zi)))

mu_lower_error = u_max*mu_percent_error
         mu_upper_error = u_max*mu_percent_error c
c check for errors before resetting the cc's
c
         do j = 1,m   ! filtering out bit twiddling
            u_i(j) = sol(ntot*(i-1)+2*n+j)
            u_o(j) = filt(u_i(j),0)   ! drop lower 4 bits
            u_i(j) = u_o(j)
         enddo
         do j = 1,np
            k_i(j)  = sol(ntot*(i-1)+ns+j)
            mu_i(j) = sol(ntot*(i-1)+n+ns+j)
```

```
         k_o(j)    = filt(k_i(j),0)    ! drop lower 4 bits
         mu_o(j)   = filt(mu_i(j),0)   ! drop lower 4 bits k_i(j)    = k_o(j)
         mu_i(j)   = mu_o(j)
         u         = u_o(j)
         g_i(j)    = g_eqn(u,u,xi,yi,zi)
         g_o(j)    = g_i(j)

enddo do j = 1,np
         if(dabs(g_i(j)).lt.ulimit*alpha_percent_error ) then u_o(j) = dsign(u_max,u_i(j))
            g_o(j) = 0
         endif if(mu_i(j).gt.mu_off_bv
     $      .and.mu_i(j).lt.mu_upper_error) then
            mu_o(j) = -mu_i(j)
         endif enddo c
c  Begin evaluating the control constraints which have come in
c  and been compensated for errors.  The values used are the
c  "xx_o" values.
c   The "xx_i" values are strictly for record.
c
      do j = 1,np
         call eval_bndry_cnd2(percent_leaving_bndry,u_max
     $,                      xi,yi,zi,cmerr,ccexp,range_o2
     $,                      k_off_bmn,k_off_bmx,k_on_bv,mu_off_bv
     $,                      mu_o(j),k_o(j),g_o(j),u_o(j)
     $,                      clc_k(j),clc_mu(j),u_ride(j),refactor(j))
      enddo
c
c Okay the bndary conditions have been evaluated and the proper
c values have been set for "u".  Now, I have to check to see if I
c need to calculate values for mu or k and do so.
c
      if(refactor(1).or.refactor(2)) refactor_matrix = .true.
      if(clc_mu(1).or.clc_mu(2)) then
         do k = 1,ns
            state(k)  = sol(ntot*(i-1)+k)
            costate(k)= sol(ntot*(i-1)+n+k)
         enddo control(1)  = u_o(1)
         control(2)  = u_o(2)

if(i.le.xne(1)+2) then
            phase = 1
         elseif(i.le.xne(1)+xne(2)+4) then
            phase = 2
         elseif(i.le.xne(1)+xne(2)+xne(3)+6) then
            phase = 3
```

```
          endif
          call get_f_g_eqn_der(phase,i,state,control,f,1)
          sum = 0.0d0
          do j = 1,m
            do k = 1,ns
              sum = sum + f(k,ns+j,0)*costate(k)
            enddo
          enddo
          sum = -dabs(sum)
          if((clc_mu(1).and.clc_mu(2)).or.
     $       (clc_mu(1).and.u_ride(2)).or.
     $       (clc_mu(2).and.u_ride(1)) ) then if(ck_2mu_bndry(sum).ge.0.0d0) then
                mu_o(1) = cal_2mu_bndry(sum)
                mu_o(2) = mu_o(1)
             else   ! we're in some sort of trouble
                mu_o(1) = -2.0d0
                mu_o(2) = -2.0d0
             endif elseif(clc_mu(1)) then
             mu_o(1) = -2.0d0
             if(ck_1mu_bndry(sum).ge.0.0d0) mu_o(1) =
     $                              cal_1mu_bndry(sum)
          elseif(clc_mu(2)) then
             mu_o(2) = -2.0d0
             if(ck_1mu_bndry(sum).ge.0.0d0) mu_o(2) =
     $                              cal_1mu_bndry(sum)
          endif
          endif   ! mu's have been appropriately set, now do k's.

if(clc_k(1).and.ck_k(u_o(1),xi,yi,zi))
     $                        k_o(1) = cal_k(u_o(1),xi,yi,zi)
          if(clc_k(2).and.ck_k(u_o(2),xi,yi,zi))
     $                        k_o(2) = cal_k(u_o(2),xi,yi,zi)

c now write the appropriate values in the suggested solution and
c save a file do j = 1,np
            sol(ntot*(i-1)+ns+j)   = k_o(j)
            sol(ntot*(i-1)+n+ns+j) = mu_o(j)
          enddo
          do j = 1,m
            sol(ntot*(i-1)+n+n+j)  = u_o(j)
          enddo enddo return
       end subroutine eval_bndry_cnd2(percent_leaving_bndry,u_max
     $,                xi,yi,zi,cmerr,ccexp,range_o2
     $,                k_off_bmn,k_off_bmx,k_on_bv,mu_off_bv
     $,                mu,k,g,u
     $,                clc_k,clc_mu,u_ride,refactor)

implicit none
```

```
      real*8   u_max,mu,k,g,u,percent_leaving_bndry
     $,        k_off_bmn,k_off_bmx,k_on_bv,mu_off_bv
     $,        xi,yi,zi,cmerr,ccexp,range_o2 logical clc_k,clc_mu,u_ride,refactor,limit_trig
      integer limit_trig_val c initialize the output values clc_k       = .false.
      clc_mu      = .false.
      u_ride      = .false.
      refactor    = .false.

if(mu.lt.mu_off_bv.and.k.eq.k_on_bv) then
        if(g.gt.0) then      ! mu:on, ,k:on, u:on
                             !   staying on the bndry
          u_ride   = .true.
          u        = dsign(u_max,u)
          g        = 0.0d0
        elseif(g.eq.0.0d0) then   ! mu:on, ,k:on, u:on
                                  !   staying on the bndry
          u_ride   = .true.
        else                      ! mu:on, ,k:on, u:on
          if((u_max - dabs(u))/u_max.gt.0.40) then
                                  !   leaving bndry
            clc_k    = .true.
            mu       = mu_off_bv
            refactor = .true.
          else                    ! staying on bndry
            clc_mu   = .true.
            u_ride   = .true.
            u        = dsign(u_max,u)
            g        = 0.0d0
          endif
        endif
      elseif(mu.gt.mu_off_bv.and.k.eq.k_on_bv) then
                                  ! mu:off,  k:on the bndry
        if(g.lt.0) then
          mu       = mu_off_bv
          clc_k    = .true.
          refactor = .true.
        else     ! mu:off, k:on, u:on; leaving bndry
          clc_k    = .true.
          refactor = .true.
          g        = - percent_leaving_bndry
          u        =
     dsign(u_max*(1-dabs(mu)*percent_leaving_bndry),u)
          if(dabs(u).gt.u_max) u =
     $
     dsign(u_max*(1-percent_leaving_bndry),u)
          mu       = mu_off_bv
        endif
      elseif(mu.eq.mu_off_bv.and.k.gt.k_off_bmn) then
                                  ! mu: off, k:off
        if(g.lt.0) then       ! u:off staying off bndry
          refactor = .false.
        elseif(g.eq.0) then   ! u: on, staying off
          clc_k    = .true.
          g        = - percent_leaving_bndry
```

```
        u        = dsign(u_max*(1-percent_leaving_bndry),u)
      else                    ! u: on
        if (dabs(g).ge.k) then  ! moving on bndry
          clc_mu  = .true.
          u_ride  = .true.
          refactor = .true.
          g        = 0.0d0
          k        = k_on_bv
          u        = dsign(u_max,u)
        else                        ! staying off bndry
          mu      = mu_off_bv
          clc_k   = .true.
          u       = dsign(u_max*(1-percent_leaving_bndry),u)
        endif
      endif
    elseif(mu.eq.mu_off_bv.and.k.lt.k_off_bmn) then
                                             ! mu:off, k:on
      if(g.ge.0) then  ! u: on  ; moving on bndry
        clc_mu  = .true.
        u_ride  = .true.
        refactor = .true.
        u        = dsign(u_max,u)
        g        = 0.0d0
        k        = k_on_bv
      else              ! u: off ; staying off bndry
        clc_k   = .true.
        mu      = mu_off_bv
      endif
    elseif(k.ne.k_on_bv.and.((k.lt.k_off_bmn ) .or.
  $   (k.gt.k_off_bmx) ) ) then  ! k is out of good bounds,
check u
      if(g.ge.0) then  ! move on bndry
        k       = k_on_bv
        u_ride  = .true.
        u       = dsign(u_max,u)
        if(mu.ge.mu_off_bv) clc_mu   = .true.
        if(mu.eq.mu_off_bv) refactor = .true.
        g        = 0.0d0
      else              ! move off bndry
        clc_k   = .true.
        if(mu.eq.mu_off_bv) refactor = .false.
        mu      = mu_off_bv
      endif
    elseif((k.gt.k_off_bmn.and.mu.ne.mu_off_bv)  .or.
  $   (k.eq.k_on_bv.and.mu.eq.mu_off_bv) ) then
      if(g.ge.0) then       ! moving on bndry
        clc_mu  = .true.
        u_ride  = .true.
        refactor = .true.
        k        = k_on_bv
        g        = 0.0d0
        u        = dsign(u_max,u)
      else                   ! leaving bndry
        clc_k   = .true.
        refactor = .true.
        mu      = mu_off_bv
      endif
    endif
   return
   end
```

```
      SUBROUTINE ENDPH(KSW,IRTOT,IJTOT,PN,delt,A,B,IRN,ICN)

IMPLICIT DOUBLE PRECISION(A-H,O-Z)
         Include '[-.include]wfc_prob_order_r6.inc'
         Include '[-.include]wfc_sol_r6.inc'

INTEGER PN,ten
      DOUBLE PRECISION X(mx_x),U(mx_u),F(mx_eqn,0:mx_ux,0:mx_ux)
     $,                L(0:mx_ux,0:mx_ux)
      DIMENSION A(*),B(*),IRN(*),ICN(*)

C THIS ROUTINE LOADS THE PART OF THE EQUATIONS FOR THE LAST
ELEMENT
C IN A PHASE THAT DEPENDS ON THE QUANTITIES AT THE
C NODES, I.E. HATTED QUANTITIES
C
C ALL DERIVATIVES ARE WITH RESPECT TO THESE HATTED QUANTITIES
C
C     KSW = 1 ==> FILL IN INDICES OF JACOBIAN ELEMENTS
C     KSW = 2 ==> FILL IN RIGHT HAND SIDES OF EQUATIONS
C     KSW = 3 ==> FILL IN ACTUAL JACOBIAN ELEMENTS c
c     IF (KSW .EQ. 0) CALL INDEX3(IRTOT,IJTOT,IRN,ICN)
c

IF (KSW .EQ. 0) then
          CALL INDEX3(IRTOT,IJTOT,IRN,ICN)
      ELSEIF (ksw .eq. 2) then   ! only need this for the Jacobian
          C = Delt/2.0d0

DO 7 I = 1, NS
         X(I) = xhat(I,2,PN)
 7        CONTINUE
          DO 8 I = 1, M
             U(I) = Uhat(I,2,PN)
 8        CONTINUE
          ten = 0
          do i = 1,pn
             ten = ten + xne(i) + 2
          enddo
          CALL GET_F_G_EQN_DER (PN,ten,X,U,F,L)
      ENDIF

IF (KSW .EQ. 1) THEN

CCCCCCCCCCCCCC   BEGIN ERROR VECTOR FILL IN   CCCCCCCCCCCCCCC

IL=IRTOT - NTOT

C     STATE AND COSTATE EQUATIONS

DO 5 I=1,NS
         B(IL+I) = B(IL+I) - XHAT(I,2,PN)
         B(IL+NS+I) = B(IL+NS+I) + LHAT(I,2,PN)
 5    CONTINUE

CCCCCCCCCCCCCC   END ERROR VECTOR FILL IN   CCCCCCCCCCCCCCC
```

```
      ENDIF

IF (KSW .EQ. 2) THEN

CCCCCCCCCCCCCC  BEGIN JACOBIAN FILL IN   CCCCCCCCCCCCCCCCCCCC

C     DERIVATIVE OF STATE AND COSTATE EQUATIONS W.R.T. X AND
LAMBDA

IJ = IJTOT

DO 15 I=1,NS
      A(IJ+I) = 1.0D+00
      A(IJ+NS+I) = -1.0D+00
  15  CONTINUE
      IJ = IJ + 2*NS

C Derivative of the node state wrt control  D^xhat/Du .

INJ = 0
         DO 85 I=1,NS
            DO 80 J=1,M
               INJ = INJ + 1
               A(IJ+INJ) =   -C*F(I,NS+J,0)
  80        CONTINUE
  85     CONTINUE
         IJ=IJ+NS*M
C
      IJTOT = IJ

CCCCCCCCCCCCCCCC   END JACOBIAN FILL IN   CCCCCCCCCCCCCCCCCCCC

ENDIF

RETURN
      END
C
      SUBROUTINE ERRJAC(sol,KSW,factor,NZ1,NZ2,NZ
     $,                       b,good_vector)

IMPLICIT DOUBLE PRECISION(A-H,O-Z)
        Include '[-.include]wfc_prob_order_r6.inc'
        Include '[-.include]wfc_controls_r6.inc'
        Include '[-.include]wfc_sol_r6.inc'
        Include '[-.include]wfc_mass_r6.inc'
        Include '[-.include]wfc_harwell_r6.inc'

C  THIS ROUTINE FILLS THE INDICES, THE ERROR VECTOR, OR THE
C  JACOBIAN DEPENDING ON KSW.  IT ALSO SOLVES THE LINEARIZED
C  SYSTEM IF NEEDED.

c  Inputs:
c
       real*8 sol(*)    ! contains the guessed solution vector
       integer KSW      ! 0:  GET INDICES
                        ! 1:  GET ERROR VECTOR (B)
                        ! 2:  GET JACOBIAN (A)
       logical factor   ! decides whether or not to factor the
                      1   matrix
```

```fortran
      integer nz1            ! integer nonzero counter
      integer nz2            ! integer nonzero counter
      integer  nz            ! integer total non-zero counter
c Outputs:
c
      logical good_vector
      real*8  b(*)           ! the error vector from the matrix
c local
      integer ivect(80000) ! row index
      integer jvect(80000) ! column index
      DOUBLE PRECISION PHIX(mx_bc),PHIXX(mx_bc,mx_bc),
     &        PSIX(mx_bc,mx_nu),PSIXX(mx_bc,mx_bc,mx_nu)
     $,       PHIT(mx_nph),PSI(mx_nu),PSIT(mx_nph,mx_nu)
      DOUBLE PRECISION A(200000),W(8325),temp_a(60000),temp_b(835)
     $,                     uu/1.0d0/
      INTEGER
     IRN(80000),ICN(200000),IKEEP(41625),IW(66600),iflag/0/
     $,          licn/200000/,lirn/80000/ c
      good_vector = .false.
             ! initialize harwell results indicator.

C   BREAK THE SOLUTION VECTOR INTO VARIABLES.
C   THIS IS THE ORDER OF THE COLUMNS IN THE JACOBIAN

IF (KSW .NE. 0) THEN
         CALL XLAMU(sol)
      ENDIF

C   ZERO ERROR VECTOR AND JACOBIAN IF APPROPRIATE

IF (KSW .EQ. 1) THEN
            DO 65 I=1,IORDER
         B(I) = 0.0D+00
  65           CONTINUE
      ENDIF

IF (KSW .EQ. 2) THEN
            DO 70 I=1,NZ
            A(I) = 0.0D+00
  70          CONTINUE
         ENDIF

C   OBTAIN PHI, PSI AND THEIR DERIVATIVES W.R.T. TIME AND THE
C   STATES

IF (KSW .NE. 0) THEN
          CALL GET_BND_EQN_DER(PHIT,PHIX,PHIXX,PSI,PSIT,PSIX,PSIXX)
        ENDIF
C
C   IRTOT IS A RUNNING TOTAL OF THE ROW NUMBERS
C   IJTOT IS A RUNNING TOTAL OF THE JACOBIAN ELEMENTS
C   IJTIME IS A RUNNING TOTAL OF CERTAIN JACOBIAN ELEMENTS

IRTOT = 0
      IJTOT = 0
      IJTIM1 = NZ1
      IJTIM2 = NZ2
```

```
C  FILL IN THE INDICES, ERROR VECTOR, OR JACOBIAN
C  IRN(I): HOLDS ROW INDEX FOR I_TH JACOBIAN ELEMENT B(I)
C  ICN(I): HOLDS COLUMN INDEX FOR I_TH JACOBIAN ELEMENT B(I)

DO 100 KPH=1,NPH

IF (KPH .EQ. 1) THEN
           DELT=TTIL(1)/xNE(1)
      ELSE
         DELT=(TTIL(KPH)-TTIL(KPH-1))/xNE(KPH)
      ENDIF

C     EQUATIONS AT THE START OF A PHASE:

CALL START(KSW,IRTOT,IJTOT,KPH,A,B,IRN,ICN)

C     INTERNAL EQUATIONS IN A PHASE

DO 200 K=1,xNE(KPH)
         CALL INTER(KSW,IRTOT,IJTOT,IJTIM1,IJTIM2,KPH,
     &                   K,DELT,A,B,IRN,ICN)
  200      CONTINUE

C     UPDATE COUNTERS FOR THE TIME DERIVATIVES
      IJTIM1 = IJTIM1 + NS
      IJTIM2 = IJTIM2 + NS

IF (KPH .GT. 1) THEN
         IJTIM1 = IJTIM1 + NS
           IJTIM2 = IJTIM2 + NS
      ENDIF

C  EQUATIONS AT THE END OF A PHASE
      CALL ENDPH(KSW,IRTOT,IJTOT,KPH,delt,A,B,IRN,ICN)

C  BOUNDARY CONDITIONS ON COSTATES, AND OTHER CONDITIONS AT THE
C  END OF A PHASE

CALL BCTERM(KSW,IRTOT,IJTOT,KPH,PHIX,PHIXX,
     &          PSIX,PSIXX,A,B,IRN,ICN)

100 CONTINUE

C  PRESCRIBED BOUNDARY CONDITIONS, PSI
      CALL PSITER(KSW,IRTOT,IJTOT,PSI,PSIX,PSIT,A,B,IRN,ICN)

C  CONTINUITY OF HAMILTONIAN REQUIREMENTS FOR THE UNKNOWN TIMES

CALL TIMTER(KSW,IRTOT,IJTOT,PHIT,PSIT,A,B,IRN,ICN)

IF (ksw.eq.0) THEN
         DO 85 I=1,NZ
            IVECT(I) = IRN(I)
            JVECT(I) = ICN(I)
   85    CONTINUE
      ENDIF

C  SOLVE THE SYSTEM IF REQUIRED
```

```
88    IF (KSW .EQ. 2) THEN

IF (factor.or.iflag.lt.0) THEN

DO 75 I=1,NZ
                IRN(I) = IVECT(I)
                ICN(I) = JVECT(I)
                temp_a(i)= a(i)
75           CONTINUE CALL factor_matrix
     (IORDER,NZ,A,LICN,IRN,LIRN,ICN,UU,IKEEP
     $,                                       IW,W,IFLAG)
             if(iflag.lt.0) then
                good_vector = .false.
                return
             endif
             CALL invert_matrix (IORDER,A,LICN,ICN,IKEEP,B,W,1)
             factor = .false.

ELSE

DO  I=1,NZ
                temp_a(i)= a(i)
             enddo

CALL
     factor_matrix_a(IORDER,NZ,A,LICN,IVECT,JVECT,ICN,IKEEP
     $,                                       IW,W,IFLAG)
             if(iflag.lt.0) then
                do i = 1,nz
                   a(i) = temp_a(i)
                enddo
                goto 88
             endif CALL invert_matrix (IORDER,A,LICN,ICN,IKEEP,B,W,1)

ENDIF   ! for the invert matrix question

ENDIF   ! if we want to get the correction vector
       good_vector = .true.
       RETURN
       END function ham(PN,EN,X,U,LAM)

C     THIS SUBROUTINE CALCULATES THE HAMILTONIAN, 'HAM'
C
C     X,LAM,U ARE ASSUMED TO HAVE ALREADY BEEN TAKEN FROM HAT OR
C     BAR VECTORS _BEFORE_ BEING INPUT.

IMPLICIT DOUBLE PRECISION (A-H,O-Z)
          Include '[-.include]wfc_prob_order_r6.inc'
          Include '[-.include]wfc_sol_r6.inc'

INTEGER PN,en
```

```
      DOUBLE PRECISION X(mx_x),U(mx_u),F(mx_eqn,0:mx_ux,0:mx_ux)
     $,                L(0:mx_ux,0:mx_ux),ham,lam(mx_x)

CALL GET_F_G_EQN_DER(PN,en,X,U,F,L)

SUM=0.0D+00
      DO 10 I=1,NS
          if(i.le.ns) then
          SUM=SUM + F(I,0,0)*LAM(I)
          else
          SUM=SUM + vccu(F(I,0,0),x(i),LAM(I))
          endif
 10   CONTINUE
      HAM=L(0,0)+SUM

RETURN
      END

SUBROUTINE INDEX3(IRTOT,IJTOT,IRN,ICN)

Include '[-.include]wfc_prob_order_r6.inc'

INTEGER IRN(*),ICN(*)

C THIS SUBROTINE MARKS THE PLACE IN THE JACOBIAN OF THE VARIOUS
C PARTIAL DERIVATIVE TERMS WITH RESPECT TO HATTED QUANTITIES FOR
C THE EQUATIONS FOR THE LAST ELEMENT IN A PHASE

IJ = IJTOT
      IL = IRTOT

C     DERIVATIVE OF STATE AND COSTATE EQUATIONS W.R.T. X AND
C     LAMBDA

DO 5 I=1,NS
      IRN(IJ+I) = IL-NTOT+I
      ICN(IJ+I) = IL+I
      IRN(IJ+NS+I) = IL-NTOT+NS+I
      ICN(IJ+NS+I) = IL+N+I
 5    CONTINUE

IJ=IJ+2*NS

INJ = 0
         DO 85 I=1,NS
            DO 80 J=1,M
               INJ = INJ + 1
               IRN(IJ+INJ) = IL-NTOT+I
               ICN(IJ+INJ) = IL+2*N+J
 80         CONTINUE
 85      CONTINUE
      IJ=IJ+NS*M

IJTOT=IJ

RETURN
      END
```

```
      SUBROUTINE INDEX5(IRTOT,IJTOT,IRN,ICN)

C  THIS ROUTINE MARKS THE PLACE IN THE JACOBIAN FOR PARTIAL
C   DERIVATIVES OF THE PRESCRIBED BOUNDARY CONDITIONS, PSI, WITH
C   RESPECT TO THE VALUES OF THE STATES AT THE BEGINNING AND END
C   OF EACH PHASE.
C
C  REMINDER:   NBC == NUMBER OF PRESCRIBED BOUNDARY CONDITIONS

IMPLICIT DOUBLE PRECISION (A-H,O-Z)
          Include '[-.include]wfc_prob_order_r6.inc'
      INTEGER IRN(*),ICN(*)

IL=IRTOT
      IJ=IJTOT

DO 20 I=1,NPH
         IF (I .EQ. 1) THEN
            IPTST=0
         ELSE
            IPTST=IPTEND+NTOT
         ENDIF
         IPTEND=IPTST+NTOT*(xNE(I)+1)

INJ=0
         DO 30 J=1,NBC
            DO 40 K=1,NS
               INJ = INJ+1
               IRN(IJ+INJ)=IL+J
               ICN(IJ+INJ)=IPTST+K
               IRN(IJ+INJ+NS)=IL+J
               ICN(IJ+INJ+NS)=IPTEND+K
 40         CONTINUE
            IJ=IJ+2*ns+1
            INJ=0
            IRN(IJ)=IL+J
            ICN(IJ)=IORDER-NPH+I
 30      CONTINUE
 20   CONTINUE

IJTOT=IJ
      IRTOT=IL+NBC

RETURN
      END

SUBROUTINE INDEX6(IRTOT,IJTOT,IRN,ICN)

C  THIS ROUTINE MARKS THE PLACE IN THE JACOBIAN FOR DERIVATIVES
C  WITH RESPECT TO QUANTITIES AT THE BEGINNING AND END OF EACH
C  PHASE.  THE EQUATIONS OF INTEREST ARE THE JUMP CONDITIONS ON
C  THE HAMILTONIAN AT THE PHASE BOUNDARIES AND THE END POINT
C  CONDITION ON THE HAMILTONIAN.

IMPLICIT DOUBLE PRECISION (A-H,O-Z)
          Include '[-.include]wfc_prob_order_r6.inc'
      INTEGER IRN(*),ICN(*)

IJ=IJTOT
```

```
      IL=IRTOT
      NPTR = 0

DO 20 K=1,NPH

IF (K .NE. NPH) THEN
      NPTR = NPTR+NTOT*(xNE(K)+1)

C  GET DERIVATIVES OF HMINUS

C  W.R.T. STATES (X)
      DO 25 J=1,NS
         IRN(IJ+J) = IL+K
         ICN(IJ+J) = NPTR+J
   25 CONTINUE
      IJ=IJ+NS

C  W.R.T. COSTATES (LAMBDA)

DO 35 J=1,NS
            IRN(IJ+J) = IL+K
         ICN(IJ+J) = NPTR+N+J
   35 CONTINUE
      IJ=IJ+NS

C  W.R.T. CONTROLS (U)
      DO 45 J=1,M
         IRN(IJ+J) = IL+K
         ICN(IJ+J) = NPTR+2*N+J
   45 CONTINUE

C  TAKE DERIVATIVES OF HPLUS
C      W.R.T. STATES (X)

IJ=IJ+M
      DO 26 J=1,NS
         IRN(IJ+J) = IL+K
         ICN(IJ+J) = NPTR+NTOT+J
   26 CONTINUE

C      W.R.T. COSTATES (LAMBDA)
      IJ=IJ+NS
      DO 36 J=1,NS
         IRN(IJ+J) = IL+K
         ICN(IJ+J) = NPTR+NTOT+N+J
   36 CONTINUE

C      W.R.T. CONTROLS (U)
      IJ=IJ+NS
      DO 46 J=1,M
         IRN(IJ+J) = IL+K
         ICN(IJ+J) = NPTR+NTOT+2*N+J
   46 CONTINUE

C      W.R.T. NU
      IJ=IJ+M
      DO 56 J=1,NBC
         IRN(IJ+J) = IL+K
         ICN(IJ+J) = IORDER-NPH-NBC+J
   56 CONTINUE
```

```
         IJ = IJ+NBC
         NPTR = NPTR+NTOT

ELSE

NPTR=IORDER-NPH-NBC-NTOT
         IL=IORDER

C  TAKE DERIVATIVES OF HMINUS + D(CAP PSI)/DT = 0,
C  ASSUMING THAT PHI AND PSI ARE LINEAR FUNCTIONS OF TIME

C  DERIVATIVES W.R.T. STATES AT FINAL NODE (X_HAT)

DO 27 J=1,NS
            IRN(IJ+J)=IL
            ICN(IJ+J)=NPTR+J
  27     CONTINUE

C     W.R.T. COSTATES AT FINAL NODE (LAMBDA_HAT)
         IJ=IJ+NS
         DO 37 J=1,NS
            IRN(IJ+J)=IL
            ICN(IJ+J)=NPTR+N+J
  37     CONTINUE

C     W.R.T. CONTROLS AT FINAL NODE (U_HAT)
         IJ=IJ+NS
         DO 47 J=1,M
            IRN(IJ+J)=IL
            ICN(IJ+J)=NPTR+2*N+J
  47     CONTINUE

C     W.R.T. NU
         IJ=IJ+M
         DO 57 J=1,NBC
            IRN(IJ+J)=IL
            ICN(IJ+J)=NPTR+NTOT+J
  57     CONTINUE
         IJ=IJ+NBC
      ENDIF
  20  CONTINUE
      IJTOT=IJ
      IRTOT = IL+NPH

RETURN
      END

SUBROUTINE NEWTON (NZ1,NZ2,NZ,parent_refactor
     $,                         SOL,totcnt,converged,stop_nri)

C  THIS ROUTINE DOES A RESTRICTED STEP NEWTON METHOD.

IMPLICIT DOUBLE PRECISION(A-H,O-Z)
         Include '[-.include]wfc_prob_order_r6.inc'
         Include '[-.include]wfc_mass_r6.inc'
         Include '[-.include]wfc_controls_r6.inc'
         Include '[-.include]wfc_namcom_r6.inc' c inputs
```

```
      integer nz1,nz2,nz   ! number of nonzeroes in the matrix
      logical parent_refactor c inputs/outputs dimension sol(*)     ! initial and final solution c outputs integer totcnt
          ! number of iterations reqrired for convergence
      logical converged ! did we converge ?
      logical stop_nri
          ! stop the newton raphson iteration we're lost
c locals real*8 err_avg,err_avg_best,err_max,err_max_best logical child_refactor ,factor
      logical dum_f/.false./,good_inversion DIMENSION correction_vector(835),sol_best(835),b(835)

INTEGER trj_idx/0/,cycle/0/
     $,        index_jacobian/0/,get_error/1/,
     $,         fill_invert_jacobian/2/
     $,        get_avg_err/1/,get_max_err/2/
     $,        loc_ele_err_max,loc_var_err_max,loc_err_max
c Initialize converged = .false.
      cycle = cycle + 1
      totcnt = 0 if(parent_refactor) then
        CALL ERRJAC(sol,index_jacobian,dum_f,NZ1,NZ2,NZ,b,dum_f)
        factor = .true.
        parent_refactor = .false.
      endif if(cap_cc.and.(np.ne.0)) then
        call eval_cc(Time_since_launch,sol,child_refactor)

if(child_refactor) then
          child_refactor = .false.
          factor         = .true.
        endif
      endif CALL ERRJAC(sol,get_error,dum_f,NZ1,NZ2,NZ,b,dum_f)

call evaluate_error(get_avg_err,i,b,err_avg_best,i,i,i)
      call evaluate_error(get_max_err,i,b,err_max_best
     $,         loc_ele_err_max,loc_var_err_max,loc_err_max)

err_avg = err_avg_best
      err_max = err_max_best 110   continue

CALL ERRJAC(sol,fill_invert_jacobian,factor,NZ1,NZ2,NZ
```

```
     $,                      b,good_inversion)

DO I=1,IORDER
        correction_vector(i) = b(i)
        SOL_best(I)=SOL(I) ! save what might be the best guess
     enddo 120  totcnt = totcnt + 1  ! 'total iteration' counter if(good_inversion) then
        do i = 1,iorder SOL(I)=SOL(I)+newton_scale_factor(i)*correction_vector(i)
        enddo
     endif if(cap_cc.and.(np.ne.0)) then
        call eval_cc(Time_since_launch,sol,child_refactor)
        if(child_refactor) then
           child_refactor = .false.
           factor         = .true.
        endif
     endif CALL ERRJAC(sol,get_error,dum_f,NZ1,NZ2,NZ,b,dum_f)

call evaluate_convergence(totcnt,err_max_best
     $,               trj_idx,correction_vector,b
     $,               sol,sol_best,factor
     $,               int_converg_eval)

goto (130,110,120,140,150) int_converg_eval 130  converged =.true.
     RETURN 140  stop_nri = .true.   ! stop newton raphson iteration
                         !  exceeded max error
150  return              ! return without converging
     END Subroutine Evaluate_error(eval_request,variable_request
     $,                        loc_b,error,err_loc_ele
     $,                        err_loc_var,error_loc)
     Implicit None Include '[-.include]wfc_prob_order_r6.inc' c inputs
     Integer eval_request
             ! 1=avg, 2=max, 3=var, 4=bc st, 5= bc time
     Integer variable_request
             ! variable index when eval_request = 3 real*8 loc_b(*)
c outputs
     real*8 error                                         ! error value
     integer err_loc_ele,err_loc_var,error_loc
                                              ! location indexes
```

```
c local
      integer i error = 0.0
      goto (100,200,300,400,500) eval_request 100   DO I=1,IORDER                    ! find average error
         error = error+DABS(loc_b(I))   ! sum new error
      enddo
      error = error/dfloat(iorder)
      return 200   DO I=1,IORDER                ! find max error
         if(dabs(error).lt.dabs(loc_b(i))) then
            error = loc_b(i)   ! find max error
            error_loc = i
         endif
      enddo
      goto 900  ! find the location of the error index 300   do i = 1,iorder   ! find the largest variable requested
         if ( mod(i-1,ntot)+1.eq.variable_request.and.
     $         int(float(i)/float(ntot)+1).le.netot+2*nph.and.
     $           abs(error).lt.dabs(loc_b(i)) ) then
            error = loc_b(i)
            error_loc = i
         endif
      enddo
      goto 900
400   DO I=(netot+2*nph)*ntot,IORDER-2*nph-1
                                      ! find max bc state error
         if(abs(error).lt.dabs(loc_b(i))) then
            error = loc_b(i)    ! find max error
            error_loc = i
         endif
      enddo
      goto 900  ! find the location of the error index 500   DO I=(IORDER-2*nph-1),IORDER    ! find max bc time error
         if(abs(error).lt.dabs(loc_b(i))) then
            error = loc_b(i)   ! find max error
            error_loc = i
         endif
      enddo
      goto 900  ! find the location of the error index 900   err_loc_var = mod(error_loc-1,ntot)+1
      err_loc_ele = int(float(error_loc)/float(ntot)) + 1 return
      end

Subroutine Evaluate_convergence(totcnt,err_best
     $,                         trj_idx,correction_vector,b
     $,                         sol,sol_best,refactor_matrix
     $,                         int_converg_eval)
      Implicit None
      Include '[-.include]wfc_prob_order_r6.inc'
      Include '[-.include]wfc_mass_r6.inc'
      Include '[-.include]wfc_controls_r6.inc'
```

```
c inputs
        integer totcnt,trj_idx logical refactor_matrix real*8 b(*),sol(*),sol_best(*),correction_vector(*)
c I/o
        real*8 err_best c output
        integer int_converg_eval c local
        Integer int_dum,iccc/0/,err_mu_ele
     $,          loc_ele_err_max,loc_var_err_max
     $,          loc_err_max,i,j
     $,          get_avg_err/1/,get_max_err/2/
        real*8  err_avg,err_max,maximum_error/500000/
        logical converged_last_cycle/.false./ call evaluate_error(get_avg_err,i,b
     $,                     err_avg,i,i,i)
        call evaluate_error(get_max_err,i,b
     $,                     err_max,loc_ele_err_max,loc_var_err_max
     $,                     loc_err_max)

if(sol(iorder).lt.final_conver_time
     $          .and.(nph.eq.1)) conver(1)=final_conver_crit if(dabs(err_max).gt.maximum_error) then
          int_converg_eval = 4
                                ! stop the newton raphson process
        elseif (dabs(err_max).lt.conver(nph)) then
          int_converg_eval = 1  ! sol is good enough leave it
          do i = 1,iorder   ! reset the newton scale factor since
                            !  we converge
            newton_scale_factor(i)= 1.0d0
          enddo
          converged_last_cycle = .true.

elseif (dabs(err_max).le.dabs(err_best)) then
                                        !   getting better
          do i = 1,iorder
            if(converged_last_cycle
     $             .and.(newton_scale_factor(i).le.0.25)) then
              newton_scale_factor(i) = newton_scale_factor(i)*4.0
            elseif (newton_scale_factor(i).lt.1.0d0) then newton_scale_factor(i) = newton_scale_factor(i)*2.0
            endif
          enddo
          err_best = err_max
          int_converg_eval = 2
                    ! recalculate a new correction vector
          converged_last_cycle = .true.

else            ! diverging scale factor needs to be reduced
          int_converg_eval = 2
                    ! recalculate a new correction vector
```

```
          converged_last_cycle = .false.
       endif if((totcnt.gt.max_num_of_iterations(nph))
   $     .and. (int_converg_eval.ne.1)
   $     .and. (int_converg_eval.ne.4))   int_converg_eval = 5 return
    end

SUBROUTINE PSITER(KSW,IRTOT,IJTOT,PSI,PSIX,PSIT,A,B,IRN,ICN)

C   THIS ROUTINE CALCULATES THE ERROR VECTOR OR JACOBIAN ELEMENTS
C   CORRESPONDING TO THE PRESCRIBED BOUNDARY CONDITIONS

IMPLICIT DOUBLE PRECISION (A-H,O-Z)
          Include '[-.include]wfc_prob_order_r6.inc'
          Include '[-.include]wfc_sol_r6.inc'
      DOUBLE PRECISION
   PSI(mx_nu),PSIX(mx_bc,mx_nu),PSIT(mx_nph,mx_nu)
      DIMENSION A(*),B(*)
      INTEGER IRN(*),ICN(*)

IF (KSW .EQ. 0) CALL INDEX5 (IRTOT,IJTOT,IRN,ICN)

IF (KSW .EQ. 1) THEN

CCCCCCCCCCCCCCCCC   BEGIN ERROR VECTOR FILL IN   CCCCCCCCCCCCCCC

IL = IRTOT

DO 10 I=1,NBC
         B(IL+I) = -PSI(I)
   10 CONTINUE

IRTOT = IL + NBC

CCCCCCCCCCCCCCCCC   END ERROR VECTOR FILL IN   CCCCCCCCCCCCCCCCC

ENDIF

IF (KSW .EQ. 2) THEN

CCCCCCCCCCCCCCCCC   BEGIN JACOBIAN FILL IN   CCCCCCCCCCCCCCCCCCCC

IJ=IJTOT

DO 20 I=1,NPH
         IPSIST=2*NS*(I-1)

INJ=0
         DO 30 J=1,NBC
            DO 40 K=1,NS
               INJ = INJ+1
               A(IJ+INJ)=PSIX(IPSIST+K,J)
               A(IJ+INJ+NS)=PSIX(IPSIST+K+NS,J)
   40       CONTINUE
```

```
            IJ=IJ+2*ns+1
            INJ=0
            A(IJ)=PSIT(I,J)
 30      CONTINUE
 20   CONTINUE

IJTOT=IJ

CCCCCCCCCCC   END JACOBIAN FILL IN   CCCCCCCCCCCCCCCCCCCCC

ENDIF

RETURN
      END

SUBROUTINE TIMTER(KSW,IRTOT,IJTOT,PHIT,PSIT,A,B,IRN,ICN)

C  THIS ROUTINE FILLS IN THE ERROR VECTOR OR JACOBIAN ELEMENTS
C  FOR THE EQUATIONS DESCRIBING THE JUMPS IN THE HAMILTONIAN
C  BETWEEN PHASES AND THE FINAL BOUNDARY CONDITION ON THE
C  HAMILTONIAN

IMPLICIT DOUBLE PRECISION (A-H,O-Z)
         Include '[-.include]wfc_prob_order_r6.inc'
         Include '[-.include]wfc_sol_r6.inc'

DOUBLE PRECISION X(mx_x),U(mx_u),LAM(mx_x),
     &              L(0:mx_ux,0:mx_ux),F(mx_eqn,0:mx_ux,0:mx_ux)
      DOUBLE PRECISION PHIT(mx_nph),PSIT(mx_nph,mx_nu)
     $,                CAPHIT(mx_nu)

DIMENSION A(*),B(*)
      INTEGER IRN(*),ICN(*),EN

C
      IF (KSW .EQ. 0) CALL INDEX6(IRTOT,IJTOT,IRN,ICN)
      IF (KSW .EQ. 1) THEN

CCCCCCCCCCCCC BEGIN ERROR VECTOR FILL IN   CCCCCCCCCCCCCCCCCCC

IL=IRTOT

C  DEFINE CAPHIT = D(PHI)/DT + NU^T*D(PSI)/DT

DO 5 J=1,NPH
         SUM=0.0D+00
         DO 7 I=1,NBC
            SUM=SUM+PSIT(J,I)*GNU(I)
 7       CONTINUE
         CAPHIT(J)=PHIT(J)+SUM
 5    CONTINUE
      en = 0
      DO 10 I=1,NPH
         IF (I .NE. NPH) THEN

C    AT PHASE BOUNDARIES, H(t+)-H(t-)-CAPHIT = 0

DO 11 J = 1, N
               X(J) = XHAT(J,2,I)
```

```
                    LAM(J) = LHAT(J,2,I)
11          CONTINUE
            DO 12 J = 1, M
                 U(J) = UHAT(J,2,I)
12          CONTINUE
            en = en + xne(i) + 2 hminus = ham(I,en,X,U,LAM)

DO 21 J = 1, N
                 X(J) = XHAT(J,1,I+1)
                 LAM(J) = LHAT(J,1,I+1)
21          CONTINUE
            DO 22 J = 1, M
                 U(J) = UHAT(J,1,I+1)
22          CONTINUE
            en = en + 1
            hplus = ham(I+1,en,X,U,LAM)
            en = en - 1

B(IL+I)=HPLUS-HMINUS-CAPHIT(I)

ELSE

C    AT THE FINAL TIME: H(tf) = -CAPHIT

DO 31 J = 1, N
          X(J) = XHAT(J,2,I)
          LAM(J) = LHAT(J,2,I)
31       CONTINUE
         DO 32 J = 1, M
          U(J) = UHAT(J,2,I)
32       CONTINUE
             en = en + xne(i) + 2
         hminus = ham(I,en,X,U,LAM)

B(IL+I)=-HMINUS-CAPHIT(I)

ENDIF
10    CONTINUE

CCCCCCCCCCCCC   END ERROR VECTOR FILL IN   CCCCCCCCCCCCCCCCCCCCC

ENDIF

IF (KSW .EQ. 2) THEN

IJ=IJTOT.

CCCCCCCCCCCCC   BEGIN JACOBIAN FILL IN   CCCCCCCCCCCCCCCCCC

EN = 0
      DO 20 K=1,NPH

IF (K .NE. NPH) THEN

C   TAKE DERIVATIVES OF HMINUS

DO 17 I=1,NS
           X(I)=XHAT(I,2,K)
```

```
          LAM(I)=LHAT(I,2,K)
17     CONTINUE
       DO 18 I=1,M
          U(I)=UHAT(I,2,K)
18     CONTINUE

EN = EN + xne(k)+2

CALL GET_F_G_EQN_DER (K,en,X,U,F,L)

C  FIRST W.R.T. STATES (X)

DO 25 J=1,NS
          SUM = 0.0D+00
             DO 30 I=1,NS
             IF (I .LE. NS) THEN
                SUM = SUM+F(I,J,0)*LAM(I)
             ELSE
                sum=sum+vccx(f(i,j,0),x(i),lam(i))
             ENDIF
          A(IJ+J) = L(J,0)+SUM
30        CONTINUE
25     CONTINUE
       IJ=IJ+NS

C  W.R.T. COSTATES (LAMBDA)

DO 35 I=1,NS
          IF (I .LE. NS) THEN
             A(IJ+J) = F(I,0,0)
          ELSE
             A(IJ+J) = pmuvccu(f(i,j,0),x(i),lam(i))
          ENDIF
35     CONTINUE
       IJ=IJ+NS C  W.R.T. CONTROLS (U)
       DO 45 J=1,M
          SUM = 0.0D+00
          DO 40 I=1,N
             IF (I .LE. NS) THEN
                SUM = SUM+F(I,NS+J,0)*LAM(I)
             ELSE
                SUM = SUM+puvccu(F(I,NS+J,0),x(i),lam(i))
             ENDIF
             A(IJ+J) = L(NS+J,0)+SUM
40        CONTINUE
45     CONTINUE
       IJ=IJ+M

C  TAKE DERIVATIVES OF HPLUS

DO 47 I=1,NS
          X(I)=XHAT(I,1,K+1)
          LAM(I)=LHAT(I,1,K+1)
47     CONTINUE
       DO 48 I=1,M
          U(I)=UHAT(I,1,K+1)
48     CONTINUE
```

```
                EN = EN + 1
                CALL GET_F_G_EQN_DER (K+1,en,X,U,F,L)
                EN = En - 1
C  W.R.T. STATES (X)
                DO 26 J=1,NS
                    SUM = 0.0D+00
                    DO 33 I=1,N
                        IF (I .LE. NS) THEN
                            SUM = SUM+F(I,J,0)*LAM(I)
                        ELSE
                            SUM = SUM+vccx(F(I,J,0),x(i),LAM(I))
                        ENDIF
                        A(IJ+J) = -(L(J,0)+SUM)
33                  CONTINUE
26              CONTINUE
                IJ=IJ+NS C  W.R.T. COSTATES (LAMBDA)
                DO 36 J=1,NS
                    IF (I .LE. NS) THEN
                        A(IJ+J) = -(F(J,0,0))
                    ELSE
                        a(ij+j) = -pmuvccx(F(j,0,0),x(j),LAM(j))
                    ENDIF
36              CONTINUE
                IJ=IJ+NS C  W.R.T. CONTROLS (U)
                DO 46 J=1,M
                    SUM = 0.0D+00
                    DO 41 I=1,N
                        IF (I .LE. NS) THEN
                            SUM = SUM+F(I,NS+J,0)*LAM(I)
                        ELSE
                            SUM = SUM+puvccu(F(I,NS+J,0),x(i),LAM(I))
                        ENDIF
                        A(IJ+J) = -(L(NS+J,0)+SUM)
41                  CONTINUE
46              CONTINUE
                IJ=IJ+M

C  TAKE DERIVATIVE OF CAPHIT:
C       W.R.T. MULTIPLIERS (NU)

DO 55 J=1,NBC
                    A(IJ+J)=PSIT(K,J)
55              CONTINUE
                IJ = IJ+NBC

ELSE

C  TAKE DERIVATIVES OF HMINUS + D(CAP PSI)/DT = 0,
C  ASSUMING THAT PHI AND PSI ARE LINEAR FUNCTIONS OF TIME

DO 57 I=1,NS
                    X(I)=XHAT(I,2,K)
                    LAM(I)=LHAT(I,2,K)
57              CONTINUE
                DO 58 I=1,M
                    U(I)=UHAT(I,2,K)
```

```
58        CONTINUE
          EN = EN + xne(k) + 2
          CALL GET_F_G_EQN_DER (K,en,X,U,F,L)

C W.R.T. STATES (X)
          DO 126 J=1,NS
             SUM = 0.0D+00
             DO 133 I=1,N
                IF (I .LE. NS) THEN
                   SUM=SUM+F(I,J,0)*LAM(I)
                ELSE
                   SUM = SUM+vccx(F(I,J,0),x(i),LAM(I))
                ENDIF
                A(IJ+J) = L(J,0)+SUM
133          CONTINUE
126       CONTINUE
          IJ=IJ+NS C W.R.T. COSTATES (LAMBDA)
          DO 136 J=1,NS
             IF (j .LE. NS) THEN
                A(IJ+J) = F(J,0,0)
             ELSE
                A(IJ+J) = pmuvccx(F(I,0,0),x(i),LAM(I))
             ENDIF
136       CONTINUE
          IJ=IJ+NS C W.R.T. CONTROLS (U)
          DO 146 J=1,M
             SUM = 0.0D+00
             DO 141 I=1,N
                IF (I .LE. NS) THEN
                   SUM = SUM+F(I,NS+J,0)*LAM(I)
                ELSE
                   SUM = SUM+puvccu(F(I,NS+J,0),x(i),LAM(I))
                ENDIF
                A(IJ+J) = L(NS+J,0)+SUM
141          CONTINUE
146       CONTINUE
          IJ=IJ+M

C DERIVATIVE W.R.T. NU

DO 155 J=1,NBC
             A(IJ+J)=PSIT(K,J)
155       CONTINUE
          IJ=IJ+NBC

ENDIF
20  CONTINUE

CCCCCCCCCCCCCCCCCC   END JACOBIAN FILL IN   CCCCCCCCCCCCCCCC

IJTOT=IJ
       IRTOT=IL+NPH
       ENDIF
       RETURN
       END
```

```
      SUBROUTINE XLAMU(sol)

IMPLICIT DOUBLE PRECISION (A-H,C-Z)

Include '[-.include]wfc_prob_order_r6.inc'
        Include '[-.include]wfc_sol_r6.inc'

DIMENSION SOL(*)

C  BREAK THE SOLUTION VECTOR INTO VARIABLES.
C  THIS IS THE ORDER OF THE COLUMNS IN THE JACOBIAN

ICT=0
      DO 5 K=1,NPH
         DO 10 I=1,N
              XHAT(I,1,K) = SOL(ICT+I)
              LHAT(I,1,K) = SOL(ICT+N+I)
  10     CONTINUE
         DO 11 I=1,M
              UHAT(I,1,K) = SOL(ICT+2*N+I)
  11     CONTINUE

DO 20 J=1,xNE(K)
              ICT = ICT + NTOT
           DO 25 I=1,N
                 XBAR(I,J,K) = SOL(ICT+I)
                 LBAR(I,J,K) = SOL(ICT+N+I)
  25       CONTINUE
           DO 26 I=1,M
                 UBAR(I,J,K) = SOL(ICT+2*N+I)
  26       CONTINUE
  20     CONTINUE

ICT = ICT + NTOT

DO 30 I=1,N
              XHAT(I,2,K) = SOL(ICT+I)
              LHAT(I,2,K) = SOL(ICT+N+I)
  30     CONTINUE
         DO 31 I=1,M
              UHAT(I,2,K) = SOL(ICT+2*N+I)
  31     CONTINUE

ICT = ICT + NTOT

5  CONTINUE
      DO 40 I=1,NBC
          GNU(I)=SOL(ICT+I)
  40  CONTINUE

ICT = ICT + NBC
      DO 45 I=1,NPH
         TTIL(I)=SOL(ICT+I)
  45  CONTINUE

RETURN
      END

SUBROUTINE get_f_eqm_der(PN,en,X,U,F,L)
       IMPLICIT DOUBLE PRECISION(A-M,O-Z)
```

```
      Include '[-.include]wfc_prob_order_r6.inc'
      Include '[-.include]wfc_namcom_r6.inc'
      Include '[-.include]wfc_controls_r6.inc'
      Include '[-.include]wfc_bcu_r6.inc'
      Include '[-.include]wfc_thrust_r6.inc'
      Include '[-.include]wfc_mass_r6.inc'
      Include '[-.include]wfc_sol_r6.inc'

DOUBLE PRECISION X(mx_x),U(mx_u),F(mx_eqn,0:mx_ux,0:mx_ux)
     $,                L(0:mx_ux,0:mx_ux)

INTEGER PN,eqn_set,en,ierr
      real*8
     beta_r4,mach_r4,max_mach/6.8/,max_beta/5.60/,time_search C        Get Atmospheric and Derivatives DELH = 10.0D0
      CALL ATMOS62_METRIC(-X(3),RHO,P,TEMP,A)
      CALL ATMOS62_METRIC(-X(3)+DELH,RHOP,PP,TEMP,AP)
      CALL ATMOS62_METRIC(-X(3)-DELH,RHOM,PM,TEMP,AM)
      DRHODH = -(RHOP - RHOM)/(2*DELH)
      DRHODH2 = (RHOP + RHOM - 2*RHO)/(DELH**2)
      DPDH = -(PP - PM)/(2*DELH)
      DPDH2 = (PP + PM - 2*P)/(DELH**2)
      DADH = -(AP - AM)/(2*DELH)
      DADH2 = (AP + AM - 2*A)/(DELH**2)

C     Get Mach Number and Derivatives if(x(4).le.0.0d0) x(4) = 20.0d0

MACH = X(4)/A
      DMDA = -X(4)/A**2
      DMDA2 = 2.0d0*X(4)/A**3
      DMDV = 1.0d0/A
      DMDV2 = 0.0d0
      DMDVDA = -1.0d0/A**2 c
c   check for utilization of spline thrust data
c time_search = ele_time(pn,en,ttil,time_since_launch)

if(time_search.lt.0) then
           time_search = 0.0d0
         endif if(time_search.lt.thrust_time_out) then c  Define Thrust and Time derivatives call seval(thr_time_tbl,thr_tbl,thr_a,thr_b,thr_c
     $,            thr_n,time_search,throst,dthrdt,dthrdt2)
         call seval(mass_time_tbl,mass_tbl,mass_a,mass_b,mass_c
     $,            mass_n,time_search,mass,dmassdt,dmassdt2)

throt = aexit
```

```
      else  ! thrust is constant after the final burnout time mass     = terminal_mass
        throt    = 0.0d0
        throst   = 0.0d0 endif dthrdt   = 0.0d0
      dmassdt  = 0.0d0
      dmassdt2 = 0.0d0
      dthrdt2  = 0.0d0 c   Define Thrust/ pressure derivative

Thrust = throst - P*throt
      Dthrdp = -throt c   define dynamic pressure and derivatives qas          = 0.5*rho*sa*x(4)**2.0 dqasdrho     = 0.5*sa*x(4)**2.0
         dqasdv       = rho*sa*x(4)
         dqasdv2      = sa*rho
         dqasdvdrho   = sa*x(4)
         dqasdv2drho  = sa C   Get Lift And Drag Coefficient Derivatives beta_r4  = dsqrt(u(1)2+u(2)2)
      mach_r4  = mach if(mach_r4.gt.max_mach) then
        mach_r4 = max_mach
      endif
      if(abs(beta_r4).gt.max_beta) then
        beta_r4 = dsign(max_beta,beta_r4)
      endif call bcuint(1,mach_r4,beta_r4)

cd_s    =  yans(1)
      dcddum_b = yans(3)
      dcddm   =  yans(2)
      dcddmdum_b = yans(4)
      dcddmdm = yans(5)
      dcddumdum_bb =   yans(6)

cl_s = yans(7)
      dcldum_b = yans(9)
      dcldm = yans(8)
      dcldmdum_b =  yans(10)
      dcldmdm = yans(11)
      dcldumdum_bb = yans(12)

c  Define beta and que and the derivatives beta = dsqrt(u(1)2+u(2)2)
         que  = 1/dsqrt(1+beta**2)
```

```
      dquedum_b = -que*que*que
      dquedumdum_bb = -3*que*que*dquedum_b
      dquedum_b = 0.d0
      dquedumdum_bb = 0.0d0 c check root radical for positivity cc_rad = range_o2*(1+cmerr)-x(3)2-x(2)2-x(1)**2 if(cc_rad.lt.0.0d0) then
        cc_rad = 1.0d-12
      endif c get the inertial to wind matrix values and their derivatives ciw11=COS(X(5))*COS(X(6))
      ciw21=COS(X(5))*SIN(X(6))
      ciw31=-SIN(X(5))
      ciw32=0
      ciw33=COS(X(5))
      dciw11dx5=-(SIN(X(5))*COS(X(6)))
      dciw11dx6=-(COS(X(5))*SIN(X(6)))
      dciw21dx5=-(SIN(X(5))*SIN(X(6)))
      dciw21dx6=COS(X(5))*COS(X(6))
      dciw31dx5=-COS(X(5))
      dciw31dx6=0
      dciw32dx5=0
      dciw32dx6=0
      dciw33dx5=-SIN(X(5))
      dciw33dx6=0
      dciw11dx5dx5=-(COS(X(5))*COS(X(6)))
      dciw11dx6dx6=-(COS(X(5))*COS(X(6)))
      dciw21dx5dx5=-(COS(X(5))*SIN(X(6)))
      dciw21dx6dx6=-(COS(X(5))*SIN(X(6)))
      dciw31dx5dx5=SIN(X(5))
      dciw31dx6dx6=0
      dciw32dx5dx5=0
      dciw32dx6dx6=0
      dciw33dx5dx5=-COS(X(5))
      dciw33dx6dx6=0
      dciw11dx5dx6=SIN(X(5))*SIN(X(6))
      dciw21dx5dx6=-(SIN(X(5))*COS(X(6)))
      dciw31dx5dx6=0
      dciw32dx5dx6=0
      dciw33dx5dx6=0 c get the theta dot matrix and it's derivatives tiw12=0
      tiw13=0
      tiw22=1
      tiw23=0
      tiw32=0
      tiw33=1/COS(X(5))
      dtiw12dx5=0
      dtiw12dx6=0
      dtiw13dx5=0
      dtiw13dx6=0
```

```
dtiw22dx5=0
dtiw22dx6=0
dtiw23dx5=0
dtiw23dx6=0
dtiw32dx5=0
dtiw32dx6=0
dtiw33dx5=SIN(X(5))/COS(X(5))**2
dtiw33dx6=0
dtiw12dx5dx5=0
dtiw12dx6dx6=0
dtiw13dx5dx5=0
dtiw13dx6dx6=0
dtiw22dx5dx5=0
dtiw22dx6dx6=0
dtiw23dx5dx5=0
dtiw23dx6dx6=0
dtiw32dx5dx5=0
dtiw32dx6dx6=0
dtiw33dx5dx5=(2*SIN(X(5))**2+COS(X(5))**2)/COS(X(5))**3
dtiw33dx6dx6=0
dtiw12dx5dx6=0
dtiw13dx5dx6=0
dtiw22dx5dx6=0
dtiw23dx5dx6=0
dtiw32dx5dx6=0
dtiw33dx5dx6=0

F(1,0,0)=X(4)*CIW11
F(2,0,0)=X(4)*CIW21
F(3,0,0)=X(4)*CIW31

F(4,0,0)=(QUE*THRUST+(-(BETA**2*CL_S)-CD_S)*QAS+CIW31*GRAV*MASS)/
    MASS

F(5,0,0)=((U(1)*QUE*THRUST+(U(1)*CL_S-(U(1)*CD_S))*QAS+CIW32*
    GRAV*

MASS)*TIW23+(-(U(2)*QUE*THRUST)+(-(U(2)*CL_S)+U(2)*CD_S)*QAS-(
    CIW33*GRAV*MASS))*TIW22)/X(4)/MASS

F(6,0,0)=((U(1)*QUE*THRUST+(U(1)*CL_S-(U(1)*CD_S))*QAS+CIW32*GRAV
*

MASS)*TIW33+(-(U(2)*QUE*THRUST)+(-(U(2)*CL_S)+U(2)*CD_S)*QAS-(
    CIW33*GRAV*MASS))*TIW32)/X(4)/MASS

F(7,0,0)=-(RANGE_O2**(-CCEXP)*(CC_RAD**CCEXP*ULIMIT-(BETA**2*
    RANGE_O2**CCEXP)))
    F(1,1,0)=0
    F(1,2,0)=0
    F(1,3,0)=0
    F(1,4,0)=CIW11
    F(1,5,0)=X(4)*DCIW11DX5
    F(1,6,0)=X(4)*DCIW11DX6
    F(2,1,0)=0
    F(2,2,0)=0
    F(2,3,0)=0
    F(2,4,0)=CIW21
    F(2,5,0)=X(4)*DCIW21DX5
    F(2,6,0)=X(4)*DCIW21DX6
```

```
           F(3,1,0)=0
           F(3,2,0)=0
           F(3,3,0)=0
           F(3,4,0)=CIW31
           F(3,5,0)=X(4)*DCIW31DX5
           F(3,6,0)=X(4)*DCIW31DX6
           F(4,1,0)=0
           F(4,2,0)=0

F(4,3,0)=(DPDH*DTHRDP*QUE+(-(BETA**2*DADH*DCLDM)-(DADH*DCDDM))*
      . DMDA*QAS+(-(BETA**2*CL_S)-CD_S*DQASDRHO*DRHODH)/MASS

F(4,4,0)=-(((BETA**2*DCLDM+DCDDM)*DMDV*QAS+(BETA**2*CL_S+CD_S)*
      . DQASDV)/MASS)
           F(4,5,0)=DCIW31DX5*GRAV
           F(4,6,0)=DCIW31DX6*GRAV
           F(5,1,0)=0
           F(5,2,0)=0

T0=(U(1)*DPDH*DTHRDP*QUE+(U(1)*DADH*DCLDM-(U(1)*DADH*DCDDM))*DMDA
      *
      . QAS+(U(1)*CL_S-(U(1)*CD_S))*DQASDRHO*DRHODH)*TIW23

F(5,3,0)=(T0+(-(U(2)*DPDH*DTHRDP*QUE)+(-(U(2)*DADH*DCLDM)+U(2)*

DADH*DCDDM)*DMDA*QAS+(-(U(2)*CL_S)+U(2)*CD_S)*DQASDRHO*DRHODH)*
      . TIW22)/X(4)/MASS

T0=(U(1)*QUE*THRUST+((-(U(1)*X(4)*DCLDM)+U(1)*X(4)*DCDDM)*DMDV+U(
      -
      . )*CL_S-(U(1)*CD_S))*QAS+CIW32*GRAV*MASS+(-(U(1)*X(4)*CL_S)+U(1)*X
      . (4)*CD_S)*DQASDV)*TIW23

F(5,4,0)=-((T0+(-(U(2)*QUE*THRUST)+((U(2)*X(4)*DCLDM-(U(2)*X(4)*

DCDDM))*DMDV-(U(2)*CL_S)+U(2)*CD_S)*QAS-(CIW33*GRAV*MASS)+(U(2)*X
      . (4)*CL_S-(U(2)*X(4)*CD_S))*DQASDV)*TIW22)/X(4)**2/MASS)

T0=DCIW32DX5*GRAV*MASS*TIW23-(DCIW33DX5*GRAV*MASS*TIW22)+(U(1)*

DTIW23DX5-(U(2)*DTIW22DX5))*QUE*THRUST+((U(1)*CL_S-(U(1)*CD_S))*
      . DTIW23DX5+(-(U(2)*CL_S)+U(2)*CD_S)*DTIW22DX5)*QAS

F(5,5,0)=(T0+(CIW32*DTIW23DX5-(CIW33*DTIW22DX5))*GRAV*MASS)/X(4)/
      . MASS

T0=DCIW32DX6*GRAV*MASS*TIW23-(DCIW33DX6*GRAV*MASS*TIW22)+(U(1)*

DTIW23DX6-(U(2)*DTIW22DX6))*QUE*THRUST+((U(1)*CL_S-(U(1)*CD_S))*
      . DTIW23DX6+(-(U(2)*CL_S)+U(2)*CD_S)*DTIW22DX6)*QAS

F(5,6,0)=(T0+(CIW32*DTIW23DX6-(CIW33*DTIW22DX6))*GRAV*MASS)/X(4)/
      . MASS
           F(6,1,0)=0
           F(6,2,0)=0

T0=(U(1)*DPDH*DTHRDP*QUE+(U(1)*DADH*DCLDM-(U(1)*DADH*DCDDM))*DMDA
      *
      . QAS+(U(1)*CL_S-(U(1)*CD_S))*DQASDRHO*DRHODH)*TIW33
```

```
F(6,3,0)=(T0+(-(U(2)*DPDH*DTHRDP*QUE)+(-(U(2)*DADH*DCLDM)+U(2)*
    DADH*DCDDM)*DMDA*QAS+(-(U(2)*CL_S)+U(2)*CD_S)*DQASDRHO*DRHODH)*
    .  TIW32)/X(4)/MASS

T0=(U(1)*QUE*THRUST+((-(U(1)*X(4)*DCLDM)+U(1)*X(4)*DCDDM)*DMDV+U(
 1
    )*CL_S-(U(1)*CD_S))*QAS+CIW32*GRAV*MASS+(-(U(1)*X(4)*CL_S)+U(1)*X
    .  (4)*CD_S)*DQASDV)*TIW33

F(6,4,0)=-((T0+(-(U(2)*QUE*THRUST)+((U(2)*X(4)*DCLDM-(U(2)*X(4)*
    DCDDM))*DMDV-(U(2)*CL_S)+U(2)*CD_S)*QAS-(CIW33*GRAV*MASS)+(U(2)*X
    .  (4)*CL_S-(U(2)*X(4)*CD_S))*DQASDV)*TIW32/X(4)**2/MASS)

T0=DCIW32DX5*GRAV*MASS*TIW33-(DCIW33DX5*GRAV*MASS*TIW32)+(U(1)*
    DTIW33DX5-(U(2)*DTIW32DX5))*QUE*THRUST+((U(1)*CL_S-(U(1)*CD_S))*
    .  DTIW33DX5+(-(U(2)*CL_S)+U(2)*CD_S)*DTIW32DX5)*QAS

F(6,5,0)=(T0+(CIW32*DTIW33DX5-(CIW33*DTIW32DX5))*GRAV*MASS)/X(4)/
    .  MASS

T0=DCIW32DX6*GRAV*MASS*TIW33-(DCIW33DX6*GRAV*MASS*TIW32)+(U(1)*
    DTIW33DX6-(U(2)*DTIW32DX6))*QUE*THRUST+((U(1)*CL_S-(U(1)*CD_S))*
    .  DTIW33DX6+(-(U(2)*CL_S)+U(2)*CD_S)*DTIW32DX6)*QAS

F(6,6,0)=(T0+(CIW32*DTIW33DX6-(CIW33*DTIW32DX6))*GRAV*MASS)/X(4)/
    .  MASS

F(7,1,0)=2*X(1)*CCEXP*CC_RAD**(CCEXP-1)*RANGE_O2**(-CCEXP)*ULIMIT

F(7,2,0)=2*X(2)*CCEXP*CC_RAD**(CCEXP-1)*RANGE_O2**(-CCEXP)*ULIMIT

F(7,3,0)=2*X(3)*CCEXP*CC_RAD**(CCEXP-1)*RANGE_O2**(-CCEXP)*ULIMIT
    F(7,4,0)=0
    F(7,5,0)=0
    F(7,6,0)=0
    F(1,7,0)=0
    F(1,8,0)=0
    F(2,7,0)=0
    F(2,8,0)=0
    F(3,7,0)=0
    F(3,8,0)=0

F(4,7,0)=(U(1)*DQUEDUM_B*THRUST+(-(U(1)*BETA**2*DCLDUM_B)-(U(1)*
    .  DCDDUM_B)-(2*U(1)*CL_S))*QAS)/MASS

F(4,8,0)=(U(2)*DQUEDUM_B*THRUST+(-(U(2)*BETA**2*DCLDUM_B)-(U(2)*
    .  DCDDUM_B)-(2*U(2)*CL_S))*QAS)/MASS

F(5,7,0)=(((QUE+U(1)**2*DQUEDUM_B)*THRUST+(U(1)**2*DCLDUM_B-(U(1)
    **2*DCDDUM_B)+CL_S-CD_S)*QAS)*TIW23+(-(U(1)*U(2)*DQUEDUM_B*THRUST
    )+(-(U(1)*U(2)*DCLDUM_B)+U(1)*U(2)*DCDDUM_B)*QAS)*TIW22)/X(4)/
    .  MASS

F(5,8,0)=((U(1)*U(2)*DQUEDUM_B*THRUST+(U(1)*U(2)*DCLDUM_B-(U(1)*U
```

```
(2)*DCDDUM_B))*QAS)*TIW23+((-QUE-(U(2)**2*DQUEDUM_B))*THRUST+(-(U(
2)**2*DCLDUM_B)+U(2)**2*DCDDUM_B-CL_S+CD_S)*QAS)*TIW22)/X(4)/MASS
F(6,7,0)=(((QUE+U(1)**2*DQUEDUM_B)*THRUST+(U(1)**2*DCLDUM_B-(U(1)
**2*DCDDUM_B)+CL_S-CD_S)*QAS)*TIW33+(-(U(1)*U(2)*DQUEDUM_B*THRUST
)+(-(U(1)*U(2)*DCLDUM_B)+U(1)*U(2)*DCDDUM_B)*QAS)*TIW32)/X(4)/
MASS
F(6,8,0)=((U(1)*U(2)*DQUEDUM_B*THRUST+(U(1)*U(2)*DCLDUM_B-(U(1)*U
(2)*DCDDUM_B))*QAS)*TIW33+((-QUE-(U(2)**2*DQUEDUM_B))*THRUST+(-(U(
2)**2*DCLDUM_B)+U(2)**2*DCDDUM_B-CL_S+CD_S)*QAS)*TIW32)/X(4)/MASS
F(7,7,0)=2*U(1)
F(7,8,0)=2*U(2)
F(1,1,1)=0
F(1,1,2)=0
F(1,1,3)=0
F(1,1,4)=0
F(1,1,5)=0
F(1,1,6)=0
F(1,2,2)=0
F(1,2,3)=0
F(1,2,4)=0
F(1,2,5)=0
F(1,2,6)=0
F(1,3,3)=0
F(1,3,4)=0
F(1,3,5)=0
F(1,3,6)=0
F(1,4,4)=0
F(1,4,5)=DCIW11DX5
F(1,4,6)=DCIW11DX6
F(1,5,5)=X(4)*DCIW11DX5DX5
F(1,5,6)=X(4)*DCIW11DX5DX6
F(1,6,6)=X(4)*DCIW11DX6DX6
F(2,1,1)=0
F(2,1,2)=0
F(2,1,3)=0
F(2,1,4)=0
F(2,1,5)=0
F(2,1,6)=0
F(2,2,2)=0
F(2,2,3)=0
F(2,2,4)=0
F(2,2,5)=0
F(2,2,6)=0
F(2,3,3)=0
F(2,3,4)=0
F(2,3,5)=0
F(2,3,6)=0
F(2,4,4)=0
F(2,4,5)=DCIW21DX5
F(2,4,6)=DCIW21DX6
F(2,5,5)=X(4)*DCIW21DX5DX5
```

```
     F(2,5,6)=X(4)*DCIW21DX5DX6
     F(2,6,6)=X(4)*DCIW21DX6DX6
     F(3,1,1)=0
     F(3,1,2)=0
     F(3,1,3)=0
     F(3,1,4)=0
     F(3,1,5)=0
     F(3,1,6)=0
     F(3,2,2)=0
     F(3,2,3)=0
     F(3,2,4)=0
     F(3,2,5)=0
     F(3,2,6)=0
     F(3,3,3)=0
     F(3,3,4)=0
     F(3,3,5)=0
     F(3,3,6)=0
     F(3,4,4)=0
     F(3,4,5)=DCIW31DX5
     F(3,4,6)=DCIW31DX6
     F(3,5,5)=X(4)*DCIW31DX5DX5
     F(3,5,6)=X(4)*DCIW31DX5DX6
     F(3,6,6)=X(4)*DCIW31DX6DX6
     F(4,1,1)=0
     F(4,1,2)=0
     F(4,1,3)=0
     F(4,1,4)=0
     F(4,1,5)=0
     F(4,1,6)=0
     F(4,2,2)=0
     F(4,2,3)=0
     F(4,2,4)=0
     F(4,2,5)=0
     F(4,2,6)=0

T0=DPDH2*DTHRDP*QUE+((-(BETA**2*DADH**2*DCLDM)-(DADH**2*DCDDM))*
DMDA2+(-(BETA**2*DADH**2*DCLDMDM)-(DADH**2*DCDDMDM))*DMDA**2+(-(
  BETA**2*DADH2*DCLDM)-(DADH2*DCDDM))*DMDA)*QAS

F(4,3,3)=(T0+(-(BETA**2*CL_S)-CD_S)*DQASDRHO*DRHODH2+(-(2*BETA**2
*
  DADH*DCLDM)-(2*DADH*DCDDM))*DMDA*DQASDRHO*DRHODH)/MASS

T0=((BETA**2*DADH*DCLDM+DADH*DCDDM)*DMDVDA+(BETA**2*DADH*DCLDMDM+
DADH*DCDDMDM)*DMDA*DMDV)*QAS+((BETA**2*CL_S+CD_S)*DQASDVDRHO+(
  BETA**2*DCLDM+DCDDM)*DMDV*DQASDRHO)*DRHODH

F(4,3,4)=-((T0+(BETA**2*DADH*DCLDM+DADH*DCDDM)*DMDA*DQASDV)/MASS)
     F(4,3,5)=0
     F(4,3,6)=0

F(4,4,4)=-((((BETA**2*DCLDM+DCDDM)*DMDV2+(BETA**2*DCLDMDM+DCDDMDM
)
*DMDV**2)*QAS+(BETA**2*CL_S+CD_S)*DQASDV2+(2*BETA**2*DCLDM+2*
  DCDDM)*DMDV*DQASDV)/MASS)
     F(4,4,5)=0
     F(4,4,6)=0
```

```
      F(4,5,5)=DCIW31DX5DX5*GRAV
      F(4,5,6)=DCIW31DX5DX6*GRAV
      F(4,6,6)=DCIW31DX6DX6*GRAV
      F(5,1,1)=0
      F(5,1,2)=0
      F(5,1,3)=0
      F(5,1,4)=0
      F(5,1,5)=0
      F(5,1,6)=0
      F(5,2,2)=0
      F(5,2,3)=0
      F(5,2,4)=0
      F(5,2,5)=0
      F(5,2,6)=0

T0=U(1)*DPDH2*DTHRDP*QUE+((U(1)*DADH**2*DCLDM-(U(1)*DADH**2*DCDDM
)
 )*DMDA2+(U(1)*DADH**2*DCLDMDM-(U(1)*DADH**2*DCDDMDM))*DMDA**2+(U(
 .    1)*DADH2*DCLDM-(U(1)*DADH2*DCDDM))*DMDA)*QAS

T0=(T0+(U(1)*CL_S-(U(1)*CD_S))*DQASDRHO*DRHODH2+(2*U(1)*DADH*DCLD
M
 .    -(2*U(1)*DADH*DCDDM))*DMDA*DQASDRHO*DRHODH)*TIW23

T1=-(U(2)*DPDH2*DTHRDP*QUE)+((-(U(2)*DADH**2*DCLDM)+U(2)*DADH**2*

DCDDM)*DMDA2+(-(U(2)*DADH**2*DCLDMDM)+U(2)*DADH**2*DCDDMDM)*DMDA
 .    **2+(-(U(2)*DADH2*DCLDM)+U(2)*DADH2*DCDDM)*DMDA)*QAS

F(5,3,3)=(T0+(T1+(-(U(2)*CL_S)+U(2)*CD_S)*DQASDRHO*DRHODH2+(-(2*U
(
 2)*DADH*DCLDM)+2*U(2)*DADH*DCDDM)*DMDA*DQASDRHO*DRHODH)*TIW22)/X(
 .    4)/MASS

T0=U(1)*DPDH*DTHRDP*QUE+((-(U(1)*X(4)*DADH*DCLDM)+U(1)*X(4)*DADH*

DCDDM)*DMDVDA+(-(U(1)*X(4)*DADH*DCLDMDM)+U(1)*X(4)*DADH*DCDDMDM)*
 .    DMDA*DMDV+(U(1)*DADH*DCLDM-(U(1)*DADH*DCDDM))*DMDA)*QAS

T0=(T0+((-(U(1)*X(4)*CL_S)+U(1)*X(4)*CD_S)*DQASDVDRHO+((-(U(1)*X(
4
 )*DCLDM)+U(1)*X(4)*DCDDM)*DMDV+U(1)*CL_S-(U(1)*CD_S))*DQASDRHO)*

DRHODH+(-(U(1)*X(4)*DADH*DCLDM)+U(1)*X(4)*DADH*DCDDM)*DMDA*DQASDV
 .    )*TIW23

T1=-(U(2)*DPDH*DTHRDP*QUE)+((U(2)*X(4)*DADH*DCLDM-(U(2)*X(4)*DADH
*

DCDDM))*DMDVDA+(U(2)*X(4)*DADH*DCLDMDM-(U(2)*X(4)*DADH*DCDDMDM))*
 .    DMDA*DMDV+(-(U(2)*DADH*DCLDM)+U(2)*DADH*DCDDM)*DMDA)*QAS

T0=T0+(T1+((U(2)*X(4)*CL_S-(U(2)*X(4)*CD_S))*DQASDVDRHO+((U(2)*X(
 . 4
 )*DCLDM-(U(2)*X(4)*DCDDM))*DMDV-(U(2)*CL_S)+U(2)*CD_S)*DQASDRHO)*

DRHODH+(U(2)*X(4)*DADH*DCLDM-(U(2)*X(4)*DADH*DCDDM))*DMDA*DQASDV)
```

```
.  *TIW22
   F(5,3,4)=-(T0/X(4)**2/MASS)

T0=(U(1)*DPDH*DTHRDP*DTIW23DX5-(U(2)*DPDH*DTHRDP*DTIW22DX5))*QUE+
(
   (U(1)*DADH*DCLDM-(U(1)*DADH*DCDDM))*DMDA*DTIW23DX5+(-(U(2)*DADH*
.   DCLDM)+U(2)*DADH*DCDDM)*DMDA*DTIW22DX5)*QAS

F(5,3,5)=(T0+(U(1)*CL_S-(U(1)*CD_S))*DQASDRHO*DRHODH*DTIW23DX5+(-
(
.   U(2)*CL_S)+U(2)*CD_S)*DQASDRHO*DRHODH*DTIW22DX5)/X(4)/MASS

T0=(U(1)*DPDH*DTHRDP*DTIW23DX6-(U(2)*DPDH*DTHRDP*DTIW22DX6))*QUE+
(
   (U(1)*DADH*DCLDM-(U(1)*DADH*DCDDM))*DMDA*DTIW23DX6+(-(U(2)*DADH*
.   DCLDM)+U(2)*DADH*DCDDM)*DMDA*DTIW22DX6)*QAS

F(5,3,6)=(T0+(U(1)*CL_S-(U(1)*CD_S))*DQASDRHO*DRHODH*DTIW23DX6+(-
(
.   U(2)*CL_S)+U(2)*CD_S)*DQASDRHO*DRHODH*DTIW22DX6)/X(4)/MASS
   T0=2*U(1)*QUE*THRUST

T0=T0+((U(1)*X(4)**2*DCLDM-(U(1)*X(4)**2*DCDDM))*DMDV2+(U(1)*X(4)

**2*DCLDMDM-(U(1)*X(4)**2*DCDDMDM))*DMDV**2+(-(2*U(1)*X(4)*DCLDM)
.   +2*U(1)*X(4)*DCDDM)*DMDV+2*U(1)*CL_S-(2*U(1)*CD_S))*QAS

T0=(T0+2*CIW32*GRAV*MASS+(U(1)*X(4)**2*CL_S-(U(1)*X(4)**2*CD_S))*

DQASDV2+((2*U(1)*X(4)**2*DCLDM-(2*U(1)*X(4)**2*DCDDM))*DMDV-(2*U(
.   1)*X(4)*CL_S)+2*U(1)*X(4)*CD_S)*DQASDV)*TIW23
   T1=-(2*U(2)*QUE*THRUST)

T1=T1+((-(U(2)*X(4)**2*DCLDM)+U(2)*X(4)**2*DCDDM)*DMDV2+(-(U(2)*X
(
4)**2*DCLDMDM)+U(2)*X(4)**2*DCDDMDM)*DMDV**2+(2*U(2)*X(4)*DCLDM-(
.   2*U(2)*X(4)*DCDDM))*DMDV-(2*U(2)*CL_S)+2*U(2)*CD_S)*QAS

F(5,4,4)=(T0+(T1-(2*CIW33*GRAV*MASS)+(-(U(2)*X(4)**2*CL_S)+U(2)*X
(
4)**2*CD_S)*DQASDV2+((-(2*U(2)*X(4)**2*DCLDM)+2*U(2)*X(4)**2*

DCDDM)*DMDV+2*U(2)*X(4)*CL_S-(2*U(2)*X(4)*CD_S))*DQASDV)*TIW22)/X
.   (4)**3/MASS

T0=DCIW32DX5*GRAV*MASS*TIW23-(DCIW33DX5*GRAV*MASS*TIW22)+(U(1)*
.   DTIW23DX5-(U(2)*DTIW22DX5))*QUE*THRUST

T0=T0+(((-(U(1)*X(4)*DCLDM)+U(1)*X(4)*DCDDM)*DMDV+U(1)*CL_S-(U(1)
*

CD_S))*DTIW23DX5+((U(2)*X(4)*DCLDM-(U(2)*X(4)*DCDDM))*DMDV-(U(2)*
.   CL_S)+U(2)*CD_S)*DTIW22DX5)*QAS

F(5,4,5)=-((T0+(CIW32*DTIW23DX5-(CIW33*DTIW22DX5))*GRAV*MASS+(-(U
(
```

```
1)*X(4)*CL_S)+U(1)*X(4)*CD_S)*DQASDV*DTIW23DX5+(U(2)*X(4)*CL_S-(U
    (2)*X(4)*CD_S))*DQASDV*DTIW22DX5)/X(4)**2/MASS)

T0=DCIW32DX6*GRAV*MASS*TIW23-(DCIW33DX6*GRAV*MASS*TIW22)+(U(1)*
    DTIW23DX6-(U(2)*DTIW22DX6))*QUE*THRUST

T0=T0+(((-(U(1)*X(4)*DCLDM)+U(1)*X(4)*DCDDM)*DMDV+U(1)*CL_S-(U(1)
    *
CD_S))*DTIW23DX6+((U(2)*X(4)*DCLDM-(U(2)*X(4)*DCDDM))*DMDV-(U(2)*
    CL_S)+U(2)*CD_S)*DTIW22DX6)*QAS

F(5,4,6)=-((T0+(CIW32*DTIW23DX6-(CIW33*DTIW22DX6))*GRAV*MASS+(-(U
(
1)*X(4)*CL_S)+U(1)*X(4)*CD_S)*DQASDV*DTIW23DX6+(U(2)*X(4)*CL_S-(U
    (2)*X(4)*CD_S))*DQASDV*DTIW22DX6)/X(4)**2/MASS)

T0=DCIW32DX5DX5*GRAV*MASS*TIW23-(DCIW33DX5DX5*GRAV*MASS*TIW22)+(U
(
1)*DTIW23DX5DX5-(U(2)*DTIW22DX5DX5))*QUE*THRUST+((U(1)*CL_S-(U(1)

*CD_S))*DTIW23DX5DX5+(-(U(2)*CL_S)+U(2)*CD_S)*DTIW22DX5DX5)*QAS

F(5,5,5)=(T0+(CIW32*DTIW23DX5DX5+2*DCIW32DX5*DTIW23DX5-(CIW33*

DTIW22DX5DX5)-(2*DCIW33DX5*DTIW22DX5))*GRAV*MASS)/X(4)/MASS

T0=DCIW32DX5DX6*GRAV*MASS*TIW23-(DCIW33DX5DX6*GRAV*MASS*TIW22)+(U
(
1)*DTIW23DX5DX6-(U(2)*DTIW22DX5DX6))*QUE*THRUST+((U(1)*CL_S-(U(1)

*CD_S))*DTIW23DX5DX6+(-(U(2)*CL_S)+U(2)*CD_S)*DTIW22DX5DX6)*QAS

F(5,5,6)=(T0+(DCIW32DX5*DTIW23DX6+CIW32*DTIW23DX5DX6+DCIW32DX6*

DTIW23DX5-(DCIW33DX5*DTIW22DX6)-(CIW33*DTIW22DX5DX6)-(DCIW33DX6*
    DTIW22DX5))*GRAV*MASS)/X(4)/MASS

T0=DCIW32DX6DX6*GRAV*MASS*TIW23-(DCIW33DX6DX6*GRAV*MASS*TIW22)+(U
(
1)*DTIW23DX6DX6-(U(2)*DTIW22DX6DX6))*QUE*THRUST+((U(1)*CL_S-(U(1)

*CD_S))*DTIW23DX6DX6+(-(U(2)*CL_S)+U(2)*CD_S)*DTIW22DX6DX6)*QAS

F(5,6,6)=(T0+(CIW32*DTIW23DX6DX6+2*DCIW32DX6*DTIW23DX6-(CIW33*

DTIW22DX6DX6)-(2*DCIW33DX6*DTIW22DX6))*GRAV*MASS)/X(4)/MASS
        F(6,1,1)=0
        F(6,1,2)=0
        F(6,1,3)=0
        F(6,1,4)=0
        F(6,1,5)=0
        F(6,1,6)=0
        F(6,2,2)=0
        F(6,2,3)=0
        F(6,2,4)=0
```

```
      F(6,2,5)=0
      F(6,2,6)=0

T0=U(1)*DPDH2*DTHRDP*QUE+((U(1)*DADH**2*DCLDM-(U(1)*DADH**2*DCDDM
)
)*DMDA2+(U(1)*DADH**2*DCLDMDM-(U(1)*DADH**2*DCDDMDM))*DMDA**2+(U(
.   1)*DADH2*DCLDM-(U(1)*DADH2*DCDDM))*DMDA)*QAS

T0=(T0+(U(1)*CL_S-(U(1)*CD_S))*DQASDRHO*DRHODH2+(2*U(1)*DADH*DCLD
M
.   -(2*U(1)*DADH*DCDDM))*DMDA*DQASDRHO*DRHODH)*TIW33

T1=-(U(2)*DPDH2*DTHRDP*QUE)+((-(U(2)*DADH**2*DCLDM)+U(2)*DADH**2*
DCDDM)*DMDA2+(-(U(2)*DADH**2*DCLDMDM)+U(2)*DADH**2*DCDDMDM)*DMDA
.   **2+(-(U(2)*DADH2*DCLDM)+U(2)*DADH2*DCDDM)*DMDA)*QAS

F(6,3,3)=(T0+(T1+(-(U(2)*CL_S)+U(2)*CD_S)*DQASDRHO*DRHODH2+(-(2*U
(
2)*DADH*DCLDM)+2*U(2)*DADH*DCDDM)*DMDA*DQASDRHO*DRHODH)*TIW32)/X(
.   4)/MASS

T0=U(1)*DPDH*DTHRDP*QUE+((-(U(1)*X(4)*DADH*DCLDM)+U(1)*X(4)*DADH*
DCDDM)*DMDVDA+(-(U(1)*X(4)*DADH*DCLDMDM)+U(1)*X(4)*DADH*DCDDMDM)*
.   DMDA*DMDV+(U(1)*DADH*DCLDM-(U(1)*DADH*DCDDM))*DMDA)*QAS

T0=(T0+((-(U(1)*X(4)*CL_S)+U(1)*X(4)*CD_S)*DQASDVDRHO+((-(U(1)*X(
4
)*DCLDM)+U(1)*X(4)*DCDDM)*DMDV+U(1)*CL_S-(U(1)*CD_S))*DQASDRHO)*
DRHODH+(-(U(1)*X(4)*DADH*DCLDM)+U(1)*X(4)*DADH*DCDDM)*DMDA*DQASDV
.   )*TIW33

T1=-(U(2)*DPDH*DTHRDP*QUE)+((U(2)*X(4)*DADH*DCLDM-(U(2)*X(4)*DADH
*
DCDDM))*DMDVDA+(U(2)*X(4)*DADH*DCLDMDM-(U(2)*X(4)*DADH*DCDDMDM))*
.   DMDA*DMDV+(-(U(2)*DADH*DCLDM)+U(2)*DADH*DCDDM)*DMDA)*QAS

T0=T0+(T1+((U(2)*X(4)*CL_S-(U(2)*X(4)*CD_S))*DQASDVDRHO+((U(2)*X(
4
)*DCLDM-(U(2)*X(4)*DCDDM))*DMDV-(U(2)*CL_S)+U(2)*CD_S)*DQASDRHO)*
DRHODH+(U(2)*X(4)*DADH*DCLDM-(U(2)*X(4)*DADH*DCDDM))*DMDA*DQASDV)
.   *TIW32
      F(6,3,4)=-(T0/X(4)**2/MASS)

T0=(U(1)*DPDH*DTHRDP*DTIW33DX5-(U(2)*DPDH*DTHRDP*DTIW32DX5))*QUE+
(
(U(1)*DADH*DCLDM-(U(1)*DADH*DCDDM))*DMDA*DTIW33DX5+(-(U(2)*DADH*
.   DCLDM)+U(2)*DADH*DCDDM)*DMDA*DTIW32DX5)*QAS

F(6,3,5)=(T0+(U(1)*CL_S-(U(1)*CD_S))*DQASDRHO*DRHODH*DTIW33DX5+(-
(
.   U(2)*CL_S)+U(2)*CD_S)*DQASDRHO*DRHODH*DTIW32DX5)/X(4)/MASS
```

```
T0=(U(1)*DPDH*DTHRDP*DTIW33DX6-(U(2)*DPDH*DTHRDP*DTIW32DX6))*QUE+
(
(U(1)*DADH*DCLDM-(U(1)*DADH*DCDDM))*DMDA*DTIW33DX6+(-(U(2)*DADH*
.   DCLDM)+U(2)*DADH*DCDDM)*DMDA*DTIW32DX6)*QAS

F(6,3,6)=(T0+(U(1)*CL_S-(U(1)*CD_S))*DQASDRHO*DRHODH*DTIW33DX6+(-
(
.   U(2)*CL_S)+U(2)*CD_S)*DQASDRHO*DRHODH*DTIW32DX6)/X(4)/MASS
    T0=2*U(1)*QUE*THRUST

T0=T0+((U(1)*X(4)**2*DCLDM-(U(1)*X(4)**2*DCDDM))*DMDV2+(U(1)*X(4)
**2*DCLDMDM-(U(1)*X(4)**2*DCDDMDM))*DMDV**2+(-(2*U(1)*X(4)*DCLDM)
.   +2*U(1)*X(4)*DCDDM)*DMDV+2*U(1)*CL_S-(2*U(1)*CD_S))*QAS

T0=(T0+2*CIW32*GRAV*MASS+(U(1)*X(4)**2*CL_S-(U(1)*X(4)**2*CD_S))*
DQASDV2+((2*U(1)*X(4)**2*DCLDM-(2*U(1)*X(4)**2*DCDDM))*DMDV-(2*U(
.   1)*X(4)*CL_S)+2*U(1)*X(4)*CD_S)*DQASDV)*TIW33
    T1=-(2*U(2)*QUE*THRUST)

T1=T1+((-(U(2)*X(4)**2*DCLDM)+U(2)*X(4)**2*DCDDM)*DMDV2+(-(U(2)*X
(
4)**2*DCLDMDM)+U(2)*X(4)**2*DCDDMDM)*DMDV**2+(2*U(2)*X(4)*DCLDM-(
.   2*U(2)*X(4)*DCDDM))*DMDV-(2*U(2)*CL_S)+2*U(2)*CD_S)*QAS

F(6,4,4)=(T0+(T1-(2*CIW33*GRAV*MASS)+(-(U(2)*X(4)**2*CL_S)+U(2)*X
(
4)**2*CD_S)*DQASDV2+((-(2*U(2)*X(4)**2*DCLDM)+2*U(2)*X(4)**2*
DCDDM)*DMDV+2*U(2)*X(4)*CL_S-(2*U(2)*X(4)*CD_S))*DQASDV)*TIW32)/X
.   (4)**3/MASS

T0=DCIW32DX5*GRAV*MASS*TIW33-(DCIW33DX5*GRAV*MASS*TIW32)+(U(1)*
.   DTIW33DX5-(U(2)*DTIW32DX5))*QUE*THRUST

T0=T0+(((-(U(1)*X(4)*DCLDM)+U(1)*X(4)*DCDDM)*DMDV+U(1)*CL_S-(U(1)
*
CD_S))*DTIW33DX5+((U(2)*X(4)*DCLDM-(U(2)*X(4)*DCDDM))*DMDV-(U(2)*
.   CL_S)+U(2)*CD_S)*DTIW32DX5)*QAS

F(6,4,5)=-((T0+(CIW32*DTIW33DX5-(CIW33*DTIW32DX5))*GRAV*MASS+(-(U
(
1)*X(4)*CL_S)+U(1)*X(4)*CD_S)*DQASDV*DTIW33DX5+(U(2)*X(4)*CL_S-(U
.   (2)*X(4)*CD_S))*DQASDV*DTIW32DX5)/X(4)**2/MASS)

T0=DCIW32DX6*GRAV*MASS*TIW33-(DCIW33DX6*GRAV*MASS*TIW32)+(U(1)*
.   DTIW33DX6-(U(2)*DTIW32DX6))*QUE*THRUST

T0=T0+(((-(U(1)*X(4)*DCLDM)+U(1)*X(4)*DCDDM)*DMDV+U(1)*CL_S-(U(1)
*
CD_S))*DTIW33DX6+((U(2)*X(4)*DCLDM-(U(2)*X(4)*DCDDM))*DMDV-(U(2)*
.   CL_S)+U(2)*CD_S)*DTIW32DX6)*QAS

F(6,4,6)=-((T0+(CIW32*DTIW33DX6-(CIW33*DTIW32DX6))*GRAV*MASS+(-(U
```

```
(
1)*X(4)*CL_S)+U(1)*X(4)*CD_S)*DQASDV*DTIW33DX6+(U(2)*X(4)*CL_S-(U
 .  (2)*X(4)*CD_S))*DQASDV*DTIW32DX6)/X(4)**2/MASS)

T0=DCIW32DX5DX5*GRAV*MASS*TIW33-(DCIW33DX5DX5*GRAV*MASS*TIW32)+(U
(
1)*DTIW33DX5DX5-(U(2)*DTIW32DX5DX5))*QUE*THRUST+((U(1)*CL_S-(U(1)
*CD_S))*DTIW33DX5DX5+(-(U(2)*CL_S)+U(2)*CD_S)*DTIW32DX5DX5)*QAS

F(6,5,5)=(T0+(CIW32*DTIW33DX5DX5+2*DCIW32DX5*DTIW33DX5-(CIW33*
DTIW32DX5DX5)-(2*DCIW33DX5*DTIW32DX5))*GRAV*MASS)/X(4)/MASS

T0=DCIW32DX5DX6*GRAV*MASS*TIW33-(DCIW33DX5DX6*GRAV*MASS*TIW32)+(U
(
1)*DTIW33DX5DX6-(U(2)*DTIW32DX5DX6))*QUE*THRUST+((U(1)*CL_S-(U(1)
*CD_S))*DTIW33DX5DX6+(-(U(2)*CL_S)+U(2)*CD_S)*DTIW32DX5DX6)*QAS

F(6,5,6)=(T0+(DCIW32DX5*DTIW33DX6+CIW32*DTIW33DX5DX6+DCIW32DX6*
DTIW33DX5-(DCIW33DX5*DTIW32DX6)-(CIW33*DTIW32DX5DX6)-(DCIW33DX6*
 . DTIW32DX5))*GRAV*MASS)/X(4)/MASS

T0=DCIW32DX6DX6*GRAV*MASS*TIW33-(DCIW33DX6DX6*GRAV*MASS*TIW32)+(U
(
1)*DTIW33DX6DX6-(U(2)*DTIW32DX6DX6))*QUE*THRUST+((U(1)*CL_S-(U(1)
*CD_S))*DTIW33DX6DX6+(-(U(2)*CL_S)+U(2)*CD_S)*DTIW32DX6DX6)*QAS

F(6,6,6)=(T0+(CIW32*DTIW33DX6DX6+2*DCIW32DX6*DTIW33DX6-(CIW33*
DTIW32DX6DX6)-(2*DCIW33DX6*DTIW32DX6))*GRAV*MASS)/X(4)/MASS

F(7,1,1)=CC_RAD**(CCEXP-2)*(2*CCEXP*CC_RAD-(4*X(1)**2*CCEXP**2)+4
*
 . X(1)**2*CCEXP)*RANGE_02**(-CCEXP)*ULIMIT

F(7,1,2)=-((4*X(1)*X(2)*CCEXP**2-(4*X(1)*X(2)*CCEXP))*CC_RAD**(
 . CCEXP-2)*RANGE_02**(-CCEXP)*ULIMIT)

F(7,1,3)=-((4*X(1)*X(3)*CCEXP**2-(4*X(1)*X(3)*CCEXP))*CC_RAD**(
 . CCEXP-2)*RANGE_02**(-CCEXP)*ULIMIT)
    F(7,1,4)=0
    F(7,1,5)=0
    F(7,1,6)=0

F(7,2,2)=CC_RAD**(CCEXP-2)*(2*CCEXP*CC_RAD-(4*X(2)**2*CCEXP**2)+4
*
 . X(2)**2*CCEXP)*RANGE_02**(-CCEXP)*ULIMIT

F(7,2,3)=-((4*X(2)*X(3)*CCEXP**2-(4*X(2)*X(3)*CCEXP))*CC_RAD**(
 . CCEXP-2)*RANGE_02**(-CCEXP)*ULIMIT)
    F(7,2,4)=0
    F(7,2,5)=0
    F(7,2,6)=0
```

F(7,3,3)=CC_RAD**(CCEXP-2)*(2*CCEXP*CC_RAD-(4*X(3)**2*CCEXP**2)+4
* . X(3)**2*CCEXP)*RANGE_O2**(-CCEXP)*ULIMIT
F(7,3,4)=0
F(7,3,5)=0
F(7,3,6)=0
F(7,4,4)=0
F(7,4,5)=0
F(7,4,6)=0
F(7,5,5)=0
F(7,5,6)=0
F(7,6,6)=0
F(1,1,7)=0
F(1,1,8)=0
F(1,2,7)=0
F(1,2,8)=0
F(1,3,7)=0
F(1,3,8)=0
F(1,4,7)=0
F(1,4,8)=0
F(1,5,7)=0
F(1,5,8)=0
F(1,6,7)=0
F(1,6,8)=0
F(2,1,7)=0
F(2,1,8)=0
F(2,2,7)=0
F(2,2,8)=0
F(2,3,7)=0
F(2,3,8)=0
F(2,4,7)=0
F(2,4,8)=0
F(2,5,7)=0
F(2,5,8)=0
F(2,6,7)=0
F(2,6,8)=0
F(3,1,7)=0
F(3,1,8)=0
F(3,2,7)=0
F(3,2,8)=0
F(3,3,7)=0
F(3,3,8)=0
F(3,4,7)=0
F(3,4,8)=0
F(3,5,7)=0
F(3,5,8)=0
F(3,6,7)=0
F(3,6,8)=0
F(4,1,7)=0
F(4,1,8)=0
F(4,2,7)=0
F(4,2,8)=0

F(4,3,7)=-(((U(1)*BETA**2*DADH*DCLDMDUM_B+2*U(1)*DADH*DCLDM+U(1)*

DADH*DCDDMDUM_B)*DMDA*QAS-(U(1)*DPDH*DQUEDUM_B*DTHRDP)+(U(1)*BETA

**2*DCLDUM_B+U(1)*DCDDUM_B+2*U(1)*CL_S)*DQASDRHO*DRHODH)/MASS)

F(4,3,8)=-(((U(2)*BETA**2*DADH*DCLDMDUM_B+2*U(2)*DADH*DCLDM+U(2)*

```
DADH*DCDDMDUM_B)*DMDA*QAS-(U(2)*DPDH*DQUEDUM_B*DTHRDP)+(U(2)*BETA

**2*DCLDUM_B+U(2)*DCDDUM_B+2*U(2)*CL_S)*DQASDRHO*DRHODH)/MASS)

F(4,4,7)=-(((U(1)*BETA**2*DCLDMDUM_B+2*U(1)*DCLDM+U(1)*DCDDMDUM_B
)
 .
 *DMDV*QAS+(U(1)*BETA**2*DCLDUM_B+U(1)*DCDDUM_B+2*U(1)*CL_S)*
 .  DQASDV)/MASS)

F(4,4,8)=-(((U(2)*BETA**2*DCLDMDUM_B+2*U(2)*DCLDM+U(2)*DCDDMDUM_B
)
 .
 *DMDV*QAS+(U(2)*BETA**2*DCLDUM_B+U(2)*DCDDUM_B+2*U(2)*CL_S)*
 .  DQASDV)/MASS)
        F(4,5,7)=0
        F(4,5,8)=0
        F(4,6,7)=0
        F(4,6,8)=0
        F(5,1,7)=0
        F(5,1,8)=0
        F(5,2,7)=0
        F(5,2,8)=0

T0=DPDH*DTHRDP*QUE+(U(1)**2*DADH*DCLDMDUM_B+DADH*DCLDM-(U(1)**2*

DADH*DCDDMDUM_B)-(DADH*DCDDM))*DMDA*QAS+U(1)**2*DPDH*DQUEDUM_B*
 .  DTHRDP

T0=(T0+(U(1)**2*DCLDUM_B-(U(1)**2*DCDDUM_B)+CL_S-CD_S)*DQASDRHO*
 .  DRHODH)*TIW23
        F(5,3,7)=(T0+((-(U(1)*U(2)*DADH*DCLDMDUM_B)+U(1)*U(2)*DADH*

DCDDMDUM_B)*DMDA*QAS-(U(1)*U(2)*DPDH*DQUEDUM_B*DTHRDP)+(-(U(1)*U(

2)*DCLDUM_B)+U(1)*U(2)*DCDDUM_B)*DQASDRHO*DRHODH)*TIW22)/X(4)/
 .  MASS

T1=((U(1)*U(2)*DADH*DCLDMDUM_B-(U(1)*U(2)*DADH*DCDDMDUM_B))*DMDA*
 .
 QAS+U(1)*U(2)*DPDH*DQUEDUM_B*DTHRDP+(U(1)*U(2)*DCLDUM_B-(U(1)*U(2
 .  )*DCDDUM_B))*DQASDRHO*DRHODH)*TIW23

T0=-(DPDH*DTHRDP*QUE)+(-(U(2)**2*DADH*DCLDMDUM_B)-(DADH*DCLDM)+U(
2

)**2*DADH*DCDDMDUM_B+DADH*DCDDM)*DMDA*QAS-(U(2)**2*DPDH*DQUEDUM_B
 .  *DTHRDP)

F(5,3,8)=(T1+(T0+(-(U(2)**2*DCLDUM_B)+U(2)**2*DCDDUM_B-CL_S+CD_S)
*
 .   DQASDRHO*DRHODH)*TIW22)/X(4)/MASS

T0=(QUE+U(1)**2*DQUEDUM_B)*THRUST+((-(U(1)**2*X(4)*DCLDMDUM_B)-(X
(

4)*DCLDM)+U(1)**2*X(4)*DCDDMDUM_B+X(4)*DCDDM)*DMDV+U(1)**2*
 .  DCLDUM_B-(U(1)**2*DCDDUM_B)+CL_S-CD_S)*QAS

T0=(T0+(-(U(1)**2*X(4)*DCLDUM_B)+U(1)**2*X(4)*DCDDUM_B-(X(4)*CL_S
```

```
)
          +X(4)*CD_S)*DQASDV)*TIW23

T0=T0+(-(U(1)*U(2)*DQUEDUM_B*THRUST)+((U(1)*U(2)*X(4)*DCLDMDUM_B-
(
  U(1)*U(2)*X(4)*DCDDMDUM_B))*DMDV-(U(1)*U(2)*DCLDUM_B)+U(1)*U(2)*

DCDDUM_B)*QAS+(U(1)*U(2)*X(4)*DCLDUM_B-(U(1)*U(2)*X(4)*DCDDUM_B))
        *DQASDV)*TIW22
        F(5,4,7)=-(T0/X(4)**2/MASS)

T1=(U(1)*U(2)*DQUEDUM_B*THRUST+((-(U(1)*U(2)*X(4)*DCLDMDUM_B)+U(1
)
        *U(2)*X(4)*DCDDMDUM_B)*DMDV+U(1)*U(2)*DCLDUM_B-(U(1)*U(2)*
        DCDDUM_B))*QAS+(-(U(1)*U(2)*X(4)*DCLDUM_B)+U(1)*U(2)*X(4)*
        DCDDUM_B)*DQASDV)*TIW23

T0=(-QUE-(U(2)**2*DQUEDUM_B))*THRUST+((U(2)**2*X(4)*DCLDMDUM_B+X(
4
 )*DCLDM-(U(2)**2*X(4)*DCDDMDUM_B)-(X(4)*DCDDM))*DMDV-(U(2)**2*
        DCLDUM_B)+U(2)**2*DCDDUM_B-CL_S+CD_S)*QAS

F(5,4,8)=-((T1+(T0+(U(2)**2*X(4)*DCLDUM_B-(U(2)**2*X(4)*DCDDUM_B)
+
        X(4)*CL_S-(X(4)*CD_S))*DQASDV)*TIW22)/X(4)**2/MASS)

T0=(DTIW23DX5*QUE+U(1)**2*DQUEDUM_B*DTIW23DX5-(U(1)*U(2)*DQUEDUM_
B
        *DTIW22DX5))*THRUST

F(5,5,7)=(T0+((U(1)**2*DCLDUM_B-(U(1)**2*DCDDUM_B)+CL_S-CD_S)*

DTIW23DX5+(-(U(1)*U(2)*DCLDUM_B)+U(1)*U(2)*DCDDUM_B)*DTIW22DX5)*
        QAS)/X(4)/MASS
        T0=(DTIW22DX5*QUE-(U(1)*U(2)*DQUEDUM_B*DTIW23DX5)+U(2)**2*
        DQUEDUM_B*DTIW22DX5)*THRUST
        F(5,5,8)=-((T0+((-(U(1)*U(2)*DCLDUM_B)+U(1)*U(2)*DCDDUM_B)*
        DTIW23DX5+(U(2)**2*DCLDUM_B-(U(2)**2*DCDDUM_B)+CL_S-CD_S)*
        DTIW22DX5)*QAS)/X(4)/MASS)

T0=(DTIW23DX6*QUE+U(1)**2*DQUEDUM_B*DTIW23DX6-(U(1)*U(2)*DQUEDUM_
B
        *DTIW22DX6))*THRUST

F(5,6,7)=(T0+((U(1)**2*DCLDUM_B-(U(1)**2*DCDDUM_B)+CL_S-CD_S)*

DTIW23DX6+(-(U(1)*U(2)*DCLDUM_B)+U(1)*U(2)*DCDDUM_B)*DTIW22DX6)*
        QAS)/X(4)/MASS
        T0=(DTIW22DX6*QUE-(U(1)*U(2)*DQUEDUM_B*DTIW23DX6)+U(2)**2*
        DQUEDUM_B*DTIW22DX6)*THRUST
        F(5,6,8)=-((T0+((-(U(1)*U(2)*DCLDUM_B)+U(1)*U(2)*DCDDUM_B)*
        DTIW23DX6+(U(2)**2*DCLDUM_B-(U(2)**2*DCDDUM_B)+CL_S-CD_S)*
        DTIW22DX6)*QAS)/X(4)/MASS)
        F(6,1,7)=0
        F(6,1,8)=0
        F(6,2,7)=0
        F(6,2,8)=0

T0=DPDH*DTHRDP*QUE+(U(1)**2*DADH*DCLDMDUM_B+DADH*DCLDM-(U(1)**2*
```

```
DADH*DCDDMDUM_B)-(DADH*DCDDM))*DMDA*QAS+U(1)**2*DPDH*DQUEDUM_B*
   .DTHRDP

T0=(T0+(U(1)**2*DCLDUM_B-(U(1)**2*DCDDUM_B)+CL_S-CD_S)*DQASDRHO*
   .DRHODH)*TIW33
        F(6,3,7)=(T0+((-(U(1)*U(2)*DADH*DCLDMDUM_B)+U(1)*U(2)*DADH*
   .DCDDMDUM_B)*DMDA*QAS-(U(1)*U(2)*DPDH*DQUEDUM_B*DTHRDP)+(-(U(1)*U(
2)*DCLDUM_B)+U(1)*U(2)*DCDDUM_B)*DQASDRHO*DRHODH)*TIW32)/X(4)/
   .MASS

T1=((U(1)*U(2)*DADH*DCLDMDUM_B-(U(1)*U(2)*DADH*DCDDMDUM_B))*DMDA*
   QAS+U(1)*U(2)*DPDH*DQUEDUM_B*DTHRDP+(U(1)*U(2)*DCLDUM_B-(U(1)*U(2
   .)*DCDDUM_B))*DQASDRHO*DRHODH)*TIW33

T0=-(DPDH*DTHRDP*QUE)+(-(U(2)**2*DADH*DCLDMDUM_B)-(DADH*DCLDM)+U(
2
   .)**2*DADH*DCDDMDUM_B+DADH*DCDDM)*DMDA*QAS-(U(2)**2*DPDH*DQUEDUM_B
   .*DTHRDP)

F(6,3,8)=(T1+(T0+(-(U(2)**2*DCLDUM_B)+U(2)**2*DCDDUM_B-CL_S+CD_S)
*
   .DQASDRHO*DRHODH)*TIW32)/X(4)/MASS

T0=(QUE+U(1)**2*DQUEDUM_B)*THRUST+((-(U(1)**2*X(4)*DCLDMDUM_B)-(X
(
4)*DCLDM)+U(1)**2*X(4)*DCDDMDUM_B+X(4)*DCDDM)*DMDV+U(1)**2*
   .DCLDUM_B-(U(1)**2*DCDDUM_B)+CL_S-CD_S)*QAS

T0=(T0+(-(U(1)**2*X(4)*DCLDUM_B)+U(1)**2*X(4)*DCDDUM_B-(X(4)*CL_S
)
   .+X(4)*CD_S)*DQASDV)*TIW33

T0=T0+(-(U(1)*U(2)*DQUEDUM_B*THRUST)+((U(1)*U(2)*X(4)*DCLDMDUM_B-
(
U(1)*U(2)*X(4)*DCDDMDUM_B))*DMDV-(U(1)*U(2)*DCLDUM_B)+U(1)*U(2)*
   .DCDDUM_B)*QAS+(U(1)*U(2)*X(4)*DCLDUM_B-(U(1)*U(2)*X(4)*DCDDUM_B))
   .*DQASDV)*TIW32
        F(6,4,7)=-(T0/X(4)**2/MASS)

T1=(U(1)*U(2)*DQUEDUM_B*THRUST+((-(U(1)*U(2)*X(4)*DCLDMDUM_B)+U(1
)
   .*U(2)*X(4)*DCDDMDUM_B)*DMDV+U(1)*U(2)*DCLDUM_B-(U(1)*U(2)*
   .DCDDUM_B))*QAS+(-(U(1)*U(2)*X(4)*DCLDUM_B)+U(1)*U(2)*X(4)*
   .DCDDUM_B)*DQASDV)*TIW33

T0=(-QUE-(U(2)**2*DQUEDUM_B))*THRUST+((U(2)**2*X(4)*DCLDMDUM_B+X(
4
   .)*DCLDM-(U(2)**2*X(4)*DCDDMDUM_B)-(X(4)*DCDDM))*DMDV-(U(2)**2*
   .DCLDUM_B)+U(2)**2*DCDDUM_B-CL_S+CD_S)*QAS

F(6,4,8)=-((T1+(T0+(U(2)**2*X(4)*DCLDUM_B-(U(2)**2*X(4)*DCDDUM_B)
-
   .X(4)*CL_S-(X(4)*CD_S))*DQASDV)*TIW32)/X(4)**2/MASS)
```

```
T0=(DTIW33DX5*QUE+U(1)**2*DQUEDUM_B*DTIW33DX5-(U(1)*U(2)*DQUEDUM_
B
 .    *DTIW32DX5))*THRUST

F(6,5,7)=(T0+((U(1)**2*DCLDUM_B-(U(1)**2*DCDDUM_B)+CL_S-CD_S)*
 .
DTIW33DX5+(-(U(1)*U(2)*DCLDUM_B)+U(1)*U(2)*DCDDUM_B)*DTIW32DX5)*
 .    QAS)/X(4)/MASS
       T0=(DTIW32DX5*QUE-(U(1)*U(2)*DQUEDUM_B*DTIW33DX5)+U(2)**2*
 .    DQUEDUM_B*DTIW32DX5)*THRUST
       F(6,5,8)=-((T0+((-(U(1)*U(2)*DCLDUM_B)+U(1)*U(2)*DCDDUM_B)*
 .    DTIW33DX5+(U(2)**2*DCLDUM_B-(U(2)**2*DCDDUM_B)+CL_S-CD_S)*
 .    DTIW32DX5)*QAS)/X(4)/MASS)

T0=(DTIW33DX6*QUE+U(1)**2*DQUEDUM_B*DTIW33DX6-(U(1)*U(2)*DQUEDUM_
B
 .    *DTIW32DX6))*THRUST

F(6,6,7)=(T0+((U(1)**2*DCLDUM_B-(U(1)**2*DCDDUM_B)+CL_S-CD_S)*
 .
DTIW33DX6+(-(U(1)*U(2)*DCLDUM_B)+U(1)*U(2)*DCDDUM_B)*DTIW32DX6)*
 .    QAS)/X(4)/MASS
       T0=(DTIW32DX6*QUE-(U(1)*U(2)*DQUEDUM_B*DTIW33DX6)+U(2)**2*
 .    DQUEDUM_B*DTIW32DX6)*THRUST
       F(6,6,8)=-((T0+((-(U(1)*U(2)*DCLDUM_B)+U(1)*U(2)*DCDDUM_B)*
 .    DTIW33DX6+(U(2)**2*DCLDUM_B-(U(2)**2*DCDDUM_B)+CL_S-CD_S)*
 .    DTIW32DX6)*QAS)/X(4)/MASS)
       F(7,1,7)=0
       F(7,1,8)=0
       F(7,2,7)=0
       F(7,2,8)=0
       F(7,3,7)=0
       F(7,3,8)=0
       F(7,4,7)=0
       F(7,4,8)=0
       F(7,5,7)=0
       F(7,5,8)=0
       F(7,6,7)=0
       F(7,6,8)=0
       F(1,7,7)=0
       F(1,7,8)=0
       F(1,8,8)=0
       F(2,7,7)=0
       F(2,7,8)=0
       F(2,8,8)=0
       F(3,7,7)=0
       F(3,7,8)=0
       F(3,8,8)=0

F(4,7,7)=((DQUEDUM_B+U(1)**2*DQUEDUMDUM_BB)*THRUST+((-BETA**2-(4*
U
 .
(1)**2))*DCLDUM_B-(U(1)**2*BETA**2*DCLDUMDUM_BB)-DCDDUM_B-(U(1)**
 .    2*DCDDUMDUM_BB)-(2*CL_S))*QAS)/MASS

F(4,7,8)=(U(1)*U(2)*DQUEDUMDUM_BB*THRUST+(-(4*U(1)*U(2)*DCLDUM_B)
-
(U(1)*U(2)*BETA**2*DCLDUMDUM_BB)-(U(1)*U(2)*DCDDUMDUM_BB))*QAS)/
 .    MASS
```

```
F(4,8,8)=((DQUEDUM_B+U(2)**2*DQUEDUMDUM_BB)*THRUST+((-BETA**2-(4*
U (2)**2))*DCLDUM_B-(U(2)**2*BETA**2*DCLDUMDUM_BB)-DCDDUM_B-(U(2)**
     . 2*DCDDUMDUM_BB)-(2*CL_S))*QAS)/MASS

T0=((3*U(1)*DQUEDUM_B+U(1)**3*DQUEDUMDUM_BB)*THRUST+(3*U(1)*
     . DCLDUM_B+U(1)**3*DCLDUMDUM_BB-(3*U(1)*DCDDUM_B)-(U(1)**3*
     . DCDDUMDUM_BB))*QAS)*TIW23

F(5,7,7)=(T0+((-(U(2)*DQUEDUM_B)-(U(1)**2*U(2)*DQUEDUMDUM_BB))*
     . THRUST+(-(U(2)*DCLDUM_B)-(U(1)**2*U(2)*DCLDUMDUM_BB)+U(2)*
     . DCDDUM_B+U(1)**2*U(2)*DCDDUMDUM_BB)*QAS)*TIW22)/X(4)/MASS

T0=((U(2)*DQUEDUM_B+U(1)**2*U(2)*DQUEDUMDUM_BB)*THRUST+(U(2)*

DCLDUM_B+U(1)**2*U(2)*DCLDUMDUM_BB-(U(2)*DCDDUM_B)-(U(1)**2*U(2)*
     . DCDDUMDUM_BB))*QAS)*TIW23

F(5,7,8)=(T0+((-(U(1)*DQUEDUM_B)-(U(1)*U(2)**2*DQUEDUMDUM_BB))*
     . THRUST+(-(U(1)*DCLDUM_B)-(U(1)*U(2)**2*DCLDUMDUM_BB)+U(1)*
     . DCDDUM_B+U(1)*U(2)**2*DCDDUMDUM_BB)*QAS)*TIW22)/X(4)/MASS

T0=((U(1)*DQUEDUM_B+U(1)*U(2)**2*DQUEDUMDUM_BB)*THRUST+(U(1)*

DCLDUM_B+U(1)*U(2)**2*DCLDUMDUM_BB-(U(1)*DCDDUM_B)-(U(1)*U(2)**2*
     . DCDDUMDUM_BB))*QAS)*TIW23

F(5,8,8)=(T0+((-(3*U(2)*DQUEDUM_B)-(U(2)**3*DQUEDUMDUM_BB))*THRUS
T

÷(-(3*U(2)*DCLDUM_B)-(U(2)**3*DCLDUMDUM_BB)+3*U(2)*DCDDUM_B+U(2)
     . **3*DCDDUMDUM_BB)*QAS)*TIW22)/X(4)/MASS

T0=((3*U(1)*DQUEDUM_B+U(1)**3*DQUEDUMDUM_BB)*THRUST+(3*U(1)*
     . DCLDUM_B+U(1)**3*DCLDUMDUM_BB-(3*U(1)*DCDDUM_B)-(U(1)**3*
     . DCDDUMDUM_BB))*QAS)*TIW33

F(6,7,7)=(T0+((-(U(2)*DQUEDUM_B)-(U(1)**2*U(2)*DQUEDUMDUM_BB))*
     . THRUST+(-(U(2)*DCLDUM_B)-(U(1)**2*U(2)*DCLDUMDUM_BB)+U(2)*
     . DCDDUM_B+U(1)**2*U(2)*DCDDUMDUM_BB)*QAS)*TIW32)/X(4)/MASS

T0=((U(2)*DQUEDUM_B+U(1)**2*U(2)*DQUEDUMDUM_BB)*THRUST+(U(2)*

DCLDUM_B+U(1)**2*U(2)*DCLDUMDUM_BB-(U(2)*DCDDUM_B)-(U(1)**2*U(2)*
     . DCDDUMDUM_BB))*QAS)*TIW33

F(6,7,8)=(T0+((-(U(1)*DQUEDUM_B)-(U(1)*U(2)**2*DQUEDUMDUM_BB))*
     . THRUST+(-(U(1)*DCLDUM_B)-(U(1)*U(2)**2*DCLDUMDUM_BB)+U(1)*
     . DCDDUM_B+U(1)*U(2)**2*DCDDUMDUM_BB)*QAS)*TIW32)/X(4)/MASS

T0=((U(1)*DQUEDUM_B+U(1)*U(2)**2*DQUEDUMDUM_BB)*THRUST+(U(1)*

DCLDUM_B+U(1)*U(2)**2*DCLDUMDUM_BB-(U(1)*DCDDUM_B)-(U(1)*U(2)**2*
     . DCDDUMDUM_BB))*QAS)*TIW33

F(6,8,8)=(T0+((-(3*U(2)*DQUEDUM_B)-(U(2)**3*DQUEDUMDUM_BB))*THRUS
T

÷(-(3*U(2)*DCLDUM_B)-(U(2)**3*DCLDUMDUM_BB)+3*U(2)*DCDDUM_B+U(2)
```

```
       . **3*DCDDUMDUM_BB)*QAS)*TIW32)/X(4)/MASS
         F(7,7,7)=2
         F(7,7,8)=0
         F(7,8,8)=2
c    FILL IN other partials DO 300 N1 = 1, N
            DO 200 N2 = 2,NS+M
               DO 100 N3 = 1, N2-1
                  F(N1,N2,N3) = F(N1,N3,N2)
100            CONTINUE
200         CONTINUE
300      CONTINUE L(0,0)=0
         L(1,0)=0
         L(2,0)=0
         L(3,0)=0
         L(4,0)=0
         L(5,0)=0
         L(6,0)=0
         L(7,0)=0
         L(8,0)=0
         L(1,1)=0
         L(1,2)=0
         L(1,3)=0
         L(1,4)=0
         L(1,5)=0
         L(1,6)=0
         L(2,2)=0
         L(2,3)=0
         L(2,4)=0
         L(2,5)=0
         L(2,6)=0
         L(3,3)=0
         L(3,4)=0
         L(3,5)=0
         L(3,6)=0
         L(4,4)=0
         L(4,5)=0
         L(4,6)=0
         L(5,5)=0
         L(5,6)=0
         L(6,6)=0
         L(1,7)=0
         L(1,8)=0
         L(2,7)=0
         L(2,8)=0
         L(3,7)=0
         L(3,8)=0
         L(4,7)=0
         L(4,8)=0
         L(5,7)=0
         L(5,8)=0
         L(6,7)=0
         L(6,8)=0
         L(7,7)=0
         L(7,8)=0
         L(8,8)=0
```

```
            DO 500 N1 = 2,NS+M
               DO 400 N2 = 1, N1-1
                  L(N1,N2) = L(N2,N1)
400            CONTINUE
500         CONTINUE

600   RETURN
      END
      SUBROUTINE
get_bnd_eqn_der(PHIT,PHIX,PHIXX,PSI,PSIT,PSIX,PSIXX)

c
c     max number of phases = 5 ==> max number of nodes = 10
c     max number of states + control constraints = 10
c     max number of bc's =(number of states+1)*(number of
c     phases+1)=~ 70
c
      Include '[-.include]wfc_prob_order_r6.inc'
      Include '[-.include]wfc_namcom_r6.inc'
      Include '[-.include]wfc_controls_r6.inc'
      Include '[-.include]wfc_sol_r6.inc'
      Include '[-.include]wfc_mass_r6.inc'

DOUBLE PRECISION X(mx_x,mx_bc),T(mx_nph)
      DOUBLE PRECISION PHIX(mx_bc),PHIXX(mx_bc,mx_bc),
     &       PSIX(mx_bc,mx_nu),PSIXX(mx_bc,mx_bc,mx_nu)
     $,      PHIT(mx_nph),PSI(mx_nu),PSIT(mx_nph,mx_nu)

Integer eqn_set
c
      INJ = 1
      DO 30 J=1,NPH
         DO 20 I=1,NS
            X(I,INJ) = XHAT(I,1,J)
            X(I,INJ+1) = XHAT(I,2,J)
20       CONTINUE
         INJ = INJ+2
         T(J) = TTIL(J)
30    CONTINUE DO 300 K = 1, 2*NS*NPH
         DO 200 I = 1,2*NS*NPH
            PHIXX(K,I) = 0.0D0
            DO 100 J = 1, NBC
               PSIXX(K,I,J) = 0.0D0
100         CONTINUE
200      CONTINUE
300   CONTINUE PHIX(1)=0
      PHIX(2)=0
      PHIX(3)=0
      PHIX(4)=0
      PHIX(5)=0
      PHIX(6)=0
      PHIX(7)=0
      PHIX(8)=0
      PHIX(9)=0
      PHIX(10)=-1
```

```
PHIX(11)=0
PHIX(12)=0
PHIT(1)=0

PSI(1)=X01-X(1,1)
PSI(2)=X02-X(2,1)
PSI(3)=X03-X(3,1)
PSI(4)=X04-X(4,1)
PSI(5)=X05-X(5,1)
PSI(6)=X06-X(6,1)
PSI(7)=-XF1+X(1,2)
PSI(8)=-XF2+X(2,2)
PSI(9)=-XF3+X(3,2)
PSI(10)=-F_C12+X(5,2)
PSI(11)=-F_C13+X(6,2)

PSIX(1,1)=-1
PSIX(2,1)=0
PSIX(3,1)=0
PSIX(4,1)=0
PSIX(5,1)=0
PSIX(6,1)=0
PSIX(7,1)=0
PSIX(8,1)=0
PSIX(9,1)=0
PSIX(10,1)=0
PSIX(11,1)=0
PSIX(12,1)=0
PSIT(1,1)=0

PSIX(1,2)=0
PSIX(2,2)=-1
PSIX(3,2)=0
PSIX(4,2)=0
PSIX(5,2)=0
PSIX(6,2)=0
PSIX(7,2)=0
PSIX(8,2)=0
PSIX(9,2)=0
PSIX(10,2)=0
PSIX(11,2)=0
PSIX(12,2)=0
PSIT(1,2)=0

PSIX(1,3)=0
PSIX(2,3)=0
PSIX(3,3)=-1
PSIX(4,3)=0
PSIX(5,3)=0
PSIX(6,3)=0
PSIX(7,3)=0
PSIX(8,3)=0
PSIX(9,3)=0
PSIX(10,3)=0
PSIX(11,3)=0
PSIX(12,3)=0
PSIT(1,3)=0

PSIX(1,4)=0
```

```
PSIX(2,4)=0
PSIX(3,4)=0
PSIX(4,4)=-1
PSIX(5,4)=0
PSIX(6,4)=0
PSIX(7,4)=0
PSIX(8,4)=0
PSIX(9,4)=0
PSIX(10,4)=0
PSIX(11,4)=0
PSIX(12,4)=0
PSIT(1,4)=0

PSIX(1,5)=0
PSIX(2,5)=0
PSIX(3,5)=0
PSIX(4,5)=0
PSIX(5,5)=-1
PSIX(6,5)=0
PSIX(7,5)=0
PSIX(8,5)=0
PSIX(9,5)=0
PSIX(10,5)=0
PSIX(11,5)=0
PSIX(12,5)=0
PSIT(1,5)=0

PSIX(1,6)=0
PSIX(2,6)=0
PSIX(3,6)=0
PSIX(4,6)=0
PSIX(5,6)=0
PSIX(6,6)=-1
PSIX(7,6)=0
PSIX(8,6)=0
PSIX(9,6)=0
PSIX(10,6)=0
PSIX(11,6)=0
PSIX(12,6)=0
PSIT(1,6)=0

PSIX(1,7)=0
PSIX(2,7)=0
PSIX(3,7)=0
PSIX(4,7)=0
PSIX(5,7)=0
PSIX(6,7)=0
PSIX(7,7)=1
PSIX(8,7)=0
PSIX(9,7)=0
PSIX(10,7)=0
PSIX(11,7)=0
PSIX(12,7)=0
PSIT(1,7)=0

PSIX(1,8)=0
PSIX(2,8)=0
PSIX(3,8)=0
PSIX(4,8)=0
PSIX(5,8)=0
```

```
              PSIX(6,8)=0
              PSIX(7,8)=0
              PSIX(8,8)=1
              PSIX(9,8)=0
              PSIX(10,8)=0
              PSIX(11,8)=0
              PSIX(12,8)=0
              PSIT(1,8)=0

PSIX(1,9)=0
              PSIX(2,9)=0
              PSIX(3,9)=0
              PSIX(4,9)=0
              PSIX(5,9)=0
              PSIX(6,9)=0
              PSIX(7,9)=0
              PSIX(8,9)=0
              PSIX(9,9)=1
              PSIX(10,9)=0
              PSIX(11,9)=0
              PSIX(12,9)=0
              PSIT(1,9)=0
              PSIX(1,10)=0
              PSIX(2,10)=0
              PSIX(3,10)=0
              PSIX(4,10)=0
              PSIX(5,10)=0
              PSIX(6,10)=0
              PSIX(7,10)=0
              PSIX(8,10)=0
              PSIX(9,10)=0
              PSIX(10,10)=0
              PSIX(11,10)=1
              PSIX(12,10)=0
              PSIT(1,10)=0

PSIX(1,11)=0
              PSIX(2,11)=0
              PSIX(3,11)=0
              PSIX(4,11)=0
              PSIX(5,11)=0
              PSIX(6,11)=0
              PSIX(7,11)=0
              PSIX(8,11)=0
              PSIX(9,11)=0
              PSIX(10,11)=0
              PSIX(11,11)=0
              PSIX(12,11)=1
              PSIT(1,11)=0

99            RETURN
              END
              Subroutine MA_A3_eq_B33T_dot_C3 ( A , B , C )
C***************************************************************
              Implicit None
              Real*8   A(3)
              Real*8   B(3,3)
              Real*8   C(3)
C***************************************************************
              Integer i , j
```

```
      Real*8 Zero
      Parameter ( Zero = 0.0 )
C*****************************************************************
      do i = 1 , 3
         A(i) = zero
         do  j = 1 , 3
            A(i) = A(i) + B(j,i) * C(j)
         end do
      end do
C*****************************************************************
      return
      end Subroutine MA_A3_eq_B33_dot_C3 ( A , B , C )
C*****************************************************************
      Implicit None
      Real*8   A(3)
      Real*8   B(3,3)
      Real*8   C(3)
C*****************************************************************
      Integer i , j
      Real*8 Zero
      Parameter ( Zero = 0.0d0 )
C*****************************************************************
      do i = 1 , 3
         A(i) = zero
         do  j = 1 , 3
            A(i) = A(i) + B(i,j) * C(j)
         end do
      end do
C*****************************************************************
      return
      end Subroutine MA_A33_eq_B33_dot_C33 ( A , B , C )
C*****************************************************************
      Implicit None
      Real*8   A(3,3)
      Real*8   B(3,3)
      Real*8   C(3,3)
C*****************************************************************
      Integer i , j , k , l
      Real*8 Zero
      Parameter ( Zero = 0.0d0 )
C*****************************************************************
      do i = 1 , 3
         do  j = 1 , 3
            A(i,j) = zero
            do k = 1 , 3
               A(i,j) = A(i,j) + B(i,k) * C(k,j)
            end do
         end do
      end do
C*****************************************************************
      return
      end Subroutine MA_A3_eq_B3_cross_C3 ( A , B , C )
C*****************************************************************
      Implicit None
```

```
      Real*8   A(3) , B(3) , C(3)
C*********************************************************************
      A(1) = B(2) * C(3) - B(3) * C(2)
      A(2) = B(3) * C(1) - B(1) * C(3)
      A(3) = B(1) * C(2) - B(2) * C(1)
C*********************************************************************
      return
      end Subroutine MA_A_eq_mag_B3 ( A , B )
C*********************************************************************
      Implicit None
      Real*8   A , B(3)
C*********************************************************************
      A = dsqrt( B(1)*B(1) +  B(2)*B(2) + B(3)*B(3) )
C*********************************************************************
      return
      end Subroutine MA_A3_eq_uv_B3 ( A , B )
C*********************************************************************
      Implicit None
      Integer i
      Real*8   A(3) , B(3) , magnitude C*********************************************************************
      call MA_A_eq_mag_B3 (magnitude, B )
      if ( magnitude .ne. 0.0d0 ) then
        do i = 1,3
          A(i) = B(i)/magnitude
        enddo
      else
        do i = 1,3
          A(i) = 0.0d0
        enddo
      endif C*********************************************************************
      return
      end Subroutine MA_A3_eq_B3_plus_C3_cross_D3 ( A , B , C , D )
C*********************************************************************
      Implicit None
      Real*8   A(3) , B(3) , C(3) , D(3)
C*********************************************************************
      A(1) = B(1) + C(2) * D(3) - C(3) * D(2)
      A(2) = B(2) + C(3) * D(1) - C(1) * D(3)
      A(3) = B(3) + C(1) * D(2) - C(2) * D(1)
C*********************************************************************
      return
      end Subroutine MA_A_eq_B3_dot_C3 ( A , B , C )
C*********************************************************************
      Implicit None
      Real*8   A , B(3) , C(3)
```

```
C****************************************************************
        A = B(1) * C(1) + B(2) * C(2) + B(3) * C(3)
C****************************************************************
        return
        end Subroutine MA_A3_eq_B3_dot_C ( A , B , C )
C****************************************************************
        Implicit None
        Real*8   A(3) , B(3) , C
        integer i
C****************************************************************
        do i = 1,3
           A(i) = B(i) * C
        enddo
C****************************************************************
        return
        end Subroutine MA_Angle_eq_acos_UV1_dot_UV2(Angle,Unit_Vector_1
     $,
Unit_Vector_2)
C****************************************************************
        Implicit None
C
C Returns
        Real*8   Angle
C
C Inputs
        real*8   Unit_Vector_1(3) , Unit_Vector_2(3)
C
C Internal Variables
        Integer i
        Real*8   Mag_1 , Mag_2
     $,               uv1(3)              , uv2(3)
C****************************************************************
        Mag_1 = sqrt ( Unit_Vector_1(1)**2 + Unit_Vector_1(2)**2
     $                                    + Unit_Vector_1(3)**2 )
        Mag_2 = sqrt ( Unit_Vector_2(1)**2 + Unit_Vector_2(2)**2
     $                                    + Unit_Vector_2(3)**2 )
        if (Mag_1.ne.0.0 .and. Mag_2.ne.0.0) then
           do i = 1,3
              uv1 (i) = Unit_Vector_1 (i) / Mag_1
              uv2 (i) = Unit_Vector_2 (i) / Mag_2
           end do
        else
           uv1 (1) = 1.0
           uv2 (1) = 1.0
           do i=2,3
              uv1 (i) = 0.0
              uv2 (i) = 0.0
           end do
        end if
        call MA_A_eq_B3_dot_C3 ( angle , uv1, uv2 )
        angle = dacos ( angle )
C****************************************************************
        return
```

```
      end
      Subroutine EULER_Transformations
(Angles_AB,Trans_AB,Trans_BA )
C****************************************************************
C Filename = EULER_Transformations.for
C****************************************************************
      Implicit None
C****************************************************************
      Real*8 Angles_AB (3) , Trans_AB (3,3) , Trans_BA (3,3)
C****************************************************************
      Real*8   ZOCS (3) , ZOSS (3)
      Integer  i , j
C**************************************************************** do i = 1,3
         ZOCS (i) = cos ( Angles_AB (i) )
         ZOSS (i) = sin ( Angles_AB (i) )
      end do Trans_AB (1,1) = ZOCS(2)*ZOCS(3)
      Trans_AB (2,1) =-ZOSS(3)*ZOCS(1) + ZOSS(1)*ZOSS(2)*ZOCS(3)
      Trans_AB (3,1) = ZOSS(3)*ZOSS(1) + ZOCS(1)*ZOSS(2)*ZOCS(3)
      Trans_AB (1,2) = ZOCS(2)*ZOSS(3)
      Trans_AB (2,2) = ZOCS(1)*ZOCS(3) + ZOSS(1)*ZOSS(2)*ZOSS(3)
      Trans_AB (3,2) =-ZOSS(1)*ZOCS(3) + ZOCS(1)*ZOSS(2)*ZOSS(3)
      Trans_AB (1,3) =-ZOSS(2)
      Trans_AB (2,3) = ZOSS(1)*ZOCS(2)
      Trans_AB (3,3) = ZOCS(1)*ZOCS(2)

do i = 1,3
         do j = 1,3
            Trans_BA ( i,j ) = Trans_AB( j,i )
         end do
      end do C****************************************************************
      return
      end
```

AERODYNAMIC DATA:

| Mach | Alpha | CA | CN |
|---|---|---|---|
| 0.20000000 | 0.00000000 | 0.28809002 | 0.00000000 |
| 0.20000000 | 5.00000000 | 0.28083000 | 0.96579999 |
| 0.20000000 | 10.00000000 | 0.27247000 | 2.21230006 |
| 0.20000000 | 15.00000000 | 0.26081002 | 3.80380011 |
| 0.20000000 | 20.00000000 | 0.25641000 | 5.50159979 |
| 0.20000000 | 25.00000000 | 0.25332999 | 7.32989979 |
| 0.20000000 | 30.00000000 | 0.26818001 | 8.44789982 |
| 0.20000000 | 35.00000000 | 0.22462000 | 10.02690029 |
| 0.20000000 | 40.00000000 | 0.07513000 | 11.31029987 |
| 1.00000000 | 0.00000000 | 0.28039002 | 0.00000000 |
| 1.00000000 | 5.00000000 | 0.27918002 | 0.91390002 |

|     | 253          |              | 254         |
| --- | ---          | ---          | ---         |
| 1.00000000 | 10.00000000 | 0.28512001 | 2.06979990 |
| 1.00000000 | 15.00000000 | 0.29414001 | 3.61150002 |
| 1.00000000 | 20.00000000 | 0.30315998 | 5.93800020 |
| 1.00000000 | 25.00000000 | 0.25058001 | 9.30360031 |
| 1.00000000 | 30.00000000 | 0.01078000 | 13.73620033 |
| 1.00000000 | 35.00000000 | -0.45837003 | 17.95490074 |
| 1.00000000 | 40.00000000 | -1.25906003 | 21.74449921 |
| 2.00000000 | 0.00000000  | 0.26444000 | 0.00000000 |
| 2.00000000 | 5.00000000  | 0.26466000 | 0.86629999 |
| 2.00000000 | 10.00000000 | 0.26532000 | 2.16170001 |
| 2.00000000 | 15.00000000 | 0.26653001 | 4.33029985 |
| 2.00000000 | 20.00000000 | 0.26818001 | 7.21089983 |
| 2.00000000 | 25.00000000 | 0.27027002 | 10.30259991 |
| 2.00000000 | 30.00000000 | 0.27291000 | 13.20489979 |
| 2.00000000 | 35.00000000 | 0.27609998 | 16.30940056 |
| 2.00000000 | 40.00000000 | 0.27972999 | 18.59350014 |
| 3.00000000 | 0.00000000  | 0.22539000 | 0.00000000 |
| 3.00000000 | 5.00000000  | 0.22737001 | 0.86170000 |
| 3.00000000 | 10.00000000 | 0.23331000 | 2.37400007 |
| 3.00000000 | 15.00000000 | 0.24310000 | 4.32670021 |
| 3.00000000 | 20.00000000 | 0.25641000 | 6.34999990 |
| 3.00000000 | 25.00000000 | 0.27302000 | 8.68229961 |
| 3.00000000 | 30.00000000 | 0.29249001 | 11.29619980 |
| 3.00000000 | 35.00000000 | 0.31438002 | 14.30319977 |
| 3.00000000 | 40.00000000 | 0.33813998 | 17.29770088 |
| 4.00000000 | 0.00000000  | 0.19305001 | 0.00000000 |
| 4.00000000 | 5.00000000  | 0.19612999 | 0.85039997 |
| 4.00000000 | 10.00000000 | 0.20559001 | 2.30439997 |
| 4.00000000 | 15.00000000 | 0.22088000 | 3.91289997 |
| 4.00000000 | 20.00000000 | 0.24178000 | 5.87370014 |
| 4.00000000 | 25.00000000 | 0.26763001 | 8.26259995 |
| 4.00000000 | 30.00000000 | 0.29787999 | 11.11680031 |
| 4.00000000 | 35.00000000 | 0.33176002 | 14.24800014 |
| 4.00000000 | 40.00000000 | 0.36838999 | 17.48089981 |
| 5.00000000 | 0.00000000  | 0.17390999 | 0.00000000 |
| 5.00000000 | 5.00000000  | 0.17842001 | 0.84079999 |
| 5.00000000 | 10.00000000 | 0.19173001 | 2.18910003 |
| 5.00000000 | 15.00000000 | 0.21361999 | 3.70860004 |

| | | | |
|---|---|---|---|
| 5.00000000 | 20.00000000 | 0.24332000 | 5.70069981 |
| 5.00000000 | 25.00000000 | 0.28017002 | 8.19579983 |
| 5.00000000 | 30.00000000 | 0.32307002 | 11.06200027 |
| 5.00000000 | 35.00000000 | 0.37092000 | 14.25739956 |
| 5.00000000 | 40.00000000 | 0.42262003 | 17.52470016 |
| 6.00000000 | 0.00000000 | 0.15752000 | 0.00000000 |
| 6.00000000 | 5.00000000 | 0.16258000 | 0.78469998 |
| 6.00000000 | 10.00000000 | 0.17775999 | 1.96050000 |
| 6.00000000 | 15.00000000 | 0.20251000 | 3.40070009 |
| 6.00000000 | 20.00000000 | 0.23628001 | 5.41520023 |
| 6.00000000 | 25.00000000 | 0.27797002 | 7.81750011 |
| 6.00000000 | 30.00000000 | 0.32659000 | 10.61950016 |
| 6.00000000 | 35.00000000 | 0.38071001 | 13.74909973 |
| 6.00000000 | 40.00000000 | 0.43901002 | 16.84289932 |
| 7.00000000 | 0.00000000 | 0.14531000 | 0.00000000 |
| 7.00000000 | 5.00000000 | 0.15081000 | 0.75559998 |
| 7.00000000 | 10.00000000 | 0.16720000 | 1.84790003 |
| 7.00000000 | 15.00000000 | 0.19393001 | 3.29609990 |
| 7.00000000 | 20.00000000 | 0.23034000 | 5.31470013 |
| 7.00000000 | 25.00000000 | 0.27544001 | 7.68349981 |
| 7.00000000 | 30.00000000 | 0.32791001 | 10.49960041 |
| 7.00000000 | 35.00000000 | 0.38620999 | 13.61999989 |
| 7.00000000 | 40.00000000 | 0.44902000 | 16.60980034 |

What is claimed is:

1. A method of real-time guidance and control of a missile by computing control commands in a data processor during flight of said missile to guide said missile along a trajectory that will optimize a predetermined performance function, said control commands adjusting an angle of attack ($\alpha$) between a longitudinal axis of said missile and a relative wind vector, and a bank angle ($\phi$) between a transverse axis of said missile and said relative wind vector, said method periodically performing computational cycles in a data processor to compute a set of values of said control commands during each cycle based on a current missile velocity vector, and a target intercept position relative to a current position of said missile, wherein the computations during each cycle include the steps of:

a) computing new values for a set of control variables based on said performance function and said current missile velocity vector, and said target intercept position relative to said current missile position; and b) computing said control commands from said new values of said set of control variables;

wherein said control variables include at least two control variables that together specify said angle of attack ($\alpha$) and said bank angle ($\phi$), but which have definite and limited values when specifying an angle of attach (60 ) of approximately zero.

2. The method as claimed in claim 1, wherein said at least two control variables include a first control variable ($\beta_2$) that is a cosine function of the specified bank angle ($\phi$), and a second control variable ($\beta_3$) that is a sine function of the specified bank angle ($\phi$), so that the ratio ($\beta_3/\beta_2$) of said second control variable to said first control variable is proportional to the tangent of the specified bank angle ($\phi$).

3. The method as claimed in claim 2, wherein said first control variable ($\beta_2$) and said second control variable ($\beta_3$) are related to the specified angle of attack ($\alpha$) and the specified bank angle ($\phi$) as $\beta_2 = \cos\phi \tan\alpha$ and $\beta_3 = \sin\alpha \tan\alpha$.

4. The method as claimed in claim 1, wherein said step (a) of computing new values for said set of control variables is performed iteratively and wherein a new iterative solution ($X^{[k+1]}$) is obtained as a predetermined solution function ($S(X^{[k]})$) of a previous iterative solution ($X^{[k]}$) beginning with a predetermined trial solution ($X^{[0]}$).

5. The method as claimed in claim 4, wherein said previous iterative solution ($X^{[k]}$) computed from said predetermined solution function is checked for violation of an inequality constraint, and said previous iterative solution is adjusted toward satisfying said inequality constraint before being used in said solution function to compute said new iterative solution ($X^{[k+1]}$).

6. The method as claimed in claim 5, wherein said solution function is predetermined to solve a system of algebraic equations including a summation over finite elements of time, and said inequality constraint specifies that a duration ($\Delta t$) of each of said finite elements of time is at least a predetermined positive value.

7. The method as claimed in claim 4, wherein said solution function is predetermined to solve a system of algebraic equations resulting from taking a first variation of an integral of said performance function along a projected trajectory of said missile to said target intercept position, setting said first variation to zero, and approximating an integral in said first variation as a summation over finite elements, wherein said integral of said performance function includes constraints adjoined to said integral of said performance function by Lagrangian multipliers.

8. The method as claimed in claim 7, wherein said performance function is selected to maximize a terminal velocity of said missile at said target intercept position, and said constraints include an angular orientation of said target intercept position.

9. The method as claimed in claim 4, wherein said solution function is a function of position of a moving target, and said solution function is updated between said computational cycles in response to variation in said position of said moving target.

10. A method of real-time guidance and control of a missile by computing control commands in a data processor during flight of said missile, said method including the steps of periodically performing computational cycles in a data processor to compute a set of values of said control commands during each cycle based on equations of motion for said missile and position of a target relative to position of said missile, wherein the computations during each cycle include an iterative computation of new values for control variables, wherein a new iterative solution ($X^{[k+1]}$) is obtained as a predetermined solution function ($S(X^{[k]})$) of a previous iterative solution ($X^{[k]}$) beginning with a predetermined trial solution ($X^{[0]}$), and wherein said previous iterative solution ($X^{[k]}$) computed from said predetermined solution function is checked for violation of an inequality constraint, and said previous iterative solution is adjusted toward satisfying said inequality constraint before being used in said solution function to compute said new iterative solution ($X^{[k+1]}$), and wherein said control commands are computed from said control variables.

11. The method as claimed in claim 10, wherein said previous iterative solution is adjusted toward satisfying said inequality constraint before being used in said solution function when said previous iterative solution is found to violate said inequality constraint by selectively moving a control variable either on or off of a control boundary of said inequality constraint so that said inequality constraint is satisfied.

12. The method as claimed in claim 10, wherein said solution function is predetermined to solve a system of algebraic equations including a summation over finite elements of time, and said inequality constraint specifies that a duration ($\Delta t$) of each of said finite elements of time is at least a predetermined positive value.

13. The method as claimed in claim 10, wherein control commands adjust an angle of attack ($\alpha$) between a longitudinal axis of said missile and a relative wind vector, and a bank angle ($\phi$) between a transverse axis of said missile and said relative wind vector, and wherein said control variables specify said angle of attack ($\alpha$) and said bank angle ($\phi$) so that said control variables assume definite and limited values when specifying a value of approximately zero for said angle of attack ($\alpha$).

14. The method as claimed in claim 13, wherein said control variables include a first control variable ($\beta_2$) that is a cosine function of the specified bank angle ($\phi$), and a second control variable ($\beta_3$) that is a sine function of the specified bank angle ($\phi$), so that the ratio ($\beta_3/\beta_2$) of said second control variable to said first control variable is proportional to the tangent of the specified bank angle ($\phi$).

15. The method as claimed in claim 14, wherein said first control variable ($\beta_2$) and said second control variable ($\beta_3$) are related to the specified angle of attack ($\alpha$) and the specified bank angle ($\phi$) as $\beta_2 = \cos\phi \tan\alpha$ and $\beta_3 = \sin\phi \tan\alpha$.

16. The method as claimed in claim 10, wherein said control commands guide said missile along a trajectory that will optimize a predetermined performance function, and said solution function is predetermined to solve a system of algebraic equations resulting from taking a first variation of an integral of said performance function along a projected trajectory of said missile, setting said first variation to zero, and approximating an integral in said first variation as a summation over finite elements, wherein said integral of said performance function includes inequality constraints adjoined to said integral of said performance function by Lagrangian multipliers.

17. The method as claimed in claim 16, wherein said integral of said performance function includes a terminal target constraint adjoined to said integral of said performance function by a discrete Lagrangian multiplier, said performance function is selected to maximize a terminal velocity of said missile upon interception with an intercept position of said target, and said terminal target constraint includes an angular orientation of said missile upon arrival at said intercept position of said target.

18. A method of real-time guidance and control of a missile by computing control commands in a data processor during flight of said missile to guide said missile along a trajectory that will optimize a predetermined performance function, said method including the steps of periodically performing computational cycles in a data processor to compute a set of values of said control commands during each cycle based on equations of motion for said missile and position of a target relative to position of said missile, wherein:

the computations during each cycle include an iterative computation of new values for control variables, wherein a new iterative solution ($X^{[k+1]}$) is obtained as a predetermined solution function ($S(X^{[k]})$) of a previous iterative solution ($X^{[k]}$) beginning with a predetermined trial solution ($X^{[0]}$), said control commands are computed from said control variables;

said solution function is predetermined to solve a system of algebraic equations resulting from taking a first variation of an integral of said performance function along a projected trajectory of said missile, setting said first variation to zero, and approximating an integral in said first variation as a summation over finite elements, wherein said integral of said performance function includes an integrand component (L) and an inequality constraint function (G) adjoined to said integral of said performance function by a Lagrangian multiplier ($\mu$), and said control commands adjust an angle of attack ($\alpha$) between a longitudinal axis of said missile and a relative wind vector, and a bank angle ($\phi$) between a transverse axis of said missile and said relative wind vector, and wherein said control variables are selected to specify said angle of attack ($\alpha$) and said bank angle ($\phi$) so that said control variables assume definite and limited values when specifying a value of approximately zero for said angle of attack, and wherein said equations of motion are defined by state functions (f), and said control variables are selected to avoid negative eigenvalues in the matrix $$\frac{\partial H_k}{\partial u_i \partial u_j}$$

where i and k are indexed over said control variables, j is indexed over said control variables, and k is indexed over said state functions and said inequality constraint function such that:

$$H = \lambda^T f + L + \mu^{2T} G$$

wherein $\lambda$ is a matrix of unknown Lagrangian multiplier functions for adjoining the state functions (f), and T denotes a matrix transpose operation.

19. The method as claimed in claim 18, wherein said control variables include a first control variable ($\beta_2$) that is a cosine function of the specified bank angle ($\phi$), and a second control variable ($\beta_3$) that is a sine function of the specified bank angle ($\phi$), so that the ratio ($\beta_3/\beta_2$) of said second control variable to said first control variable is proportional to the tangent of the specified bank angle ($\phi$).

20. The method as claimed in claim 19, wherein said first control variable ($\beta_2$) and said second control variable ($\beta_3$) are related to the specified angle of attack ($\alpha$) and the specified bank angle ($\phi$) as $\beta_2 = \cos\phi \tan\alpha$ and $\beta_3 = \sin\phi \tan\alpha$.

21. The method as claimed in claim 18, wherein said previous iterative solution ($X^{[k]}$) computed from said predetermined solution function is checked for violation of said inequality constraint function, and said previous iterative solution is adjusted toward satisfying said inequality constraint function before being used in said solution function to compute said new iterative solution ($X^{[k+1]}$).

22. The method as claimed in claim 21, wherein said previous iterative solution is adjusted toward satisfying said inequality constraint function before being used in said solution function when said previous iterative solution is found to violate said inequality constraint function by selectively moving one of said control variables either on or off of a control boundary of said inequality constraint function so that said inequality constraint function is satisfied.

23. The method as claimed in claim 22, wherein a slack variable. (K) is used in adjoining said inequality constraint function (G) to said integral of said performance function, a new value for said slack variable (K) is computed before being used in said solution function when said control variable is moved off of said control boundary, and wherein a new value for said Lagrangian multiplier ($\mu$) is computed before being used in said solution function when said control variable is moved off of said control boundary.

24. The method as claimed in claim 21, wherein said system of algebraic equations includes a summation over finite elements of time, said previous iterative solution includes a duration ($\Delta t$) of each of said finite elements of time, and when said duration ($\Delta t$) of said previous iterative solution is negative, said duration is set to a positive value before being used in said solution function to compute said new iterative solution.

25. The method as claimed in claim 18, wherein said integral of said performance function includes a terminal constraint adjoined to said integral of said performance function by a discrete Lagrangian multiplier, said performance function having been selected to maximize a terminal velocity of said missile upon interception with said target, and said terminal constraint includes an angular orientation of said missile upon said interception with said target.

26. The method as claimed in claim 18, wherein said solution function is a function of position of said target, and said solution function is updated between said computational cycles in response to variation in said position of said target.

27. A missile comprising an inertial measurement unit and a control system for maneuvering said missile in response to control commands to guide said missile along a trajectory that will optimize predetermined performance function, and a data processing unit connected to said control system to transmit said control commands to said control system, said data processor being programmed for periodically computing said control commands during computational cycles by computing a set of values of said control commands during each cycle based on equations of motion for said missile, position of a target relative to position of said missile, and attitude of said missile, said data processor being programmed to perform during each cycle an iterative computation of new values for control variables, wherein a new iterative solution ($X^{[k+1]}$) is obtained as a predetermined solution function ($S(X^{[k]})$) of a previous iterative solution ($X^{[k]}$) beginning with a predetermined trial solution ($X^{[0]}$), and said control commands are computed from said control variables, wherein said solution function is predetermined to solve a system of algebraic equations resulting from taking a first variation of an integral of said performance function along a projected trajectory of said missile, setting said first variation to zero, and approximating an integral in said first variation as a summation over finite elements, wherein said integral of said performance function includes an integrand component (L) and an inequality constraint function (G) adjoined to said integral of said performance function by a Lagrangian multiplier ($\mu$), and at least one discrete Lagrangian multiplier adjoined to said integral of said performance function for specifying a terminal constraint on said attitude of said missile upon interception with said target, and wherein said control commands adjust an angle of attack ($\alpha$) between a longitudinal axis of said missile and a relative wind vector, and a bank angle ($\phi$) between a transverse axis of said missile and said relative wind vector, and wherein said control variables are selected to specify said angle of attack ($\alpha$) and said bank angle ($\phi$) so that said control variables assume definite and limited values when specifying a value of approximately zero for the angle of attack ($\alpha$), and wherein said processor is programmed for checking said previous iterative solution $X^{[k]}$ computed from said predetermined solution function for violation of said inequality constraint function, and adjusting said previous iterative solution toward satisfying said inequality constraint function before being used in said solution function to compute said new iterative solution $X^{[k+1]}$.

28. The method as claimed in claim 27, wherein said control variables include a first control variable ($\beta_2$) that is a cosine function of the specified bank angle ($\phi$), and a second control variable ($\beta_3$) that is a sine function of the specified bank angle ($\phi$), so that the ratio ($\beta_3/\beta_2$) of said second control variable to said first control variable is proportional to the tangent of the specified bank angle ($\phi$).

29. The missile as claimed in claim 28, wherein said first control variable ($\beta_2$) and said second control variable ($\beta_3$) are related to the specified angle of attack ($\alpha$) and the specified bank angle ($\phi$) as $\beta_2 = \cos\phi \tan\alpha$ and $\beta_3 = \sin\phi \tan\alpha$.

30. The missile as claimed in claim 27, wherein said data processor is programmed to adjust said previous iterative solution toward satisfying said inequality constraint function before being used in said solution function when said previous iterative solution is found to violate said inequality constraint function by selectively moving a control variable either on or off of a control boundary of said inequality constraint function so that said inequality constraint function is satisfied.

31. The method as claimed in claim 30, wherein a slack variable (K) is used in adjoining said inequality constraint function (G) to said integral of said performance function, and said data processor is programmed to compute a new value for said slack variable (K) before being used in said solution function when said control variable is moved off of said control boundary, and to compute a new value for said Lagrangian multiplier ($\mu$) before being used in said solution function when said control variable is moved on said control boundary.

32. The missile as claimed in claim 27, further comprising an uplink receiver connected to said data processor for providing uplinked tracking data indicating the position of said target relative to the position of said missile during flight of said missile for use in said computational cycles.

33. The missile as claimed in claim 27, wherein said performance function has been selected to maximize a terminal velocity of said missile upon interception with said position of said target.

* * * * *

UNITED STATES PATENT AND TRADEMARK OFFICE
CERTIFICATE OF CORRECTION

Patent No.:    5,435,503

Dated:    July 25, 1995

Inventors:    Johnson et al.

It is certified that error appears in the above-identified patent and that said Letters Patent are hereby corrected as shown below:

Col. 2, line 13: delete "6I" and insert --I--.

Col. 4, line 9: delete "E" and insert --n--.

Col. 4, line 10: delete "E" and insert --n--.

Col. 12, line 56: delete "($\hat{x}$)" and insert -- (x) --.

Col. 12, line 56: delete "as (x)" and insert --as ($\hat{x}$)--.

Col. 13, line 6: delete "x" and insert --$\bar{x}$ --.

Col. 13, line 9: delete "j$\hat{x}$" and insert -- -j$\hat{x}$ --.

Col. 13, line 12: delete "j$\bar{x}$" and insert -- -j$\bar{x}$- --.

Col. 13, line 15: delete "j$\bar{x}$-" and insert-- -j$\bar{x}$--.

UNITED STATES PATENT AND TRADEMARK OFFICE
CERTIFICATE OF CORRECTION

Patent No.: 5,435,503

Dated: July 25, 1995

Inventors: Johnson et al.

It is certified that error appears in the above-identified patent and that said Letters Patent are hereby corrected as shown below:

Col. 15, equation 24-13:

delete: $\dfrac{\partial k \Psi}{\partial \hat{x}_k}$ insert: $\dfrac{\partial j \Psi}{\partial \hat{x}_k}$ Col. 15, equation 24-14:

beginning of formula: delete "j" and insert -- -j -- delete: $\dfrac{\partial k \Psi}{\partial \hat{x}_k}$ insert: $\dfrac{\partial j \Psi}{\partial \hat{x}_k}$

UNITED STATES PATENT AND TRADEMARK OFFICE
CERTIFICATE OF CORRECTION

Patent No.: 5,435,503

Dated: July 25, 1995

Inventors: Johnson et al.

It is certified that error appears in the above-identified patent and that said Letters Patent are hereby corrected as shown below:

Col. 15, line 65:

delete:

$$\alpha = \arctan \sqrt{\beta_2^2 + \beta_3^2}$$

$$\phi = \arctan(\beta_3 / \beta_2)$$

(Equation 26)

insert:

$$\beta_2 = \cos\phi \tan\alpha$$
$$\beta_3 = \sin\phi \tan\alpha.$$

(Equation 25)

UNITED STATES PATENT AND TRADEMARK OFFICE
CERTIFICATE OF CORRECTION

Patent No.: 5,435,503

Dated: July 25, 1995

Inventors: Johnson et al.

It is certified that error appears in the above-identified patent and that said Letters Patent are hereby corrected as shown below:

Col. 16, line 27 delete: (Equation 27)

$$\beta = \tan\alpha = \sqrt{\beta_2^2 + \beta_3^2}$$

$$\beta = \beta\cos\phi$$

$$\beta_3 = \beta\sin\phi$$

$$\phi = \arccos(\beta_2/\beta) = \arcsin(\beta_3/\beta)$$

insert: (Equation 26)

$$\alpha = \arctan\sqrt{\beta_2^2 + \beta_3^2}$$

$$\phi = \arctan(\beta_3 / \beta_2)$$

UNITED STATES PATENT AND TRADEMARK OFFICE
CERTIFICATE OF CORRECTION

Patent No.: 5,435,503

Dated: July 25, 1995

Inventors: Johnson et al.

It is certified that error appears in the above-identified patent and that said Letters Patent are hereby corrected as shown below:

Col. 17, line 1: delete "100" and insert -- $\phi$ --.

Col. 17, line 46: delete " | v | " and insert -- | V | --.

Col. 18, line 51: delete "$\omega_1$" and insert -- $\omega_i$ --.

Col. 19, line 21: delete "$b_i$" and insert --$b_3$--.

Col. 20, line 44: delete "this" and insert --that--.

Col. 22, line 67: After "Mathematica" delete "5".

Col. 26, line 63: delete "K = 0" and insert --$\mu=0$--.

Col. 256, line 44: delete "attach (60)" and insert --attack ($\alpha$)--.

Col. 256, line 57: delete "sin$\alpha$" and insert --sin$\phi$--.

Col. 258, line 21: delete "$\beta^3$" and insert --$\beta_3$--.

Col. 260, line 32: after "optimize" insert --a--.

UNITED STATES PATENT AND TRADEMARK OFFICE
CERTIFICATE OF CORRECTION

Patent No.: 5,435,503

Dated: July 25, 1995

Inventors: Johnson et al.

It is certified that error appears in the above-identified patent and that said Letters Patent are hereby corrected as shown below:

Col. 16, line 37:

delete: (Equation 25)

$$\beta_2 = \cos\phi \tan\alpha$$
$$\beta_3 = \sin\phi \tan\alpha.$$

insert:

UNITED STATES PATENT AND TRADEMARK OFFICE
CERTIFICATE OF CORRECTION

PATENT NO. : 5,435,503
DATED : July 25, 1995
INVENTOR(S) : Johnson, et al.

It is certified that error appears in the above-indentified patent and that said Letters Patent is hereby corrected as shown below:

insert:

(Equation 27)

$$\beta = \tan\alpha = \sqrt{\beta_2^2 + \beta_3^2}$$

$$\beta_2 = \beta\cos\phi$$

$$\beta_3 = \beta\sin\phi$$

$$\phi = \arccos(\beta_2/\beta) = \arcsin(\beta_3/\beta)$$

Signed and Sealed this

Eighteenth Day of June, 1996

Attest:

BRUCE LEHMAN

*Attesting Officer*    *Commissioner of Patents and Trademarks*